United States Patent
Ikeda et al.

(10) Patent No.: US 9,265,007 B2
(45) Date of Patent: Feb. 16, 2016

(54) TRANSMISSION DEVICE, TRANSMISSION METHOD, RECEPTION DEVICE, RECEPTION METHOD, AND PROGRAM

(71) Applicant: SONY CORPORATION, Minato-ku (JP)

(72) Inventors: Tamotsu Ikeda, Tokyo (JP); Takuya Okamoto, Chiba (JP); Takashi Yokokawa, Kanagawa (JP); Hidetoshi Kawauchi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 26 days.

(21) Appl. No.: 14/346,841

(22) PCT Filed: Oct. 19, 2012

(86) PCT No.: PCT/JP2012/077155
§ 371 (c)(1),
(2) Date: Mar. 24, 2014

(87) PCT Pub. No.: WO2013/061894
PCT Pub. Date: May 2, 2013

(65) Prior Publication Data
US 2014/0295908 A1    Oct. 2, 2014

(30) Foreign Application Priority Data
Oct. 26, 2011  (JP) ................................. 2011-234635

(51) Int. Cl.
*H04B 7/00*    (2006.01)
*H04W 52/04*    (2009.01)
(Continued)

(52) U.S. Cl.
CPC .............. *H04W 52/04* (2013.01); *H04H 20/30* (2013.01); *H04H 60/07* (2013.01); *H04L 5/0046* (2013.01);
(Continued)

(58) Field of Classification Search
USPC ............... 455/522, 67.11, 68–70, 115.3, 126, 455/127.1, 127.2, 135, 226.3, 277.2, 296; 370/318
See application file for complete search history.

(56) References Cited

U.S. PATENT DOCUMENTS

2002/0039389 A1   4/2002   Chen et al.
2003/0103446 A1   6/2003   Negishi et al.
(Continued)

FOREIGN PATENT DOCUMENTS

JP   11-145928 A    5/1999
JP   11-340847 A   12/1999
(Continued)

OTHER PUBLICATIONS

International Search Report issued Nov. 20, 2012 in PCT/JP2012/077155.
(Continued)

*Primary Examiner* — Dominic E Rego
(74) *Attorney, Agent, or Firm* — Hazuki International, LLC

(57) ABSTRACT

The present technique relates to a transmission device, a transmission method, a reception device, a reception method, and a program capable of reducing interference to an adjacent channel in a case where connected-transmission is performed. A transmission device according to an aspect of the present technique includes a signal generating unit configured to generate a plurality of signals having a predetermined frequency bandwidth, a power adjusting unit configured to adjust power of signals so that the power of a signal transmitted using a frequency band close to an end of a channel is less than the power of the signal transmitted using a frequency band close to a center of the channel, and a transmission unit configured to use the channel to transmit, in a connected manner, the signals of which powers have been adjusted. The present technique can be applied to a transmission device for performing connected-transmission.

20 Claims, 49 Drawing Sheets

(51) Int. Cl.
  *H04W 52/34*  (2009.01)
  *H04H 20/30*  (2008.01)
  *H04H 60/07*  (2008.01)
  *H04W 52/42*  (2009.01)
  *H04L 5/00*  (2006.01)
  *H04L 27/26*  (2006.01)

(52) U.S. Cl.
  CPC ........... *H04W 52/346* (2013.01); *H04L 5/0007* (2013.01); *H04L 27/2601* (2013.01); *H04W 52/42* (2013.01); *Y02B 60/50* (2013.01)

(56) References Cited

U.S. PATENT DOCUMENTS

| | | | |
|---|---|---|---|
| 2006/0125770 A1* | 6/2006 | Kao et al. | 345/102 |
| 2007/0260236 A1* | 11/2007 | Han et al. | 606/41 |
| 2010/0248660 A1* | 9/2010 | Bavisi et al. | 455/120 |
| 2011/0092174 A1* | 4/2011 | Choi et al. | 455/118 |
| 2013/0064203 A1* | 3/2013 | Ogawa | 370/329 |

FOREIGN PATENT DOCUMENTS

| | | |
|---|---|---|
| JP | 2009-302992 A | 12/2009 |
| WO | WO 02/17524 A1 | 2/2002 |
| WO | WO 2010/067726 A1 | 6/2010 |

OTHER PUBLICATIONS

"Outline of Integrated Services Digital Broadcasting Terrestrial Mobile Multi-Media Broadcasting" Ministry of Public Management, Home Affairs, Posts and Telecommunications, Nov. 28, 2008, 34 pages (with English language translation).

"Transmission System for Terrestrial Mobile Multimedia Broadcasting Based on Connected Segment Transmission" Association of Radio Industries and Businesses STB-B46, vol. 1.2, Jul. 3, 2012, 20 Pages (with English language translation).

* cited by examiner

FIG. 1

FORM OF SERVICE IN AREA BROADCAST TYPE SYSTEM

| # | FORM OF SERVICE (COMMONLY CALLED NAMES) | OCCUPIED FREQUENCY BANDWIDTH | MAIN PURPOSES |
|---|---|---|---|
| 1 | FULL SEGMENT TYPE | 5.7MHz | AREA-LIMITED, BOTH OF SERVICES SUCH AS HIGH-DEFINITION BROADCAST AND ONE-SEGMENT (1SEG) BROADCAST ARE CONTAINED AT THE SAME TIME. |
| 2 | Null-ATTACHED ONE-SEGMENT (1SEG) TYPE | 5.7MHz | AREA-LIMITED, ONE-SEGMENT (1SEG) BROADCAST. * SEGMENTS OTHER THAN CENTRAL SEGMENT ARE Null |
| 3 | ONE-SEGMENT (1SEG) TYPE | 468kHz | AREA-LIMITED, ONE-SEGMENT (1SEG) BROADCAST. * ONLY CENTRAL SEGMENT |
| 4 | MULTI-ONE-SEGMENT (TABA-SEG) TYPE | (6000/14×n+38.48) MHz * SEGMENT CONNECTED-TRANSMISSION | n: NUMBER OF OFDM SEGMENTS INCLUDED IN OFDM FRAME CONNECTED AREA-LIMITED, MULTIPLE ONE-SEGMENT (1SEG) BROADCASTS. |
| 5 | SEPARATE SEGMENT (BARA-SEG) TYPE | 468kHz * SEGMENT POSITION CHANGES | AREA-LIMITED, MULTIPLE SERVICE PROVIDERS INDEPENDENTLY PROVIDE ONE-SEGMENT (1SEG) BROADCASTS. * THIS CAN COEXIST WITH ONE-SEGMENT (1SEG) TYPE, AND FREQUENCY CAN BE REUSED IN THE AREA |

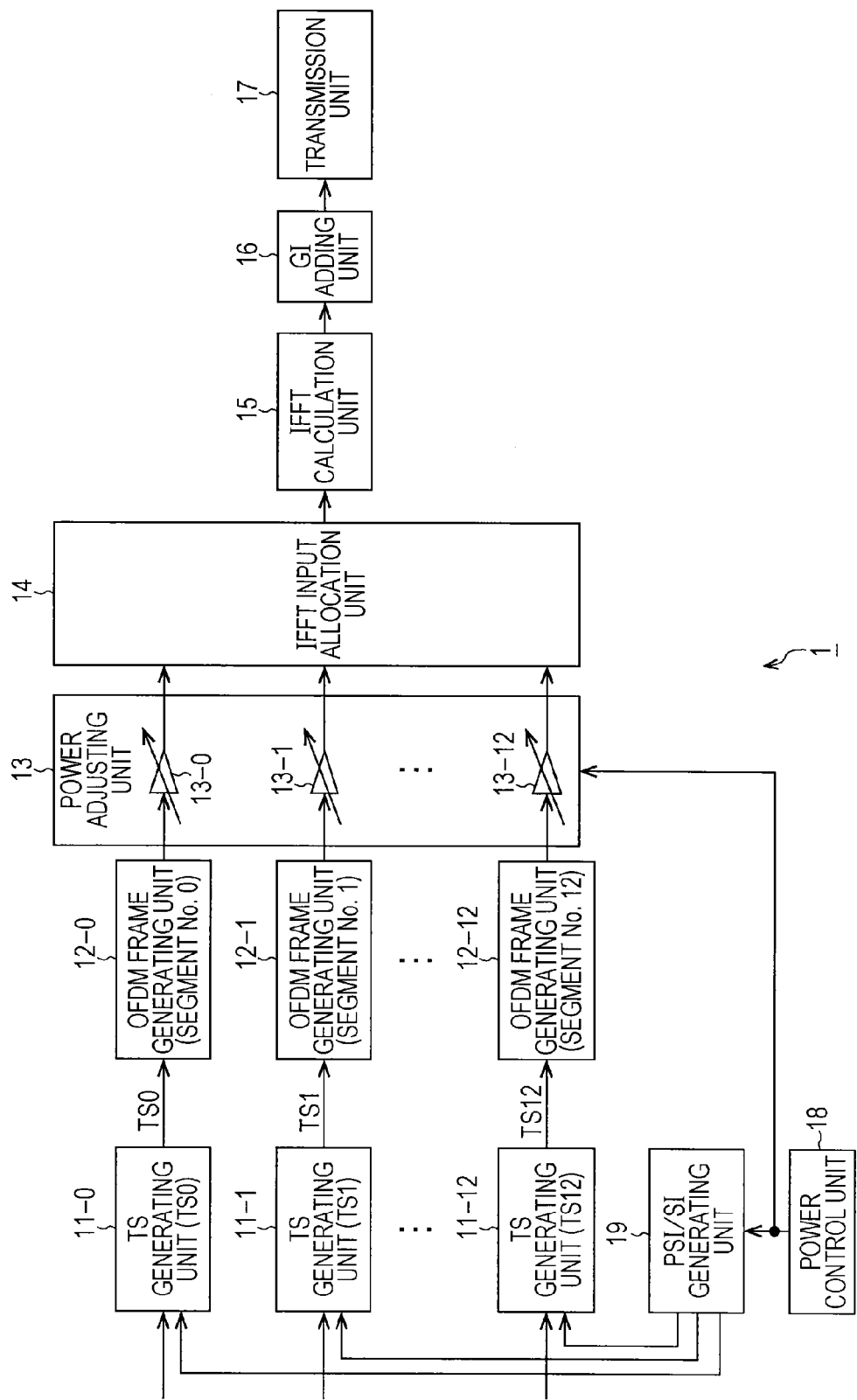

FIG. 6

```
DATA STRUCTURE                              NUMBER    BIT ROW
                                            OF BITS   EXPRESSION area_delivery_system_descriptor() {
  descriptor_tag                              8       uimsbf
  descriptor_length                           8       uimsbf
  area_code                                  12       bslbf
  guard_interval                              2       bslbf
  transmission_mode                           2       bslbf
  transmission_power                          4       uimsbf
  adjacent_transmission_power                 4       uimsbf
  for(i=0; i<N; i++) {
    frequency                                16       uimsbf
  }
}
```

FIG. 7

| GUARD INTERVAL | DESCRIPTION |
|---|---|
| 00 | 1/32 |
| 01 | 1/16 |
| 10 | 1/8 |
| 11 | 1/4 |

FIG. 8

| MODE INFORMATION | DESCRIPTION |
|---|---|
| 00 | Mode1 |
| 01 | Mode2 |
| 10 | Mode3 |
| 11 | NOT DEFINED |

FIG. 9

| Index | TRANSMISSION POWER OF SEGMENT IN QUESTION WITH RESPECT TO REFERENCE POWER |
|---|---|
| 1111 | $\times 2^0 = 1$ (0dB) |
| 1110 | $\times 2^{-1} = 1/2$ (−3dB) |
| 1101 | $\times 2^{-2} = 1/4$ (−6dB) |
| 1100 | $\times 2^{-3} = 1/8$ (−9dB) |
| : | : |
| 0000 | $\times 2^{-15}$ (−45dB) |

FIG. 10

```
DATA STRUCTURE                          NUMBER   BIT ROW
                                        OF BITS  EXPRESSION area_delivery_system_descriptor() {
    descriptor_tag                      8        uimsbf
    descriptor_length                   8        uimsbf
    area_code                           12       bslbf
    guard_interval                      2        bslbf
    transmission_mode                   2        bslbf
    transmission_power                  4        uimsbf
    adjacent_transmission_power_delta   4        bslbf
    for(i=0; i<N; i++) {
        frequency                       16       uimsbf
    }
}
```

FIG. 11

| Index | POWER OF SEGMENT IN QUESTION WITH RESPECT TO UPPER ADJACENT SEGMENT | Index | POWER OF SEGMENT IN QUESTION WITH RESPECT TO UPPER ADJACENT SEGMENT |
|---|---|---|---|
| 1111 | $x2^0 = 1$ (0dB) | 0000 | RESERVE |
| 0001 | $x2^1 = 2$ (3dB) | 1110 | $x2^{-1} = 1/2$ (-3dB) |
| 0010 | $x2^2 = 4$ (6dB) | 1101 | $x2^{-2} = 1/4$ (-6dB) |
| 0011 | $x2^3 = 8$ (9dB) | 1100 | $x2^{-3} = 1/8$ (-9dB) |
| .. | .. | .. | .. |
| 0111 | $x2^7$ (21dB) | 1000 | $x2^{-7}$ (-24dB) |

FIG. 12

| DATA STRUCTURE | NUMBER OF BITS | BIT ROW EXPRESSION |
|---|---|---|
| connected_transmission_descriptor () { | | |
|   descriptor_tag | 8 | uimsbf |
|   descriptor_length | 8 | uimsbf |
|   connected_transmission_group_id | 16 | uimsbf |
|   segment_type | 2 | bslbf |
|   modulation_type_A | 2 | bslbf |
|   modulation_type_B | 2 | bslbf |
|   modulation_type_C | 2 | bslbf |
|   for (i= 0; i<N; i++) { | | |
|     additional_connected_transmission_info | 8 | uimsbf |
|   } | | |
| } | | |

| additional_connected_transmission_info | |
|---|---|
| UPPER 4 BIT<br>(TRANSMISSION POWER OF<br>SEGMENT IN QUESTION) | LOWER 4 BIT<br>(UPPER ADJACENT SEGMENT<br>TRANSMISSION POWER) |
| ACCORDING TO FIG. 9 | ACCORDING TO FIG. 9 |

B

| additional_connected_transmission_info | |
|---|---|
| UPPER 4 BIT<br>(TRANSMISSION POWER OF<br>SEGMENT IN QUESTION) | LOWER 4 BIT<br>(DIFFERENCE FROM UPPER ADJACENT<br>SEGMENT TRANSMISSION POWER) |
| ACCORDING TO FIG. 9 | ACCORDING TO FIG. 11 |

C

| additional_connected_transmission_info | |
|---|---|
| UPPER 4 BIT<br>(FIXED VALUE) | LOWER 4 BIT<br>(DIFFERENCE FROM UPPER ADJACENT<br>SEGMENT TRANSMISSION POWER) |
| 1111 | ACCORDING TO FIG. 11 |

FIG. 26

TMCC INFORMATION

| BIT ALLOCATION | EXPLANATION | | |
|---|---|---|---|
| $B_{20}$ TO $B_{21}$ | SYSTEM IDENTIFICATION | | |
| $B_{22}$ TO $B_{25}$ | TRANSMISSION PARAMETER SWITCH INDEX | | |
| $B_{26}$ | EMERGENCY WARNING BROADCAST ACTIVATION FLAG | | |
| $B_{27}$ | CURRENT INFORMATION | PARTIAL RECEPTION FLAG | |
| $B_{28}$ TO $B_{40}$ | | A HIERARCHICAL TRANSMISSION PARAMETER INFORMATION | |
| $B_{41}$ TO $B_{53}$ | | B HIERARCHICAL TRANSMISSION PARAMETER INFORMATION | |
| $B_{54}$ TO $B_{66}$ | | C HIERARCHICAL TRANSMISSION PARAMETER INFORMATION | |
| $B_{67}$ | NEXT INFORMATION | PARTIAL RECEPTION FLAG | |
| $B_{68}$ TO $B_{80}$ | | A HIERARCHICAL TRANSMISSION PARAMETER INFORMATION | |
| $B_{81}$ TO $B_{93}$ | | B HIERARCHICAL TRANSMISSION PARAMETER INFORMATION | |
| $B_{94}$ TO $B_{106}$ | | C HIERARCHICAL TRANSMISSION PARAMETER INFORMATION | |
| $B_{107}$ TO $B_{109}$ | CONNECTED-TRANSMISSION PHASE CORRECTION AMOUNT | | |
| $B_{110}$ TO $B_{121}$ | RESERVE | | |

FIG. 27

| TMCC INFORMATION (B110) | MEANING |
|---|---|
| 0 | THERE IS PREDETERMINED POWER DIFFERENCE |
| 1 | THERE IS NO PREDETERMINED POWER DIFFERENCE |

FIG. 28

| TMCC INFORMATION (B110) | MEANING |
|---|---|
| 0 | THERE IS PREDETERMINED POWER DIFFERENCE<br><br>· WHEN sub-ch OF SEGMENT IN QUESTION IS LESS THAN 21, THIS INDICATES THAT POWER OF SEGMENT IN QUESTION IS LESS THAN POWER OF UPPER ADJACENT SEGMENT BY PREDETERMINED POWER<br><br>· WHEN sub-ch OF SEGMENT IN QUESTION IS MORE THAN 23, THIS INDICATES THAT POWER OF SEGMENT IN QUESTION IS MORE THAN POWER OF UPPER ADJACENT SEGMENT BY PREDETERMINED POWER |
| 1 | THERE IS NO PREDETERMINED POWER DIFFERENCE |

FIG. 29

TMCC INFORMATION
(B110 TO B113)

| Index | POWER OF SEGMENT IN QUESTION WITH RESPECT TO UPPER ADJACENT SEGMENT | Index | POWER OF SEGMENT IN QUESTION WITH RESPECT TO UPPER ADJACENT SEGMENT |
|---|---|---|---|
| 1111 | $x2^{\wedge}0 = 1$ (0dB) | 0000 | RESERVE |
| 0001 | $x2^{\wedge}1 = 2$ (3dB) | 1110 | $x2^{\wedge}-1 = 1/2$ (-3dB) |
| 0010 | $x2^{\wedge}2 = 4$ (6dB) | 1101 | $x2^{\wedge}-2 = 1/4$ (-6dB) |
| 0011 | $x2^{\wedge}3 = 8$ (9dB) | 1100 | $x2^{\wedge}-3 = 1/8$ (-9dB) |
| .. | .. | .. | .. |
| 0111 | $x2^{\wedge}7$ (21dB) | 1000 | $x2^{\wedge}-7$ (-24dB) |

FIG. 37

| DATA STRUCTURE | NUMBER OF BITS | BIT ROW EXPRESSION |
|---|---|---|
| area_delivery_system_descriptor () { | | |
|    descriptor_tag | 8 | uimsbf |
|    descriptor_length | 8 | uimsbf |
|    area_code | 12 | bslbf |
|    guard_interval | 2 | bslbf |
|    transmission_mode | 2 | bslbf |
|    transmission_filter | 8 | uimsbf |
|    for (i=0; i<N; i++) { | | |
|      frequency | 16 | uimsbf |
|    } | | |
| } | | |

FIG. 38

| Index | TYPE OF WAVEFORM SHAPING FILTER |
|---|---|
| 00000000 | EXPRESSION 1, d = 1.0 |
| 00000001 | EXPRESSION 1, d = 1.1 |
| : | : |
| 00000111 | EXPRESSION 1, d = 1.7 |
| : | RESERVE |
| 00010000 | EXPRESSION n, PARAMETER = n |
| : | : |
| OTHERS | RESERVE |

FIG. 39

| DATA STRUCTURE | NUMBER OF BITS | BIT ROW EXPRESSION |
|---|---|---|
| connected_transmission_descriptor () { | | |
|   descriptor_tag | 8 | uimsbf |
|   descriptor_length | 8 | uimsbf |
|   connected_transmission_group_id | 16 | uimsbf |
|   segment_type | 2 | bslbf |
|   modulation_type_A | 2 | bslbf |
|   modulation_type_B | 2 | bslbf |
|   modulation_type_C | 2 | bslbf |
|   for (i=0;i<N;i++) { | | |
|     additional_connected_transmission_info | 8 | uimsbf |
|   } | | |
| } | | |

Index OF Transmission_filter IS DESCRIBED HERE

FIG. 50

| TMCC INFORMATION (B110) | MEANING |
|---|---|
| 0 | WITH WAVEFORM SHAPING FILTER |
| 1 | WITHOUT WAVEFORM SHAPING FILTER |

FIG. 51

| Index | TYPE OF WAVEFORM SHAPING FILTER |
|---|---|
| 00 | WAVEFORM SHAPING FILTER 1 |
| 01 | WAVEFORM SHAPING FILTER 2 |
| 10 | WAVEFORM SHAPING FILTER 3 |
| 11 | WITHOUT WAVEFORM SHAPING FILTER |

TRANSMISSION DEVICE, TRANSMISSION METHOD, RECEPTION DEVICE, RECEPTION METHOD, AND PROGRAM

TECHNICAL FIELD

The present technique relates to a transmission device, a transmission method, a reception device, a reception method, and a program, and more particularly relates to a transmission device, a transmission method, a reception device, a reception method, and a program that can reduce interference to an adjacent channel in a case where connected-transmission is performed.

BACKGROUND ART

In recent years, the effective use of a so-called white space, which is generated by reallocation of broadcast frequency bands, is actively discussed. The white space is a part of a broadcast frequency band that can also be used for other purposes because of geographical condition and time condition.

Using the white space, for example, an area broadcast system which is an area-limited broadcast system has been suggested.

FIG. 1 is a figure showing forms of usage of a frequency band for the area broadcast system. As shown in FIG. 1, forms of usage of a frequency band include five forms, e.g., a full segment type, a Null-attached one-segment (1seg) type, a one-segment (1seg) type, a multi-one segment (taba-seg) type, and separate segment (bara-seg) type.

For example, the multi-one segment (taba-seg) type is a form of broadcast, in which only one-segment (1seg) portion is extracted from a frequency band (6 MHz, 13 segments) for one channel of digital terrestrial television broadcast, and it is connected with one-segment (1seg) portions of other channels and the one-segment (1seg) portions are broadcast in a frequency band for one channel.

On the other hand, the separate segment (bara-seg) type is a form of broadcast that is done with a shift of the central frequency (the segment position) of a frequency bandwidth of 468 kHz, which is the same as the one-segment (1seg) type.

CITATION LIST

Non-Patent Document

Non-Patent Document 1: ARIB STD-B46 Transmission System for Terrestrial Mobile Multimedia Broadcasting Based on Connected Segment Transmission
Non-Patent Document 2: ARIB STD-B31 Transmission System for Digital Terrestrial Television Broadcasting
Non-Patent Document 3: ARIB STD-B29 Transmission System for Digital Terrestrial Sound Broadcasting
Non-Patent Document 4: ARIB STD-B10 Service Information for Digital Broadcasting System

SUMMARY OF THE INVENTION

Problems to be Solved by the Invention

By the way, ARIB STD-B46 stipulates connected-transmission for transmitting multiple unit transmission waves such as OFDM segments of different broadcast channels from the same transmission point without any guard band in a connected manner.

When the connected-transmission is used, and, for example, when multi-one segment (taba-seg) type broadcast is done, signals of the upper end segment and the lower end segment may particularly interfere with signals of adjacent channels in the frequency axis.

The present technique is made in view of such circumstances, and it is to reduce interference to adjacent channels when connected-transmission is employed.

Solutions to Problems

A transmission device according to an aspect of the present technique includes a signal generating unit configured to generate a plurality of signals having a predetermined frequency bandwidth, a power adjusting unit configured to adjust power of signals so that the power of a signal transmitted using a frequency band close to an end of a channel is less than the power of the signal transmitted using a frequency band close to a center of the channel, and a transmission unit configured to use the channel to transmit, in a connected manner, the signals of which powers have been adjusted.

The power adjusting unit can adjust the power of the signals in units of signals.

A power information generating unit for generating power information which is information about the power of the signal can be further provided. In this case, the transmission unit can transmit the signal and the power information.

The power information generating unit can generate the power information including information about the power of the signal and information about the power of an upper adjacent signal transmitted using a frequency band adjacent to an upper side of the signal in a frequency axis.

The power information generating unit can generate the power information including information about the power of the signal and information indicating a difference between the power of the signal and the power of the upper adjacent signal transmitted using the frequency band adjacent to the upper side of the signal in the frequency axis.

The power information generating unit can generate the power information including information indicating a difference between the power of the signal and the power of the upper adjacent signal transmitted using the frequency band adjacent to the upper side of the signal in the frequency axis.

The power information generating unit can generate the power information including information indicating whether there is a difference between the power of the signal and the power of the upper adjacent signal transmitted using the frequency band adjacent to the upper side of the signal in the frequency axis.

A connection unit configured to connect the plurality of signals without any guard interval can be further provided. In this case, the power adjusting unit can adjust each of the power of the signals by performing waveform shaping on the signals connected.

A waveform shaping information generating unit configured to generate waveform shaping information which is information about the waveform shaping can be further provided. The transmission unit can transmit the signal and the waveform shaping information.

The waveform shaping information generating unit can generate the waveform shaping information including information about a type of a filter used for the waveform shaping.

The waveform shaping information generating unit can generate the waveform shaping information including information indicating whether the waveform shaping is performed or not.

The predetermined frequency bandwidth can be one segment defined in ARIB. In this case, the signal generating unit can generate, as the signals, signals of multiple OFDM segments each transmitting a different transport stream.

A reception device according to another aspect of the present technique includes a reception unit configured to receive a predetermined signal of plurality of signals of which power has been adjusted so that the power of a signal transmitted using a frequency band close to an end of a channel is less than the power of the signal transmitted using a frequency band close to a center of the channel, wherein the signals are transmitted in a connected manner using the channel, a power correction unit configured to correct the power of at least one of the received signal and an upper adjacent signal transmitted using a frequency band adjacent to an upper side of the signal in a frequency axis, so that the power becomes power before the adjustment, a processing unit configured to process a signal of which power has been corrected.

A power information obtaining unit can be further provided that is configured to obtain, from the signal received by the reception unit, power information which is information about the power of the signal, which is transmitted together with the signal in a case where the power of the signal is adjusted by the signal unit.

A power information obtaining unit can be further provided that is configured to obtain, from the signal received by the reception unit, waveform shaping information which is information about the waveform shaping, which is transmitted together with the signal in a case where the power of the signal is adjusted by waveform shaping of the multiple signals connected without any guard interval.

A control unit can be further provided that is configured to correct information representing a channel state of data obtained through demodulation by the processing unit, in accordance with an amount of attenuation of the power of the signal due to power adjustment performed at a transmission side.

According to an aspect of the present technique, a plurality of signals having a predetermined frequency bandwidth are generated, and power of signals is adjusted so that the power of a signal transmitted using a frequency band close to an end of a channel is less than the power of a signal transmitted using a frequency band close to a center of the channel, and the channel is used to transmit, in a connected manner, the signals of which power has been adjusted.

According to another aspect of the present technique, a predetermined signal of a plurality of signals is received, of which power has been adjusted so that the power of a signal transmitted using a frequency band close to an end of a channel is less than the power of the signal transmitted using a frequency band close to a center of the channel, wherein the signals are transmitted in a connected manner using the channel, and the power of at least one of the received signal and an upper adjacent signal transmitted using a frequency band adjacent to an upper side of the signal in a frequency axis is corrected, so that the power becomes power before the adjustment, and a signal of which power has been corrected is processed.

Effects of the Invention

According to the present technique, the interference to an adjacent channel can be reduced in a case where connected-transmission is performed.

BRIEF DESCRIPTION OF DRAWINGS

FIG. 1 is a figure showing forms of usage of a frequency band for area broadcast system.

FIG. 5 is a block diagram showing an example structure of a transmission device.

FIG. 6 is a figure showing an example of a data structure of an area delivery system descriptor.

FIG. 7 is a figure showing meaning of a value of guard_interval.

FIG. 8 is a figure showing meaning of a value of transmission_mode.

FIG. 9 is a figure showing meaning of a value of transmission_power.

FIG. 10 is a figure showing another example of data structure of an area delivery system descriptor.

FIG. 11 is a figure showing meaning of a value of adjacent_transmission_power_delta.

FIG. 12 is a figure showing an example of a data structure of a connected-transmission descriptor.

FIGS. 13A to 13C are figures showing examples of meaning of a value of additional_connected_transmission_info.

FIG. 26 is a figure showing bit allocation of TMCC information.

FIG. 27 is a figure showing an example of meaning of 1 bit of B110 of the TMCC information.

FIG. 28 is a figure showing another example of meaning of 1 bit of B110 of the TMCC information.

FIG. 29 is a figure showing an example of meaning of 4 bits of B110 to B113 of the TMCC information.

FIG. 37 is a figure showing an example of a data structure of an area delivery system descriptor.

FIG. 38 is a figure showing meaning of a value of transmission_filter.

FIG. 39 is a figure showing an example of a data structure of a connected-transmission descriptor.

FIG. 50 is a figure showing an example of meaning of 1 bit of B110 of the TMCC information.

FIG. 51 is a figure showing an example of meaning of 2 bits of B110 and B111 of the TMCC information.

MODES FOR CARRYING OUT THE INVENTION

The following is a description of embodiments for carrying out the present technique. The explanation will be made in the following order.

1. First embodiment (example of adjusting the power of a signal with a segment unit)
 1-1. Example of notifying the power of the signal of each segment with PSI/SI
 1-2. Example of notifying the power of the signal of each segment with TMCC information
2. Second embodiment (example of adjusting the power of a signal by waveform shaping)
 2-1. Example of notifying information about waveform shaping with PSI/SI
 2-2. Example of notifying information about waveform shaping with TMCC information

1. FIRST EMBODIMENT

Example of Adjusting the Power of a Signal with a Segment Unit

[Transmission Signal]

Figure 2:
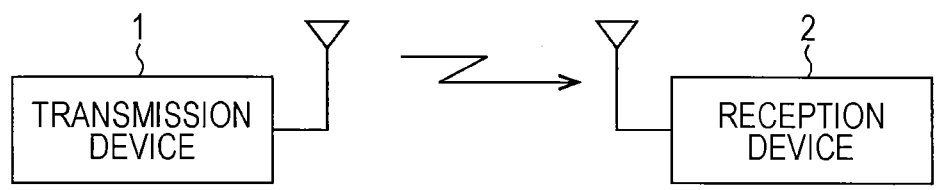
FIG. 2 is a figure showing an example structure of a broadcast system according to an embodiment of the present technique.

FIG. 2 is a figure showing an example structure of a broadcast system according to an embodiment of the present technique. The broadcast system of FIG. 2 includes a transmission device 1 and a reception device 2.

The transmission device 1 is a device for area type broadcast of multi-one segment (taba-seg) type or separate segment (bara-seg) type by means of connected-transmission. Data which are to be transmitted using each segment are input into the transmission device 1.

The transmission device 1 generates a signal of OFDM (Orthogonal Frequency Division Multiplex) segments in 13-segment format based on ARIB STD-B31 on the basis of the input data, and transmits the signal by means of connected-transmission. As described above, the connected-transmission is a method for connecting multiple unit transmission waves without any guard band and transmitting the multiple unit transmission waves from the same transmission point.

The reception device 2 is a terminal such as a cellular phone capable of receiving one-segment (1seg) broadcast. The reception device 2 receives the OFDM signal transmitted from the transmission device 1, and applying various kinds of processing such as demodulation processing and decoding processing to obtain data transmitted in predetermined one segment. The reception device 2 decodes the obtained data, and outputs video data, audio data, and the like.

Figure 3:
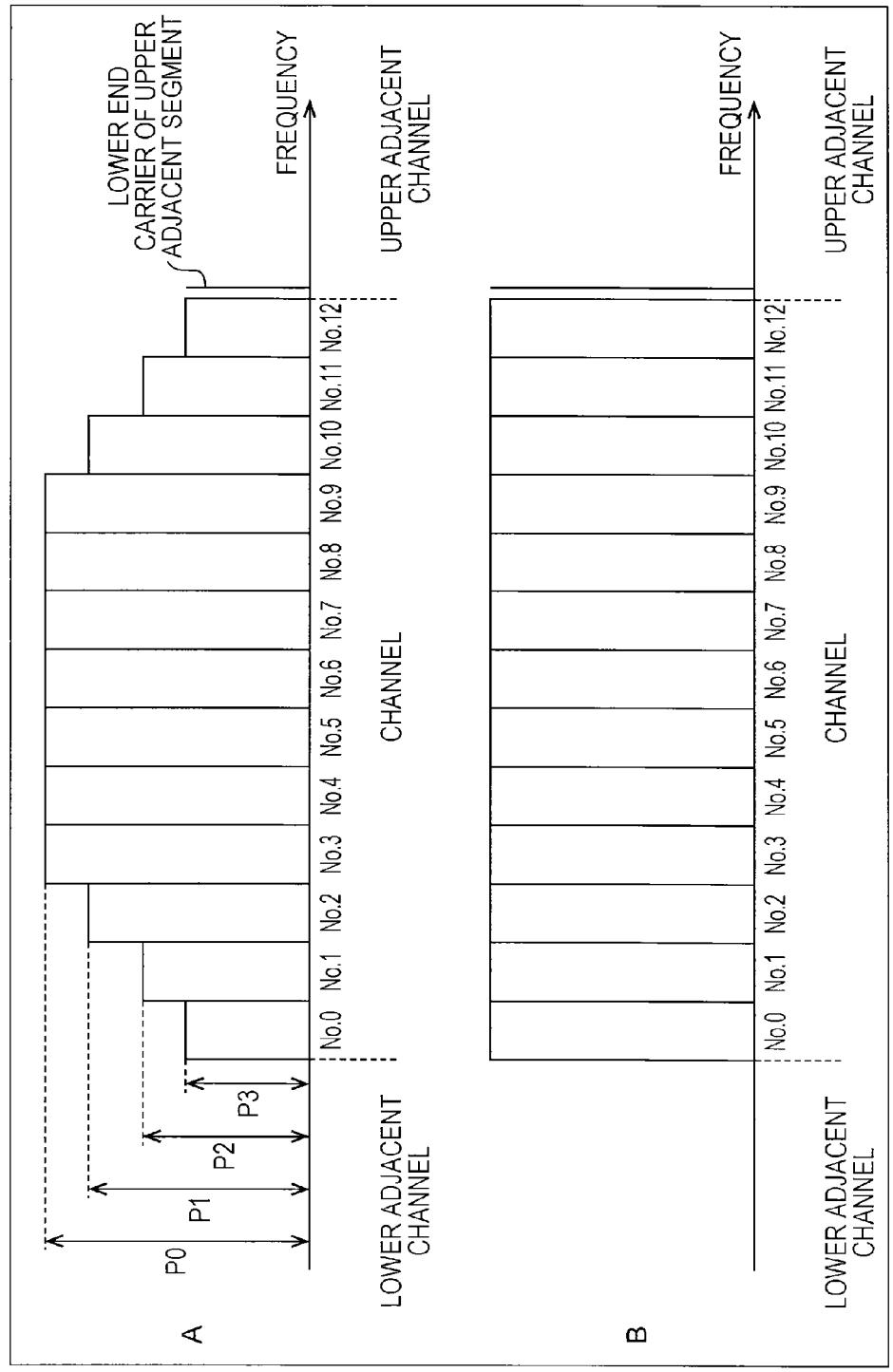
FIGS. 3A and 3B are figures showing an example of an OFDM signal that is transmitted by a transmission device.

FIG. 3A is a figure showing an example of an OFDM signal transmitted by the transmission device 1.

The horizontal axis of FIG. 3A denotes a frequency. The segment No. 0 is a segment of which frequency in the channel is the lowest. The segment No. 12 is a segment of which frequency in the same channel is the highest. The vertical direction represents the transmission power of a signal.

As shown in FIG. 3A, in the transmission device 1, the power of the signal is adjusted in units of segments. In the example of FIG. 3A, the power of the signal of the segments No. 3 to No. 9 around the segment No. 6 is the power P0. The power of the signal of the segment No. 2 which is a lower segment adjacent to the segment No. 3 and the segment No. 10 which is an upper segment adjacent to the segment No. 9 is the power P1 which is less than the power P0. The power of the signal of the segment No. 1 which is a lower segment adjacent to the segment No. 2 and the segment No. 11 which is an upper segment adjacent to the segment No. 10 is the power P2 which is less than the power P1. The power of the signal of the segment No. 0 which is the lower end segment and the segment No. 12 which is the upper end segment is the power P3 which is less than the power P2.

As described above, in the transmission device 1, the power of the signal of each segment is adjusted so that the power of the signal of a segment closer to an end of the channel is smaller than the power of the signal of a segment close to the center of the channel.

Accordingly, as compared with a case where the signals of all the segments are transmitted with the same power as shown in FIG. 3B, the interference given to signals of adjacent channels can be reduced. In the case of FIG. 3A, mainly, this can reduce the interference that the signal of the segment No. 0 gives to the signal of the segment at the upper end of the lower adjacent channel. In addition, this can also reduce the interference that the signal of the segment No. 12 gives to the signal of the segment at the lower end of the upper adjacent channel.

Figure 4:
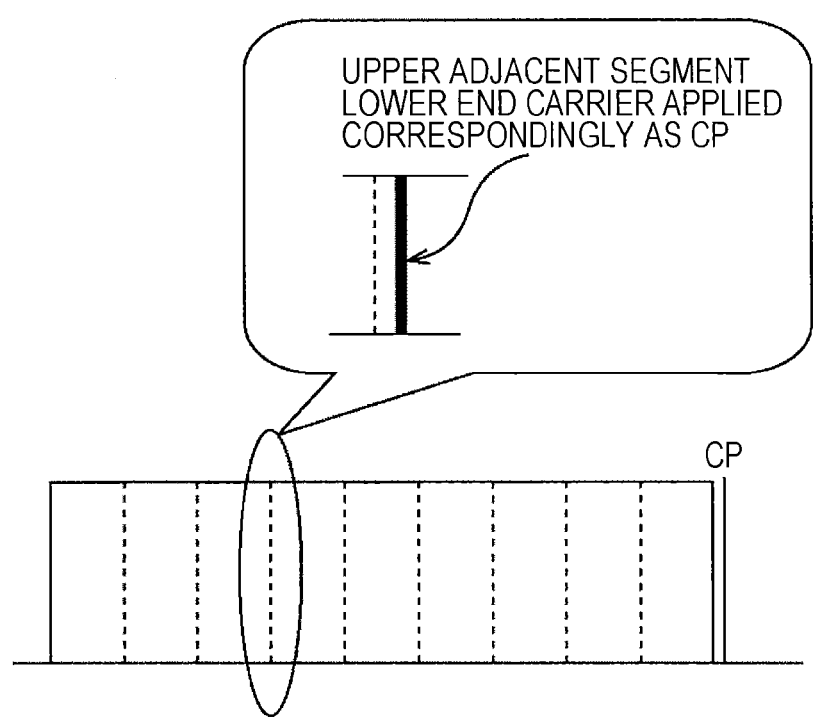
FIG. 4 is a figure for explaining CP carrier.

The signal of the lower end carrier of the upper adjacent segment of the segment No. 12 is used as a CP (Continual Pilot) when the reception device 2 equalizes the signal of the segment No. 12. As shown in FIG. 4, in ARIB STD-B29 3.13.2, the lower end carrier of the upper adjacent segment of a segment which is to be received is used as a CP carrier for the segment which is to be received. In connected-transmission, one CP carrier is added to the upper end of the entire frequency band connected.

As described above, in the reception device 2, the signal of the lower end carrier of the upper adjacent segment of the segment which is to be received is used for equalization. The transmission side adjusts the power in units of segments, and therefore, when the equalization is done using the received signal as it is, the reception device 2 may not be able to correctly perform the equalization. The transmission device 1 notifies the reception device 2 of power information which is information about the power of the signal of each segment used for correcting the power.

Methods for notifying the power information include a method using PSI/SI (Program Specific Information/Service Information) and a method using TMCC (Transmission Multiplexing Configuration Control) information. First, a method using PSI/SI will be explained.

1-1. Example of Notifying the Power of the Signal of Each Segment with PSI/SI>

[Configuration of Transmission Device 1]

FIG. 5 is a block diagram showing an example structure of transmission device 1. The transmission device 1 includes TS generating units 11-0 to 11-12, OFDM frame generating units 12-0 to 12-12, a power adjusting unit 13, an IFFT input allocation unit 14, an IFFT calculation unit 15, a GI adding unit 16, a transmission unit 17, a power control unit 18, and a PSI/SI generating unit 19.

The TS generating units 11-0 to 11-12 multiplex AV data which are input from the outside and PSI/SI which is provided by the PSI/SI generating unit 19, thus generating a TS (Transport Stream). The PSI/SI provided by the PSI/SI generating unit 19 includes PAT (Program Association Table), PMT (Program Map Table), NIT (Network Information Table), and the like.

The PAT is information indicating a list of programs included in the TS using a PID of PMT. The PMT is information indicating a PID of a packet storing images and audio of each program. The NIT is information about a network such as channel number, modulation method, guard interval, and the like. The power information is included in the NIT, for example, in the PSI/SI.

The TS generating units 11-0 to 11-12 respectively output the generated TS0 to TS12 to OFDM frame generating units 12-0 to 12-12. For example, the NIT of PSI/SI multiplexed in TS0 includes the power information about the signal of the segment No. 0.

The OFDM frame generating units 12-0 to 12-12 generate OFDM frames for transmitting data of TS0 to TS12 with the segments No. 0 to No. 12, respectively, and output the OFDM frames to the power adjusting units 13-1 to 13-12.

The power adjusting units 13-0 to 13-12 of the power adjusting unit 13 adjust the power of the signals of the OFDM frames provided from the OFDM frame generating units 12-0 to 12-12, respectively, in accordance with the control of the power control unit 18.

When an OFDM signal transmitted by the transmission device 1 is a signal as shown in FIG. 3A, for example, the power adjusting unit 13-0 adjusts the power of the signal of the OFDM frame of the segment No. 0 provided from the OFDM frame generating unit 12-0 so that it becomes the power P3. The power adjusting unit 13-1 adjusts the power of the signal of the OFDM frame of the segment No. 1 provided from the OFDM frame generating unit 12-1 so that it becomes the power P2. The power adjusting units 13-0 to 13-12 respectively output the signals of the OFDM frames of the segments, of which power has been adjusted, to the IFFT input allocation unit 14.

The IFFT input allocation unit 14 allocates, to the carriers, the signals of the OFDM frames of the segments provided from the power adjusting units 13-0 to 13-12, and outputs the signals to the IFFT calculation unit 15.

The IFFT calculation unit 15 collectively applies IFFT calculation on the signal provided by the IFFT input allocation unit 14, and generates the OFDM signal in time domain. The IFFT calculation unit 15 outputs the generated OFDM signal to the GI adding unit 16.

The GI adding unit 16 copies a portion of the latter half of each effective symbol to the head of each effective symbol of the OFDM signal provided from the IFFT calculation unit 15, thereby adding GI (Guard Interval), and generates an OFDM signal constituted by OFDM symbols. The GI adding unit 16 outputs the generated OFDM signal to the transmission unit 17.

The transmission unit 17 performs, e.g., upconvert of the OFDM signal provided from the GI adding unit 16, and transmits the OFDM signal from an antenna.

The power control unit 18 outputs information indicating the power of the signal of each segment to the power adjusting unit 13 and the PSI/SI generating unit 19.

The PSI/SI generating unit 19 generates PSI/SI for the TS of each segment, and outputs the PSI/SI to the TS generating units 11-0 to 11-12. For example, the PSI/SI multiplexed in the TS0 is provided to the TS generating unit 11-0, and the PSI/SI multiplexed in the TS1 is provided to the TS generating unit 11-1.

[Example Using Area Delivery System Descriptor of NIT]

In order to notify the power information, for example, an area delivery system descriptor is used. The name of the area delivery system descriptor is a name temporarily used as the name of information for notifying the power information in the area broadcast system. The name of the descriptor can be changed as necessary.

The area delivery system descriptor included in the NIT just like the terrestrial delivery system descriptor. The terrestrial delivery system descriptor is information indicating physical condition of a terrestrial transmission path, and is defined in 6.2.31 of ARIB STD-B10 4.9.

FIG. 6 is a figure showing an example of a data structure of area delivery system descriptor.

area_code is a 12 bit field, and indicates a code of service area.

guard_interval (guard interval) is a 2 bit field, and indicates a guard interval length. FIG. 7 is a figure showing meaning of a value of guard_interval. For example, when the guard_interval is 00, this indicates that the guard interval length is 1/32.

transmission_mode (mode information) is a 2 bit field, and indicates a transmission mode. FIG. 8 is a figure showing meaning of a value of transmission_mode. When the transmission_mode is 00, this indicates that the transmission mode is Mode 1. When the transmission_mode is 01, this indicates that the transmission mode is Mode 2. When the transmission_mode is 10, this indicates that the transmission mode is Mode 3. In the ARIB STD-B10, three transmission modes of which OFDM carrier intervals are different are defined.

transmission_power (segment in question transmission power) is a 4 bit field, and indicates the power of the signal of the segment in question with respect to the reference power. For example, the transmission_power of the area delivery system descriptor included in the NIT of ISO transmitted in the segment No. 0 indicates the power of the signal of the segment No. 0, which is the segment in question, with respect to the reference power.

FIG. 9 is a figure showing meaning of a value of transmission_power.

When the transmission_power is 1111, this indicates that the power of the signal of the segment in question with respect to the reference power is 0 dB. When the transmission_power is 1110, this indicates that the power of the signal of the segment in question with respect to the reference power is −3 dB. When the transmission_power is 1101, this indicates that the power of the signal of the segment in question with respect to the reference power is −6 dB. When the transmission_power is 1100, this indicates that the power of the signal of the segment in question with respect to the reference power is −9 dB. Other values of transmission_power are associated with db values indicating the power of the signal of the segment in question with respect to the reference power.

adjacent_transmission_power of FIG. 6 (upper adjacent segment transmission power) is a 4 bit field, and indicates the power of the signal of the upper adjacent segment with respect to the reference power. For example, adjacent_transmission_power of the area delivery system descriptor included in the NIT of TS0 transmitted in the segment No. 0 indicates the transmission power of the signal of the segment No. 1 with respect to the reference power.

Each value of adjacent_transmission_power has the same meaning as the meaning of each value of transmission_power as shown in FIG. 9. More specifically, when the adjacent_transmission_power is 1111, this indicates that the power of the signal of the upper adjacent segment with respect to the reference power is 0 dB. When the adjacent_transmission_power is 1110, this indicates that the power of the signal of the upper adjacent segment with respect to the reference power is −3 dB. Other values of adjacent_transmission_power are associated with dB values indicating the power of the signal of the upper adjacent segment with respect to the reference power.

frequency of FIG. 6 (frequency) is a 16 bit field, and indicates the central frequency of the segment in question. The frequency unit is 1/7 MHz which is the same as the tuning step of the terrestrial digital broadcast method. In a case of MFN, multiple used frequencies are described.

The reception device 2 can identify the power of the signal of the segment in question on the basis of transmission_power of the area delivery system descriptor included in the NIT as the power information. The reception device 2 can identify the power of the signal of the upper adjacent segment on the basis of adjacent_transmission_power.

FIG. 10 is a figure showing another example of data structure of area delivery system descriptor.

The data structure as shown in FIG. 10 is different from the data structure of FIG. 6 in that adjacent_transmission_power_delta is included instead of adjacent_transmission_power. Repeated explanation is omitted.

adjacent_transmission_power_delta (difference from the upper adjacent segment transmission power) is a 4 bit field. The adjacent_transmission_power_delta indicates the power of the signal of the segment in question with respect to the upper adjacent segment. More specifically, the adjacent_transmission_power_delta indicates difference between the power of the signal of the segment in question and the power of the signal of the upper adjacent segment. For example, the adjacent_transmission_power_delta of the area delivery system descriptor included in the NIT of TS0 transmitted in the segment No. 0 indicates the power of the signal of the segment No. 0 with respect to the power of the signal of the segment No. 1.

FIG. 11 is a figure showing meaning of a value of adjacent_transmission_power_delta.

When the adjacent_transmission_power_delta is 1111, this indicates that the power of the signal of the segment in question with respect to the power of the signal of the upper adjacent segment is 0 dB. When the adjacent_transmission_power_delta is 0001, this indicates that the power of the signal of the segment in question with respect to the power of the signal of the upper adjacent segment is 3 dB. When the adjacent_transmission_power_delta is 0010, this indicates that the power of the signal of the segment in question with respect to the power of the signal of the upper adjacent segment is 6 dB. Other values of adjacent_transmission_power_delta are respectively associated with dB values indicating the power of the signal of the segment in question with respect to the power of the signal of the upper adjacent segment.

The reception device 2 can identify the power of the signal of the segment in question on the basis of transmission_power of the area delivery system descriptor included in the NIT as the power information. The reception device 2 can identify the power of the signal of the upper adjacent segment on the basis of the power of the signal of the segment in question and the power indicated by the adjacent_transmission_power_delta.

[Example of Use of Connected-Transmission Descriptor of NIT]

In order to notify the power information, the additional_connected_transmission_info of the connected-transmission descriptor (connected_transmission_descriptor) may be used.

The connected-transmission descriptor is information indicating physical condition of a terrestrial transmission path during connected-transmission, and is also defined in 6.2.41 of ARIB STD-B10 4.9.

FIG. 12 is a figure showing an example of a data structure of connected-transmission descriptor.

connected_transmission_group_id (connected-transmission group identification) is a 16 bit field, and is information which becomes a label for identifying a connected-transmission group.

segment_type (segment format type) is a 2 bit field, and indicates the type of the segment format.

modulation_type_A (modulation method type A) is a 2 bit field, and indicates the type of the modulation method of the hierarchy A. The modulation method includes differential modulation and synchronous modulation.

modulation_type_B (modulation method type B) is a 2 bit field, and indicates the type of the modulation method of the hierarchy B.

modulation_type_C (modulation method type C) is a 2 bit field, and indicates the type of the modulation method of the hierarchy C.

additional_connected_transmission_info is an 8 bit field, and is used as power information for notifying the power of the signal.

FIG. 13A is a figure showing a first example of meaning of the values of the additional_connected_transmission_info. In this example, upper 4 bits of the additional_connected_transmission_info indicates the power of the signal of the segment in question with respect to the reference power, and lower 4 bits indicates the power of the signal of the upper adjacent segment with respect to the reference power.

The values of upper 4 bits are associated with the same meaning as the meaning of the values of the transmission_ power as shown in FIG. 9. When the upper 4 bits of the additional_connected_transmission_info is 1111, this indicates that the power of the signal of the segment in question with respect to the reference power is 0 dB. When the upper 4 bits of the additional_connected_transmission_info is 1110, this indicates that the power of the signal of the segment in question with respect to the reference power is −3 dB.

Each of the values of the lower 4 bits is associated with the same meaning as the meaning of each value of the transmission_power as shown in FIG. 9. When the lower 4 bits of the additional_connected_transmission_info is 1111, this indicates that the power of the signal of the upper adjacent segment with respect to the reference power is 0 dB. When the lower 4 bits of the additional_connected_transmission_info is 1110, this indicates that the power of the signal of the upper adjacent segment with respect to the reference power is −3 dB.

FIG. 13B is a figure showing a second example of meaning of the values of the additional_connected_transmission_info. In this example, upper 4 bits of the additional_connected_transmission_info indicates the power of the signal of the segment in question with respect to the reference power, and lower 4 bits of the additional_connected_transmission_info indicates the power of the signal of the segment in question with respect to the upper adjacent segment.

The values of upper 4 bits are associated with the same meaning as the meaning of the values of the transmission_power as shown in FIG. 9.

Each of the values of the lower 4 bits is associated with the same meaning as the meaning of each value of the adjacent_transmission_power_delta as shown in FIG. 11. More specifically, when the lower 4 bits of the additional_connected_transmission_info is 1111, this indicates that the power of the signal of the segment in question with respect to the power of the signal of the upper adjacent segment is 0 dB. When the lower 4 bits of the additional_connected_transmission_info is 0001, this indicates that the power of the signal of the segment in question with respect to the power of the signal of the upper adjacent segment is 3 dB.

FIG. 13C is a figure showing a third example of meaning of the values of the additional_connected_transmission_info. In this example, upper 4 bits of the additional_connected_transmission_info is a fixed value of 1111, and lower 4 bits thereof is the power of the signal of the segment in question with respect to the power of the signal of the upper adjacent segment.

In this case, each of the values of the lower 4 bits is associated with the same meaning as the meaning of each value of the adjacent_transmission_power_delta as shown in FIG. 11.

As described above, the PSI/SI generating unit 19 of FIG. 5 generates an area delivery system descriptor describing the power information or PSI/SI such as the NIT including the connected-transmission descriptor, and multiplexes it into the TS of each segment, thus notifying the power of the signal of each segment to the reception side.

Figure 14:
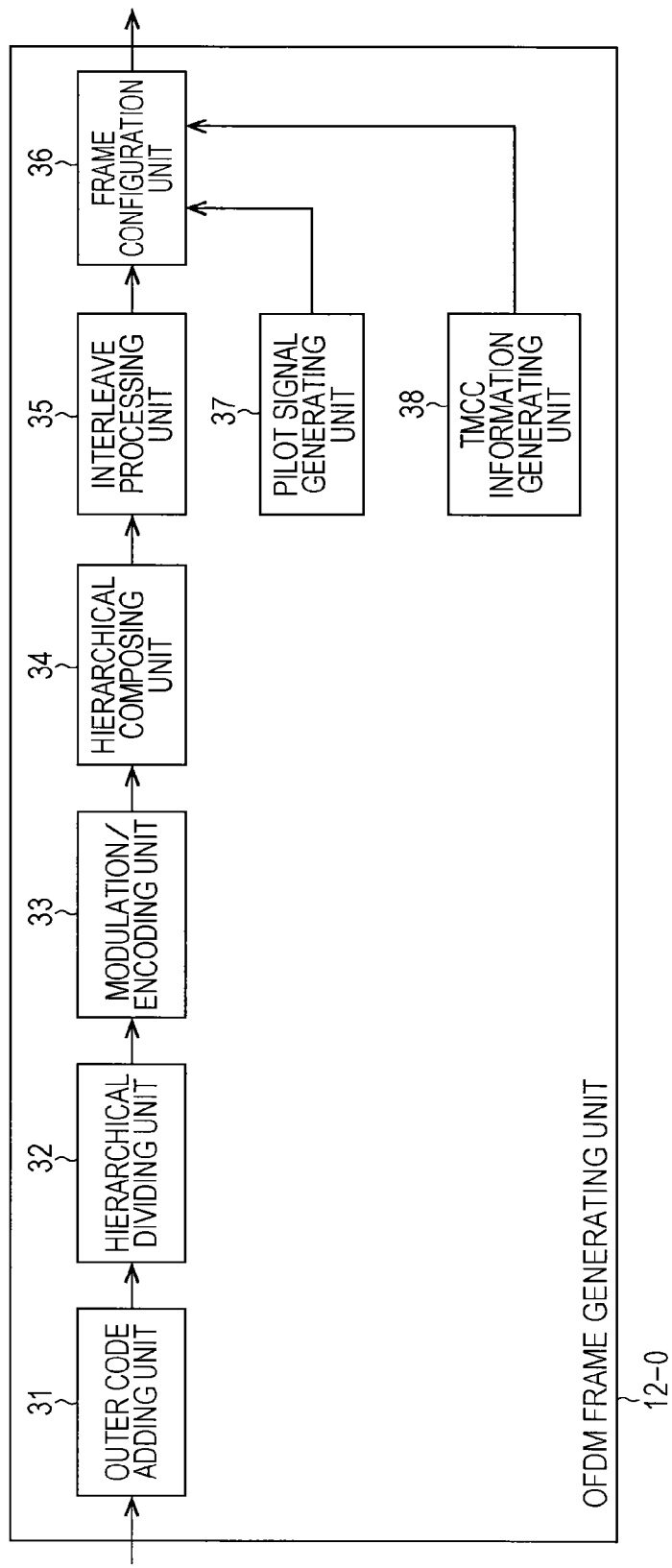
FIG. 14 is a block diagram showing an example of structure of an OFDM frame generating unit of FIG. 5.

FIG. 14 is a block diagram showing an example structure of the OFDM frame generating unit 12-0 of FIG. 5. The OFDM frame generating units 12-1 to 12-12 also have the same configuration.

The OFDM frame generating unit 12-0 includes an outer code adding unit 31, a hierarchical dividing unit 32, a modulation/encoding unit 33, a hierarchical composing unit 34, an interleave processing unit 35, a frame configuration unit 36, a pilot signal generating unit 37, and a TMCC information generating unit 38. TS0 generated by the TS generating unit 11-0 is input into the outer code adding unit 31.

The outer code adding unit 31 adds an outer code such as an RS code to data of TS0 in units of 188 bytes, and outputs the data to the hierarchical dividing unit 32.

The hierarchical dividing unit 32 divides the data provided by the outer code adding unit 31 in a hierarchical manner, and outputs each hierarchical data to the modulation/encoding unit 33.

The modulation/encoding unit 33 applies baseband processing such as error correction encoding and interleaving on each hierarchical data, and modulates the data with a carrier, and thereafter outputs the modulated data to the hierarchical composing unit 34.

The hierarchical composing unit 34 composes the hierarchical data provided by the modulation/encoding unit 33 in a hierarchical manner, and outputs the hierarchically composed data to the interleave processing unit 35.

The interleave processing unit 35 applies time interleaving and frequency interleaving to the data provided by the hierarchical composing unit 34 in order to ensure mobile reception performance and anti-multipass performance, and outputs the data to the frame configuration unit 36.

The frame configuration unit 36 generates an OFDM frame on the basis of the data provided by the interleave processing unit 35, the pilot signal provided by the pilot signal generating unit 37, and the TMCC information provided by the TMCC information generating unit 38. The OFDM frame also includes AC (Auxiliary Channel) which is supplementary information. The signal of the OFDM frame which is output from the frame configuration unit 36 is input into the power adjusting unit 13.

The pilot signal generating unit 37 generates a pilot signal including CP and SP (Scattered Pilot) used for ensuring synchronization at the reception device 2, and outputs the pilot signal to the frame configuration unit 36.

The TMCC information generating unit 38 generates TMCC information which is control information for helping demodulation and decoding operation of the reception device 2, and outputs the TMCC information to the frame configuration unit 36.

Figure 15:
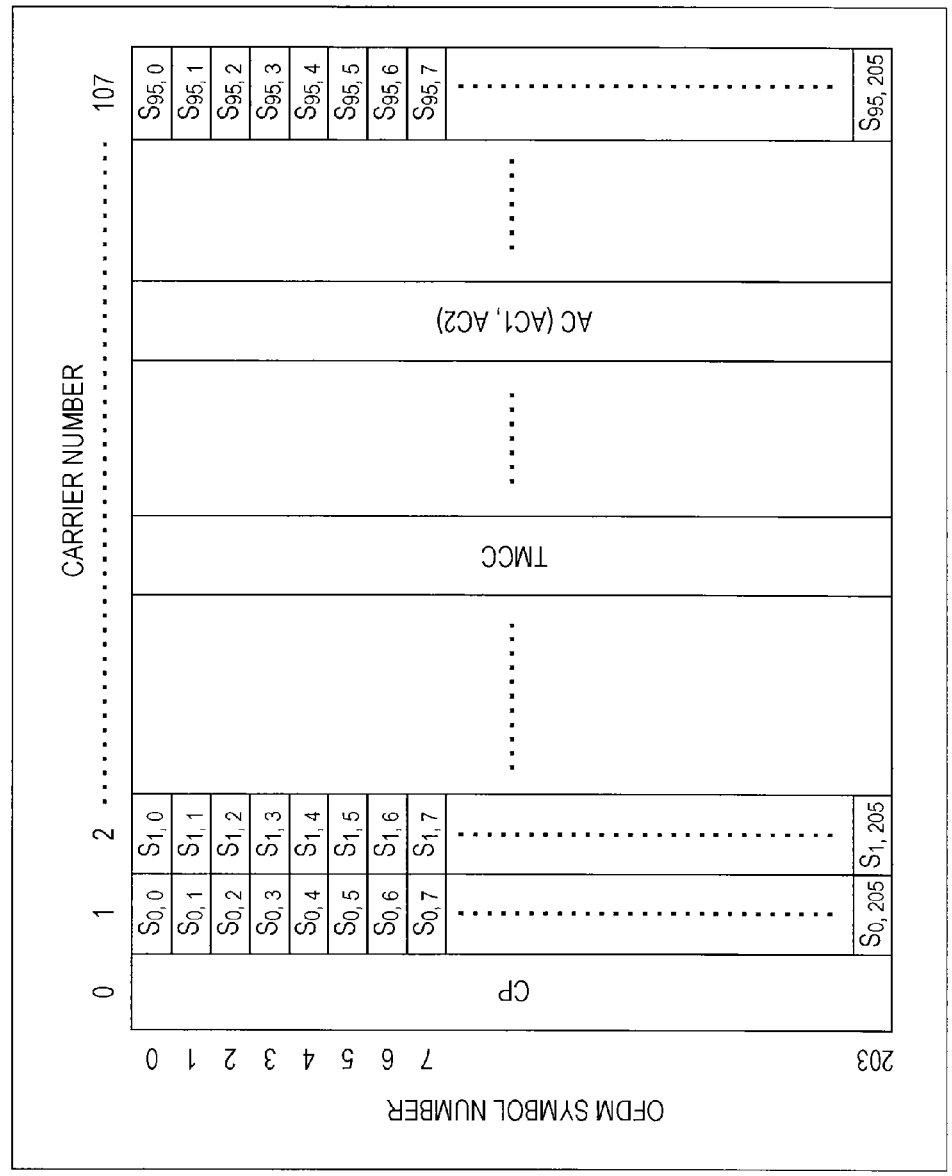
FIG. 15 is a figure showing a configuration of an OFDM segment.

FIG. 15 is a figure showing a configuration of an OFDM segment generated by the transmission device 1.

The configuration as shown in FIG. 15 is a configuration of differential modulation unit in a case where the transmission mode is Mode 1 (108 carriers). Each OFDM segment generated by the transmission device 1 is configured by arranging OFDM symbols of data of TS and OFDM symbols of CP, TMCC information, and the like into each carrier.

[Configuration of Reception Device 2]

Figure 16:
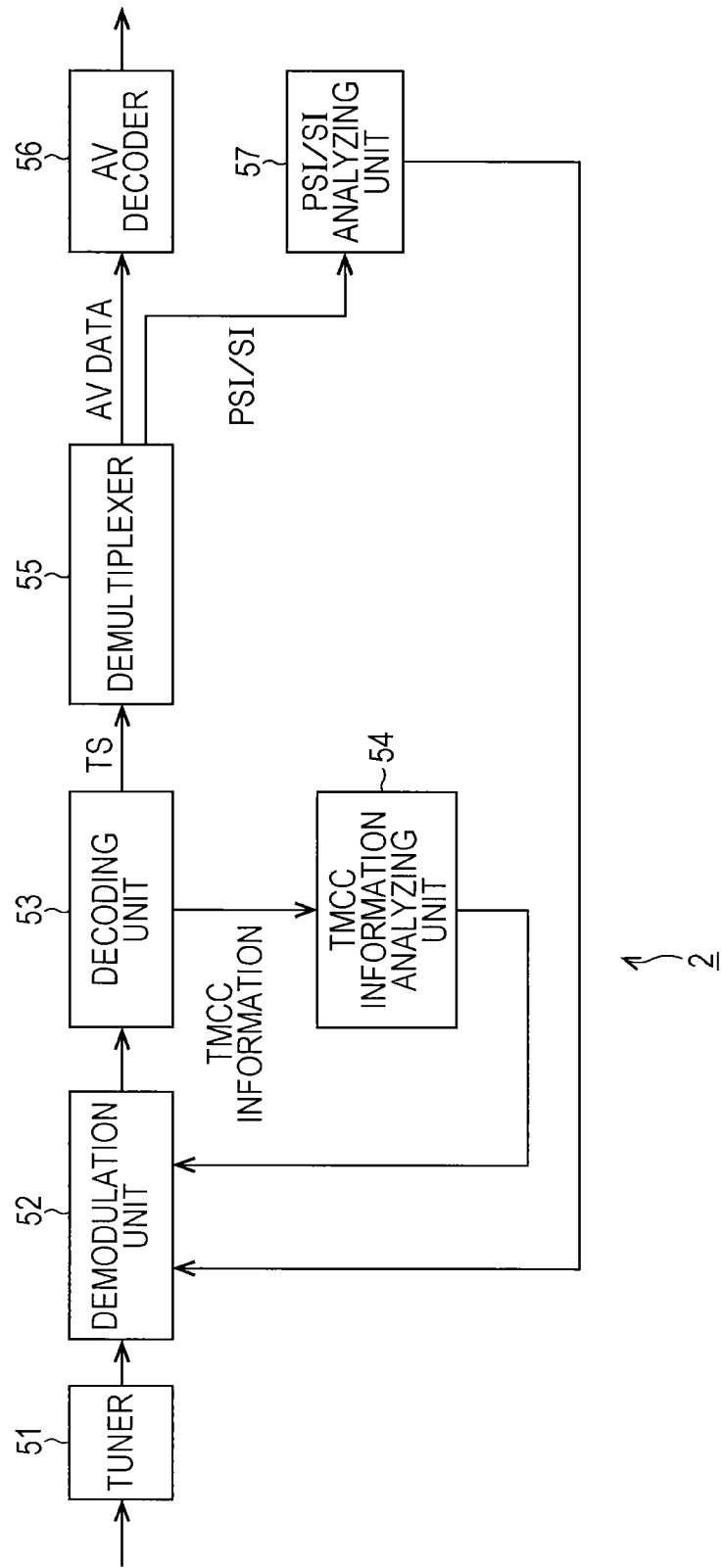
FIG. 16 is a block diagram showing an example structure of the reception device.

FIG. 16 is a block diagram showing an example structure of reception device 2.

The reception device 2 includes a tuner 51, a demodulation unit 52, a decoding unit 53, a TMCC information analyzing unit 54, a demultiplexer 55, an AV decoder 56, and a PSI/SI analyzing unit 57. The RF signal received by an antenna, not shown is input into the tuner 51.

The tuner 51 converts the received RF signal converts into an IF signal, and outputs the IF signal to the demodulation unit 52.

The demodulation unit 52 applies A/D conversion and orthogonal demodulation to the IF signal provided by the tuner 51, and applies the FFT calculation on the OFDM signal in time domain thus obtained. The demodulation unit 52 extracts a pilot signal from the OFDM signal in frequency domain which is obtained by applying the FFT calculation, and estimates the transmission path characteristic, and thereafter, performs equalization, and outputs the equalized OFDM signal to the decoding unit 53.

The decoding unit 53 applies decoding processing such as error correction, de-interleaving, and the like to the equalized OFDM signal provided from the demodulation unit 52, and outputs the TS, which is transmitted in the segment in question, to the demultiplexer 55. The decoding unit 53 outputs the TMCC information obtained by the decoding processing to the TMCC information analyzing unit 54.

The TMCC information analyzing unit 54 analyzes the TMCC information provided by the decoding unit 53, and controls the demodulation processing of the demodulation unit 52.

The demultiplexer 55 outputs the AV data multiplexed in the TS to the AV decoder 56, and outputs the PSI/SI to the PSI/SI analyzing unit 57.

The AV decoder 56 decodes the AV data separated from the TS by the demultiplexer 55, and outputs video data and audio data.

The PSI/SI analyzing unit 57 analyzes the PSI/SI separated from the TS by the demultiplexer 55, and obtains the power information included in the NIT. The PSI/SI analyzing unit 57 controls the demodulation processing of the demodulation unit 52 on the basis of the obtained power information.

For example, when the PSI/SI analyzing unit 57 performs equalization using not only the pilot signal of the segment in question but also the signal of the lower end carrier of the upper adjacent segment, the PSI/SI analyzing unit 57 controls the demodulation unit 52 to correct the power of the signal of the upper adjacent segment. The PSI/SI analyzing unit 57 causes the equalization to be done using the pilot signal of the segment in question and the signal of the lower end carrier of the upper adjacent segment of which power has been corrected. As explained with reference to FIG. 4, the signal of the lower end carrier of the upper adjacent segment is used as necessary for the equalization of the signal in each segment. The details of the demodulation processing that is performed by the demodulation unit 52 will be explained later with reference to a flowchart.

Figure 17:
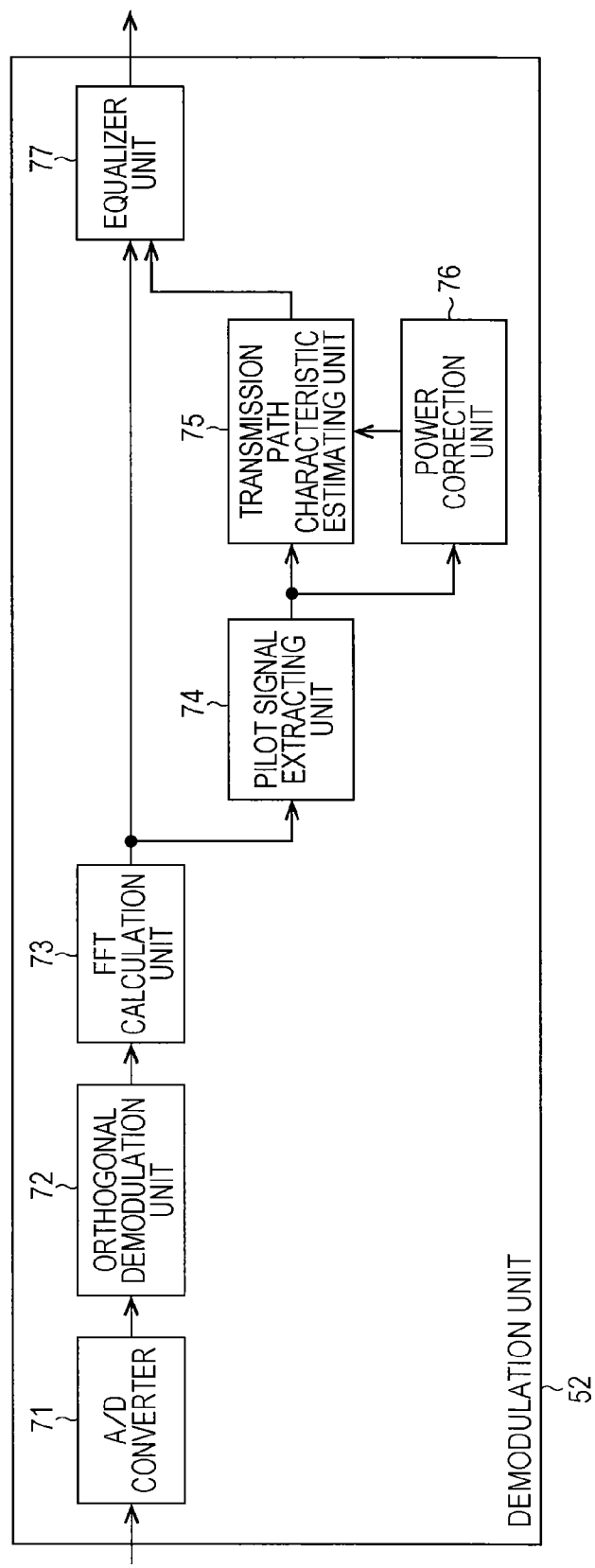
FIG. 17 is a block diagram showing an example structure of a demodulation unit of FIG. 16.

FIG. 17 is a block diagram showing an example structure of the demodulation unit 52.

The demodulation unit 52 includes an A/D conversion unit 71, an orthogonal demodulation unit 72, an FFT calculation unit 73, a pilot signal extracting unit 74, a transmission path characteristic estimating unit 75, a power correction unit 76, and an equalizer unit 77. The IF signal which is output from the tuner 51 is input into the A/D conversion unit 71.

The A/D conversion unit 71 applies the A/D conversion to the IF signal provided by the tuner 51, and outputs the digital IF signal to the orthogonal demodulation unit 72.

The orthogonal demodulation unit 72 performs orthogonal demodulation, thus obtaining an OFDM signal in time domain from the IF signal provided by the A/D conversion unit 71, and outputs the OFDM signal to the FFT calculation unit 73.

In accordance with the FFT interval which is set by a control unit, not shown, the FFT calculation unit 73 extracts a signal in a range of effective symbols by removing a signal in a range of GI from the signal of a single OFDM symbol. The FFT calculation unit 73 performs FFT calculation onto a signal in a range of the effective symbols extracted, thereby extracting data modulated in each sub-carrier in an orthogonal manner, and outputs the OFDM signal in frequency domain representing the extracted data. The OFDM signal in frequency domain which is output from the FFT calculation unit 73 is provided to the pilot signal extracting unit 74 and the equalizer unit 77.

The pilot signal extracting unit 74 extracts the pilot signals of SP, CP from the OFDM signal in frequency domain provided by the FFT calculation unit 73, and outputs the pilot signals of SP, CP to the transmission path characteristic estimating unit 75 and the power correction unit 76.

The transmission path characteristic estimating unit 75 estimates a transmission path characteristic of a carrier at an arrangement position of a pilot signal, on the basis of the pilot signal provided by the pilot signal extracting unit 74, and estimates a transmission path characteristic of each carrier at the position of each OFDM symbol by interpolation. When the transmission path characteristic estimating unit 75 performs the equalization using not only the pilot signal of the segment in question but also the lower end carrier of the upper adjacent segment, the transmission path characteristic estimating unit 75 uses the signal, of which power is corrected by the power correction unit 76, for estimating the transmission path characteristic.

The power correction unit 76 corrects the power of the pilot signal provided by the pilot signal extracting unit 74 on the basis of the power information provided by the PSI/SI analyzing unit 57. The power correction unit 76 corrects the power when, for example, the power of the signal of the segment in question and the power of the signal of the upper adjacent segment are different, and the signal of the lower end carrier of the upper adjacent segment is used for the equalization. The power correction unit 76 corrects the power of the signal of the lower end carrier of the upper adjacent segment so that it becomes the same as the power of the signal of the segment in question, for example, and outputs the signal of the lower end carrier of the upper adjacent segment, of which power has been corrected, to the transmission path characteristic estimating unit 75.

The equalizer unit 77 removes the component of transmission path distortion included in the OFDM signal in frequency domain provided by the FFT calculation unit 73, on the basis of the transmission path characteristic estimated by the transmission path characteristic estimating unit 75, and outputs the equalized OFDM signal.

[Operation of Transmission Device 1 and Reception Device 2]

In this case, operation of the transmission device 1 and the reception device 2 having the above configuration will be explained.

Transmission Processing a of Transmission Device 1

Figure 18:
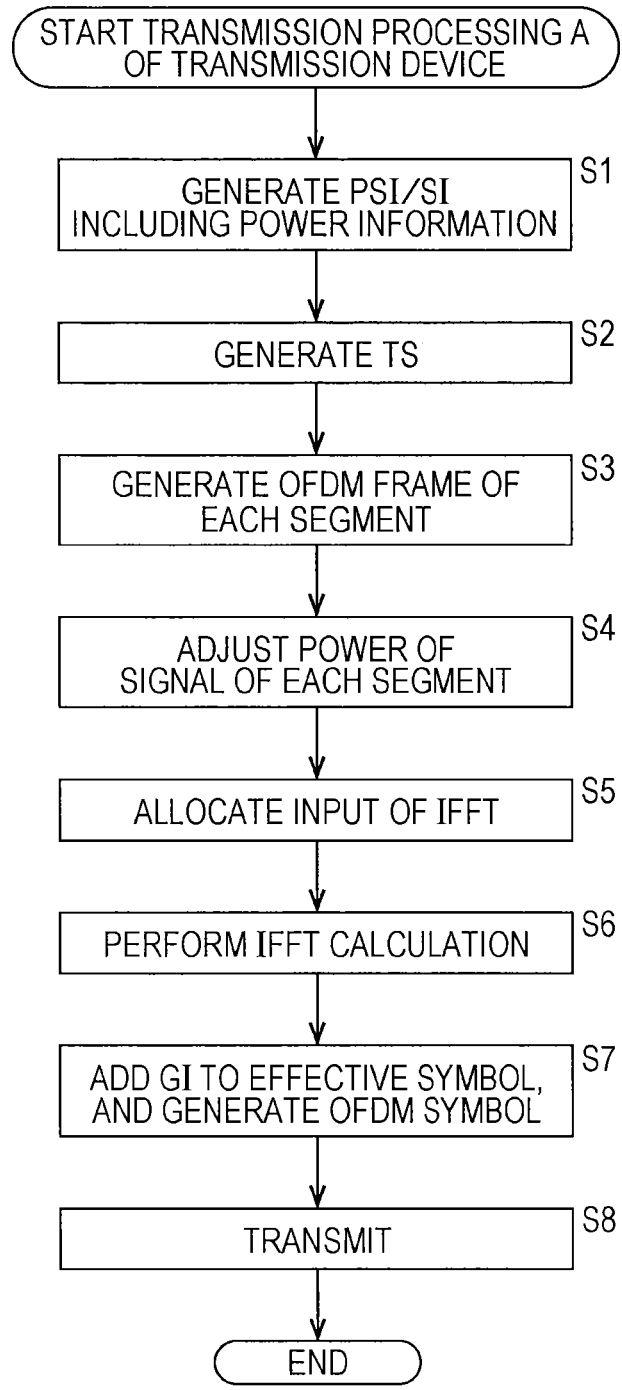
FIG. 18 is a flowchart for explaining transmission processing A of the transmission device.

First, the transmission processing A of the transmission device 1 will be explained with reference to a flowchart in FIG. 18. The processing in each step is performed in parallel with processing in other steps or performed before or after processing in other steps as necessary. The processing in another flowchart may also be performed in a similar manner. The processing in FIG. 18 is started when, for example, AV data are input from the outside.

In step S1, the PSI/SI generating unit 19 generates the PSI/SI including the power information of each segment multiplexed into the TS transmitted in each segment of the segments No. 0 to No. 12. The NIT of PSI/SI generated by the PSI/SI generating unit 19 includes the connected-transmission descriptor and the area delivery system descriptor including the power information.

In step S2, the TS generating units 11-0 to 11-12 respectively multiplex the AV data which are input from the outside and the PSI/SI generated by the PSI/SI generating unit 19, thus generating TS.

In step S3, the OFDM frame generating units 12-0 to 12-12 respectively generate signals of OFDM frames.

In step S4, the power adjusting units 13-0 to 13-12 adjust the powers of the signals generated by the OFDM frame generating units 12-0 to 12-12, respectively, so that the power of a signal of a segment close to an end of the channel is smaller than the power of a signal of a segment close to the center.

In step S5, the IFFT input allocation unit 14 allocates, to a carrier, the signal of each segment of which power is adjusted by the power adjusting units 13-0 to 13-12.

In step S6, the IFFT calculation unit 15 collectively applies the IFFT calculation to the signals of the OFDM frames of 13 segments, and generates the OFDM signal in time domain.

In step S7, the GI adding unit 16 adds GI to each effective symbol constituting the OFDM signal in time domain, and generates the OFDM signal constituted by the OFDM symbols.

In step S8, the transmission unit 17 transmits the OFDM signal constituted by the OFDM symbols from an antenna, not shown.

According to the above processing, the OFDM signal of 13 segments of which power has been adjusted as shown in FIG. 3A is transmitted by connected-transmission, and the power of the signal of each segment is notified to the reception device 2 by the PSI/SI. The powers of the signals of segments close to both ends of the channel are adjusted to become smaller, whereby this can suppress the interference to the adjacent channels.

Reception Processing A1 of Reception Device 2

Figure 19:
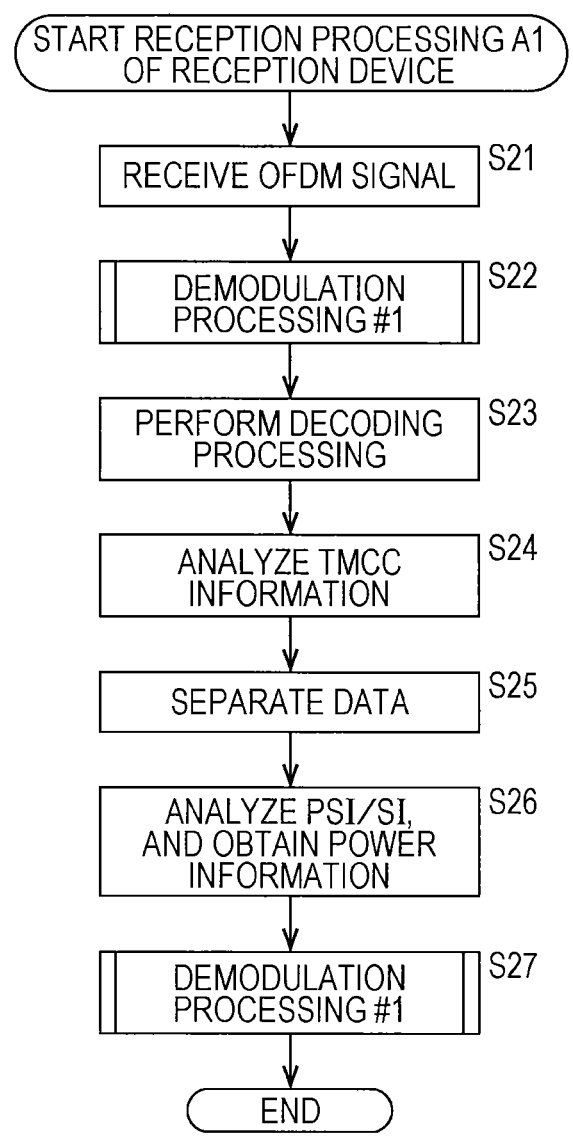
FIG. 19 is a flowchart for explaining reception processing A1 of the reception device.

Subsequently, the reception processing A1 of the reception device 2 will be explained with reference to a flowchart in FIG. 19. The processing of FIG. 19 is processing for performing equalization without using the signal of the lower end carrier of the upper adjacent segment at all times. In the equalization with the demodulation unit 52, only the pilot signal of the segment in question is used.

In step S21, the tuner 51 receives the OFDM signal (RF signal), and converts the OFDM signal into an IF signal, and outputs the IF signal to the demodulation unit 52.

In step S22, the demodulation unit 52 performs demodulation processing #1. The demodulation processing #1 will be explained later with reference to a flowchart in FIG. 20. The equalized OFDM signal obtained by the demodulation processing #1 is provided to the decoding unit 53.

In step S23, the decoding unit 53 applies decoding processing such as error correction, de-interleaving, and the like to the equalized OFDM signal, and outputs the TS, which is transmitted in the segment in question, to the demultiplexer 55. The decoding unit 53 outputs the TMCC information obtained by the decoding processing to the TMCC information analyzing unit 54.

In step S24, the TMCC information analyzing unit 54 analyzes the TMCC information, and provides information included in the TMCC information to the demodulation unit 52 as necessary.

In step S25, the demultiplexer 55 separates the AV data and the PSI/SI from the TS.

In step S26, the PSI/SI analyzing unit 57 analyzes the PSI/SI separated from the TS by the demultiplexer 55, and obtains the power information included from the area delivery system descriptor or the connected-transmission descriptor included in the NIT. In the processing of FIG. 19, the signal of the lower end carrier of the upper adjacent segment is not used for the equalization of the OFDM signal. The power information obtained from the PSI/SI is, for example, discarded.

In step S27, the demodulation unit 52 performs demodulation processing #1. The processing performed in step S27 is the same as the processing performed in step S22. After the demodulation processing #1 is performed in step S27, the above processing such as the decoding processing is repeatedly performed. The AV decoder 56 decodes the AV data separated from the TS by the demultiplexer 55, and the video data and the audio data are output to the outside.

Demodulation Processing #1

The demodulation processing #1 performed in steps S22, S27 of FIG. 19 will be explained with reference to a flowchart in FIG. 20.

In step S41, the A/D conversion unit 71 performs A/D conversion on the IF signal provided from the tuner 51.

In step S42, the orthogonal demodulation unit 72 performs orthogonal demodulation to generate the OFDM signal in time domain.

In step S43, the FFT calculation unit 73 performs FFT calculation on the OFDM signal in time domain, and generates the OFDM signal in frequency domain.

In step S44, the pilot signal extracting unit 74 extracts only the pilot signal of the segment in question from the OFDM signal in frequency domain provided from the FFT calculation unit 73.

In step S45, the transmission path characteristic estimating unit 75 estimates a transmission path characteristic on the basis of the pilot signal of the segment in question extracted by the pilot signal extracting unit 74.

In step S46, the equalizer unit 77 removes the component of transmission path distortion included in the OFDM signal in frequency domain provided by the FFT calculation unit 73, on the basis of the transmission path characteristic estimated by the transmission path characteristic estimating unit 75, and outputs the equalized OFDM signal in frequency domain. After the equalized OFDM signal in frequency domain is output, steps S22, S27 of FIG. 19 are performed again, and subsequent processing is performed.

As described above, only the pilot signal of the segment in question may be used to estimate the transmission path characteristic, and the OFDM signal may be equalized.

Reception Processing A2 of Reception Device 2

Subsequently, the reception processing A2 of the reception device 2 will be explained with reference to a flowchart in FIG. 21. The processing of FIG. 21 is processing such that when the power of the signal of the segment in question and the power of the signal of the upper adjacent segment are the same, the equalization is performed using the signal of the lower end carrier of the upper adjacent segment, and when the power of the signal of the segment in question and the power of the signal of the upper adjacent segment are different, the equalization is performed without using the signal of the lower end carrier of the upper adjacent segment.

Figure 21:
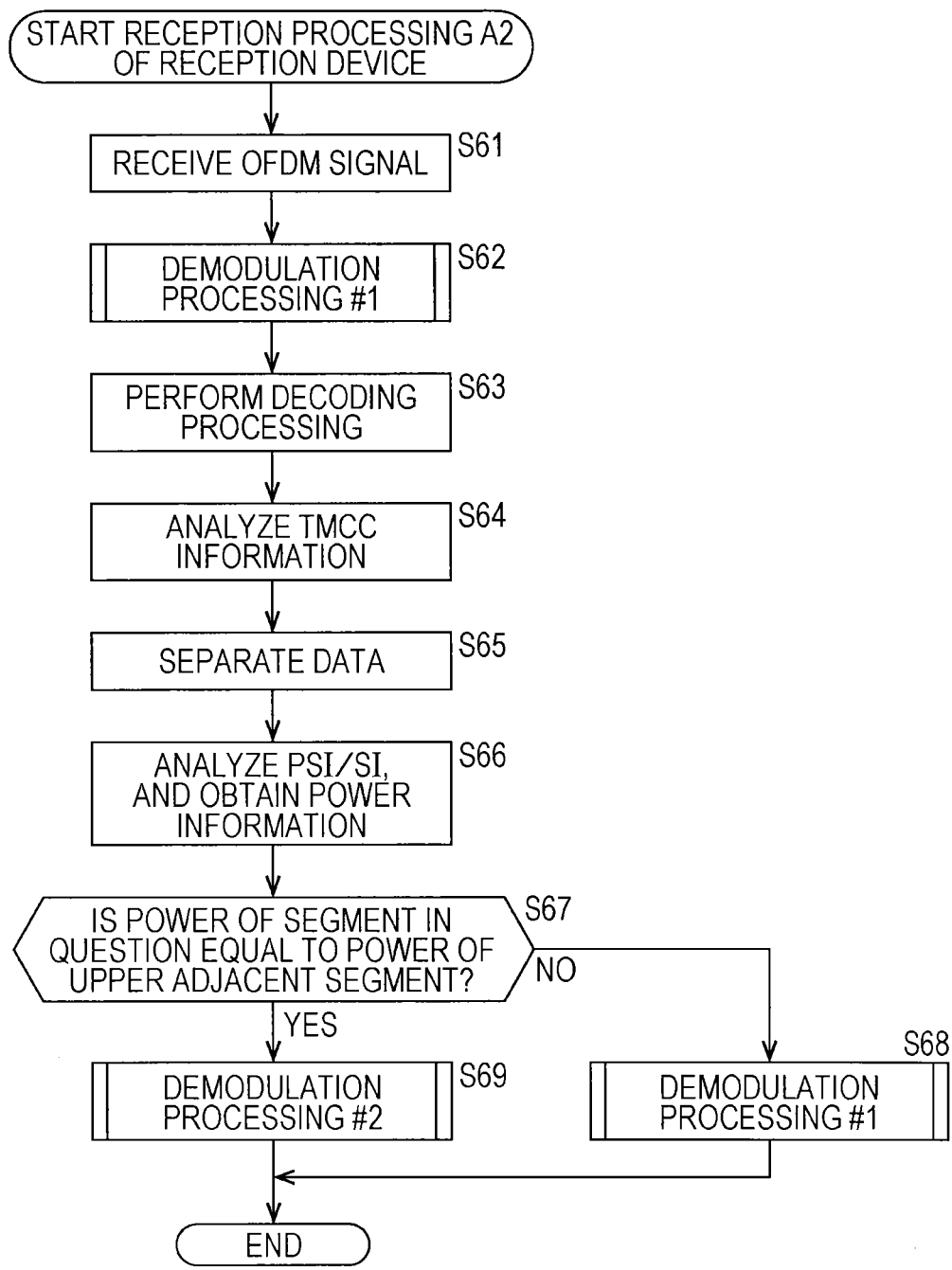
FIG. 21 is a flowchart for explaining reception processing A2 of the reception device.

The processing of steps S61 to S66 of FIG. 21 is the same processing as the processing of steps S21 to S26 of FIG. 19. More specifically, In step S61, the tuner 51 receives the OFDM signal, and converts the OFDM signal into an IF signal, and outputs the IF signal to the demodulation unit 52.

Figure 20:
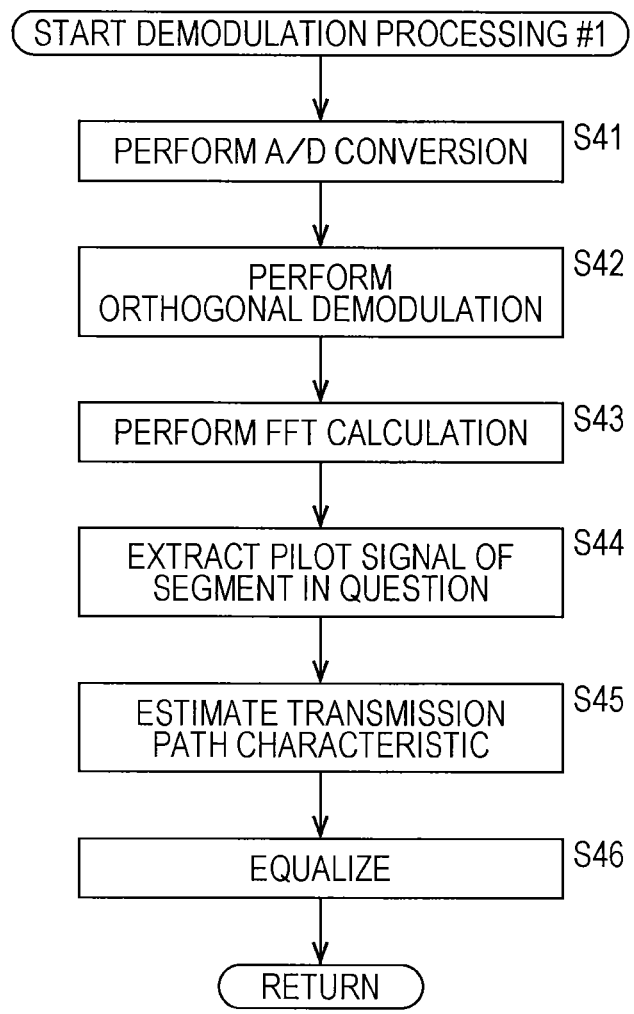
FIG. 20 is a flowchart for explaining demodulation processing #1 that is performed in steps S22, S27 of FIG. 19.

In step S62, the demodulation unit 52 performs the demodulation processing #1 of FIG. 20.

In step S63, the decoding unit 53 applies the decoding processing on the equalized OFDM signal and outputs the TS to the demultiplexer 55, and outputs the TMCC information to the TMCC information analyzing unit 54.

In step S64, the TMCC information analyzing unit 54 analyzes the TMCC information, and provides information included in the TMCC information to the demodulation unit 52 as necessary.

In step S65, the demultiplexer 55 separates the AV data and the PSI/SI from the TS.

In step S66, the PSI/SI analyzing unit 57 analyzes the PSI/SI separated from the TS by the demultiplexer 55, and obtains the power information included from the area delivery system descriptor or the connected-transmission descriptor included in the NIT.

In step S67, the PSI/SI analyzing unit 57 determines whether the power of the signal of the segment in question and the power of the signal of the upper adjacent segment are the same or not.

For example, when the area delivery system descriptor of FIG. 6 is used for the notification of the power, the PSI/SI analyzing unit 57 makes determination using the transmission_power and the adjacent_transmission_power. As described above, the transmission_power indicates the transmission power of the signal of the segment in question, and the adjacent_transmission_power indicates the transmission power of the signal of the upper adjacent segment. When the value of the transmission_power and the value of the adjacent_transmission_power are the same, the PSI/SI analyzing unit 57 determines that the power of the signal of the segment in question are the same as the power of the signal of the upper adjacent segment.

When the area delivery system descriptor of FIG. 10 is used for the notification of the power, the PSI/SI analyzing unit 57 makes determination using the adjacent_transmission_power_delta. The adjacent_transmission_power_delta indicates the difference between the transmission power of the signal of the segment in question and the upper adjacent segment transmission power. For example, when the value of the adjacent_transmission_power_delta is 1111 (FIG. 11), the PSI/SI analyzing unit 57 determines that the power of the signal of the segment in question and the power of the signal of the upper adjacent segment are the same.

When the connected-transmission descriptor of FIG. 12 is used for the notification of the power, the PSI/SI analyzing unit 57 makes determination using the additional_connected_transmission_info. The upper 4 bits and the lower 4 bits of the additional_connected_transmission_info respectively have the meanings explained with reference to FIGS. 13A to 13C.

In the case of the example of FIG. 13A, when the upper 4 bits and the lower 4 bits of the additional_connected_transmission_info are of the same value, the PSI/SI analyzing unit 57 determines that the power of the signal of the upper adjacent segment and the power of the signal of the upper adjacent segment are the same. In the cases of FIG. 13B or FIG. 13C, when the lower 4 bits of the additional_connected_transmission_info is 1111, the PSI/SI analyzing unit 57 determines that the power of the signal of the segment in question and the power of the signal of the upper adjacent segment are the same.

When the power of the signal of the segment in question and the power of the signal of the upper adjacent segment are determined to be different in step S67, the demodulation unit 52 performs the demodulation processing #1 in step S68. More specifically, in this case, only the pilot signal of the segment in question is used for the equalization.

On the other hand, when the power of the signal of the segment in question and the power of the signal of the upper adjacent segment are determined to be the same in step S67, the demodulation unit 52 performs the demodulation processing #2 in step S69. The demodulation processing #2 will be explained later with reference to a flowchart in FIG. 22.

In step S68, after the demodulation processing #1 is performed, or after the demodulation processing #2 is performed in step S69, the above processing such as the decoding processing is repeatedly performed.

Demodulation Processing #2

The demodulation processing #2 performed in step S69 of FIG. 21 will be explained with reference to a flowchart in FIG. 22.

In step S81, the A/D conversion unit 71 performs A/D conversion on the IF signal provided from the tuner 51.

In step S82, the orthogonal demodulation unit 72 performs orthogonal demodulation to generate the OFDM signal in time domain.

In step S83, the FFT calculation unit 73 performs FFT calculation on the OFDM signal in time domain, and generates the OFDM signal in frequency domain.

In step S84, the pilot signal extracting unit 74 extracts the pilot signal of the segment in question and the signal of the lower end carrier of the upper adjacent segment from the OFDM signal in frequency domain provided from the FFT calculation unit 73.

In step S85, the transmission path characteristic estimating unit 75 estimates a transmission path characteristic on the basis of the signal of the lower end carrier of the upper adjacent segment and the pilot signal of the segment in question extracted by the pilot signal extracting unit 74.

In step S86, the equalizer unit 77 removes the component of transmission path distortion included in the OFDM signal in frequency domain provided by the FFT calculation unit 73, on the basis of the transmission path characteristic estimated by the transmission path characteristic estimating unit 75, and outputs the equalized OFDM signal in frequency domain. After the equalized OFDM signal in frequency domain is output, step S69 of FIG. 21 is performed again, and subsequent processing is performed.

Hereinafter explained is a case where the signal of each segment is transmitted as shown in FIG. 3A. In this case, for example, during reception of the segment No. 6, the equalization is performed using not only the pilot signal of No. 6 which is the segment in question and the signal of the lower end carrier of the segment No. 7 which is the upper adjacent segment. Both of the powers of the segment No. 6 and the segment No. 7 are the power P0.

On the other hand, during reception of the segment No. 9, the equalization is performed using only the pilot signal of the segment No. 9 which is the segment in question and without using the signal of the lower end carrier of the segment No. 10 which is the upper adjacent segment.

As described above, only when the power of the signal of the segment in question is the same as the power of the signal of the upper adjacent segment, the equalization is performed also using the signal of the lower end carrier of the upper adjacent segment, so that the equalization is prevented from using a signal of different power. Even if the equalization is performed using the signal of the lower end carrier of the upper adjacent segment of which power is different as it is, an error may occur in the estimation result of the transmission path characteristic, and the equalization cannot be performed correctly, but this can be prevented.

Reception Processing A3 of Reception Device 2

Subsequently, the reception processing A3 of the reception device 2 will be explained with reference to a flowchart in FIG. 23. The processing in FIG. 23 is processing in which the power of the signal of the lower end carrier of the upper adjacent segment is corrected and used for the equalization when the power of the signal of the segment in question and the power of the signal of the upper adjacent segment are different.

Figure 23:
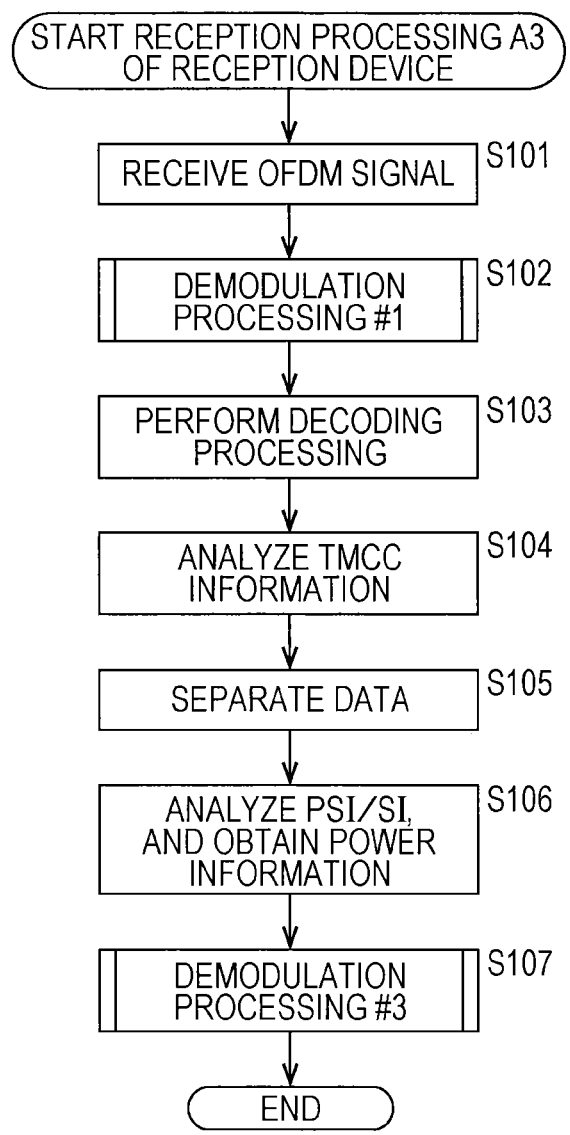
FIG. 23 is a flowchart for explaining reception processing A3 of the reception device.

The processing in steps S101 to S106 of FIG. 23 is the same processing as the processing of steps S21 to S26 of FIG. 19. More specifically, in step S101, the tuner 51 receives the OFDM signal, and converts the OFDM signal into an IF signal, and outputs the IF signal to the demodulation unit 52.

In step S102, the demodulation unit 52 performs the demodulation processing #1.

In step S103, the decoding unit 53 applies the decoding processing to the equalized OFDM signal, and outputs the TS to the demultiplexer 55, and outputs the TMCC information to the TMCC information analyzing unit 54.

In step S104, the TMCC information analyzing unit 54 analyzes the TMCC information, and provides information included in the TMCC information to the demodulation unit 52 as necessary.

In step S105, the demultiplexer 55 separates the AV data and the PSI/SI from the TS.

In step S106, the PSI/SI analyzing unit 57 analyzes the PSI/SI separated from the TS by the demultiplexer 55, and obtains the power information included from the area delivery system descriptor or the connected-transmission descriptor included in the NIT.

In step S107, the demodulation unit 52 performs demodulation processing #3. The demodulation processing #3 will be explained later with reference to a flowchart in FIG. 24. After the demodulation processing #3 is performed in step S107, the above processing such as the decoding processing is repeatedly performed.

Demodulation Processing #3

The demodulation processing #3 performed in step S107 of FIG. 23 will be explained with reference to a flowchart in FIG. 24.

In step S121, the A/D conversion unit 71 performs A/D conversion on the IF signal provided from the tuner 51.

In step S122, the orthogonal demodulation unit 72 performs orthogonal demodulation to generate the OFDM signal in time domain.

In step S123, the FFT calculation unit 73 performs FFT calculation on the OFDM signal in time domain, and generates the OFDM signal in frequency domain.

In step S124, the pilot signal extracting unit 74 extracts the pilot signal of the segment in question and the signal of the lower end carrier of the upper adjacent segment from the OFDM signal in frequency domain provided from the FFT calculation unit 73.

In step S125, the power correction unit 76 corrects the power of the signal of the lower end carrier of the upper adjacent segment extracted by the pilot signal extracting unit 74 so that it becomes the same power as the power of the pilot signal of the segment in question.

For example, when the area delivery system descriptor of FIG. 6 is used for the notification of the power, and the transmission_power is 1111 and the adjacent_transmission_power is 1110, then the power correction unit 76 increases the power of the signal of the lower end carrier of the upper adjacent segment by 3 db.

When the area delivery system descriptor of FIG. 10 is used for the notification of the power, and the adjacent_transmission_power_delta is 0001, then the power correction unit 76 increases the power of the signal of the lower end carrier of the upper adjacent segment by 3 dB.

Likewise, when the area delivery system descriptor of FIG. 12 is used for the notification of the power, the power of the signal of the lower end carrier of the upper adjacent segment is corrected on the basis of the additional_connected_transmission_info.

In step S126, the transmission path characteristic estimating unit 75 estimates the transmission path characteristic on the basis of the pilot signal of the segment in question extracted by the pilot signal extracting unit 74 and the signal of the lower end carrier of the upper adjacent segment of which power is corrected by the power correction unit 76.

In step S127, the equalizer unit 77 removes the component of transmission path distortion included in the OFDM signal in frequency domain provided by the FFT calculation unit 73, on the basis of the transmission path characteristic estimated by the transmission path characteristic estimating unit 75, and outputs the equalized OFDM signal in frequency domain. After the equalized OFDM signal in frequency domain is output, step S107 of FIG. 23 is performed again, and subsequent processing is performed.

As described above, when the power of the signal of the lower end carrier of the upper adjacent segment is corrected so that it becomes equal to the power of the signal of the segment in question, the equalization can be prevented from using a signal of which power is different.

It should be noted that the power of the signal of the segment in question may be corrected so that it becomes equal to the power of the signal of the upper adjacent segment, and the pilot signal of the segment in question of which power has been corrected and the signal of the lower end carrier of the upper adjacent segment may be used for the equalization. Alternatively, both of the power of the signal of the segment in question and the power of the signal of the upper adjacent segment may be corrected so that the power of the signal of the segment in question and the power of the signal of the upper adjacent segment become the same, and the pilot signal of the segment in question and the signal of the lower end carrier of the upper adjacent segment of which power has been corrected may be used for the equalization.

1-2. Example of Notifying the Power of the Signal of Each Segment with TMCC Information Subsequently, hereinafter explained is a case where the power of the signal of each segment is notified with TMCC information.

When the power of the signal of each segment is notified with the PSI/SI, the reception side cannot obtain the power information unless the reception side performs the decoding processing and further analyzes the TS. When the TMCC information is used for the notification of the power of the signal of each segment, the reception device 2 can obtain the power information in the stage of the demodulation processing which is before the decoding processing, and this can ensure immediately responsiveness.

[Configuration of Transmission Device 1]

Figure 25:
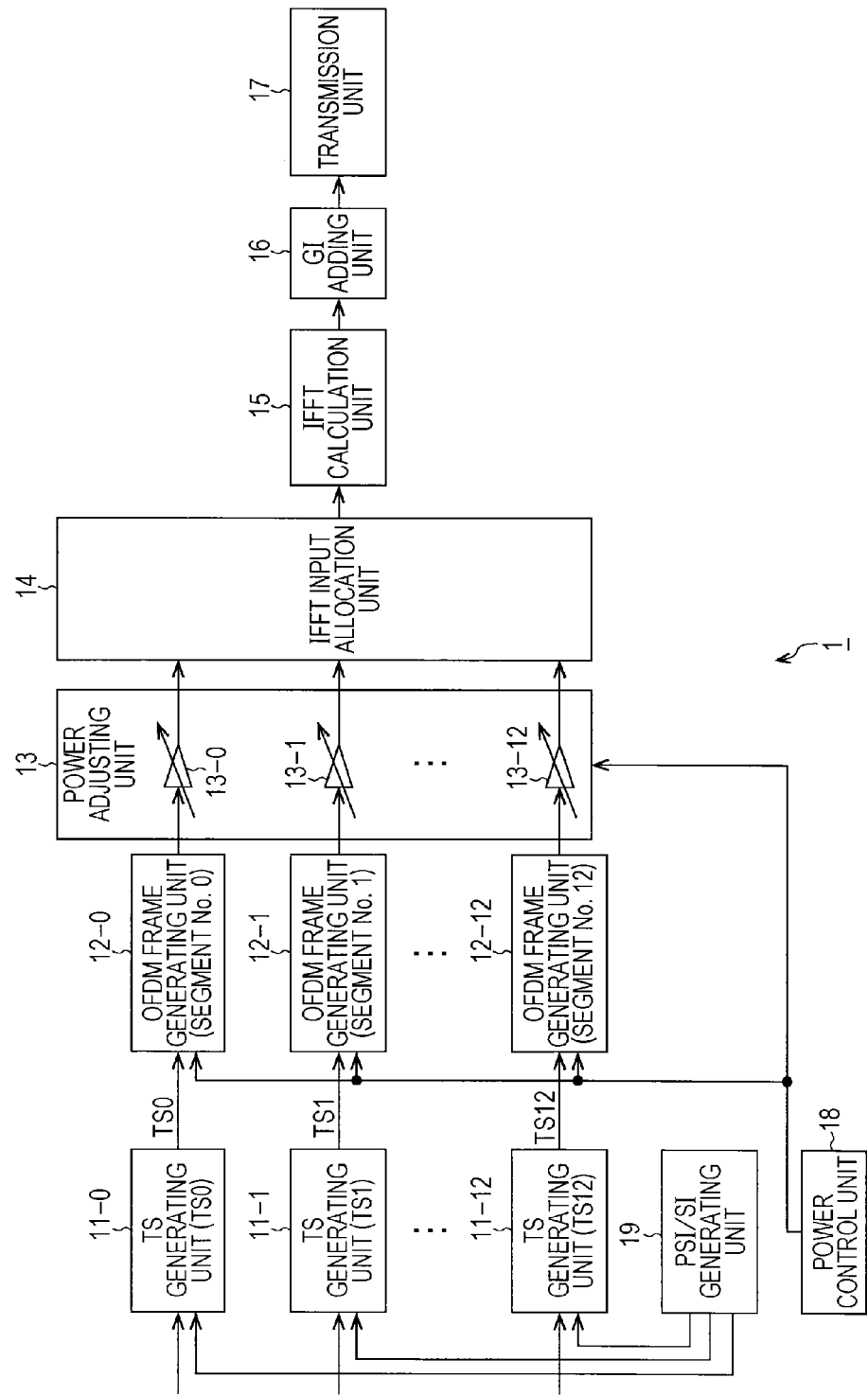
FIG. 25 is a block diagram showing an example structure of a transmission device.

FIG. 25 is a block diagram showing an example structure of transmission device 1 in a case where the power of the signal of each segment is notified with the TMCC information. In the structure illustrated in FIG. 25, the same components as those in FIG. 5 are denoted by the same reference numerals as those in FIG. 5.

The configuration of transmission device 1 of FIG. 25 is different from the configuration of FIG. 5 in that information indicating the power of the signal of each segment which is output from the power control unit 18 is provided to the OFDM frame generating units 12-0 to 12-12 and the power adjusting unit 13. The explanations that have already been made will not be repeated.

The OFDM frame generating units 12-0 to 12-12 respectively generate the TMCC information including the power information on the basis of the information provided from the power control unit 18. The OFDM frame generating units 12-0 to 12-12 generate OFDM frames for transmitting data of TS0 to TS12 in the segments No. 0 to No. 12, respectively.

The OFDM frame of each segment includes TMCC information including the power information.

The OFDM frame generating units 12-0 to 12-12 have the same configuration as the configuration of FIG. 14. The TMCC information including the power information is generated by the TMCC information generating unit 38, and is incorporated into the OFDM frame by the frame configuration unit 36.

It should be noted that the reception device 2 has the same configuration as the configuration as shown in FIGS. 16, 17.

[TMCC Information]

FIG. 26 is a figure showing bit allocation of the TMCC information. The TMCC information is defined in, for example, 3.15.6 of ARIB STD-B31 2.0.

90 bits in B20-B109 in the TMCC information having 102 bits are already used, and 12 bits in B110-B121 are reserved. The power information is allocated to, for example, a predetermined bit of reserved 12 bits.

FIG. 27 is a figure showing an example of meaning of 1 bit in B110 in the TMCC information. In this example, 1 bit in B110 in the TMCC information is used as the power information.

When B110 is 0, this indicates that the power of the signal of the segment in question and the power of the signal of the upper adjacent segment are different by a predetermined difference. In this case, for example, information of difference between the power of the signal of the segment in question and the power of the signal of the upper adjacent segment is given to the reception device 2 in advance.

When B110 is 1, this indicates that there is no difference between the power of the signal of the segment in question and the power of the signal of the upper adjacent segment.

FIG. 28 is a figure showing another example of meaning of 1 bit in B110 of the TMCC information.

When B110 is 0, this indicates that the power of the signal of the segment in question and the power of the signal of the upper adjacent segment are different by a predetermined difference.

When B110 is 0, and the sub-channel number of the segment in question (sub-ch) is less than 21, then this indicates that the power of the signal of the segment in question is less than the power of the signal of the upper adjacent segment by a predetermined power. On the other hand, when the sub-channel number of the segment in question is more than 23, this indicates that the power of the signal of the segment in question is more than the power of the signal of the upper adjacent segment by a predetermined power.

When the bandwidth of one channel is 6 MHz, the sub-channel is a virtual channel of which bandwidth is ⅐ MHz. One segment is constituted by three sub-channels. The sub-channel number of a lower end sub-channel of one channel is 0, and the sub-channel number of an upper end sub-channel is 41. One segment at the center (segment No. 6 of FIG. 3) is constituted by three sub-channels of which sub-channel numbers are 21, 22, 23. The sub-channels are defined in, for example, 3.13.1.2 of ARIB STD-B46 1.1.

More specifically, when B110 is 0, this indicates that when the segment in question is at the left side (lower frequency side) with respect to the center of the channel, the power of the signal of the segment in question is lower than the power of the signal of the upper adjacent segment. When the segment in question is at the right side (higher frequency side) with respect to the center of the channel, the power of the signal of the segment in question is higher than the power of the signal of the upper adjacent segment.

On the other hand, when B110 is 1, this indicates that there is no difference between the power of the signal of the segment in question and the power of the signal of the upper adjacent segment like the case of FIG. 27.

FIG. 29 is a figure showing an example of meaning 4 bits in B110 to B113 in the TMCC information. In this example, 4 bits in B110 to B113 in the TMCC information are used as the power information.

The meaning of the 4 bits in B110 to B113 is the same as the meaning allocated to each value of the adjacent_transmission_power_delta as shown in FIG. 11. More specifically, when 4 bits in B110 to B113 is 1111, this indicates that the power of the signal of the segment in question with respect to the power of the signal of the upper adjacent segment is 0 dB. When 4 bits in B110 to B113 is 0001, this indicates that the power of the signal of the segment in question with respect to the power of the signal of the upper adjacent segment is 3 dB. Other values of B110 to B113 are also associated with dB values indicating the power of the signal of the segment in question with respect to the power of the signal of the upper adjacent segment.

[Operation of Transmission Device 1 and Reception Device 2]

Hereinafter explained is operation of the transmission device 1 and the reception device 2 in a case where information about the power of the signal of each segment is included in the TMCC information.

Transmission Processing B of Transmission Device 1

Figure 30:
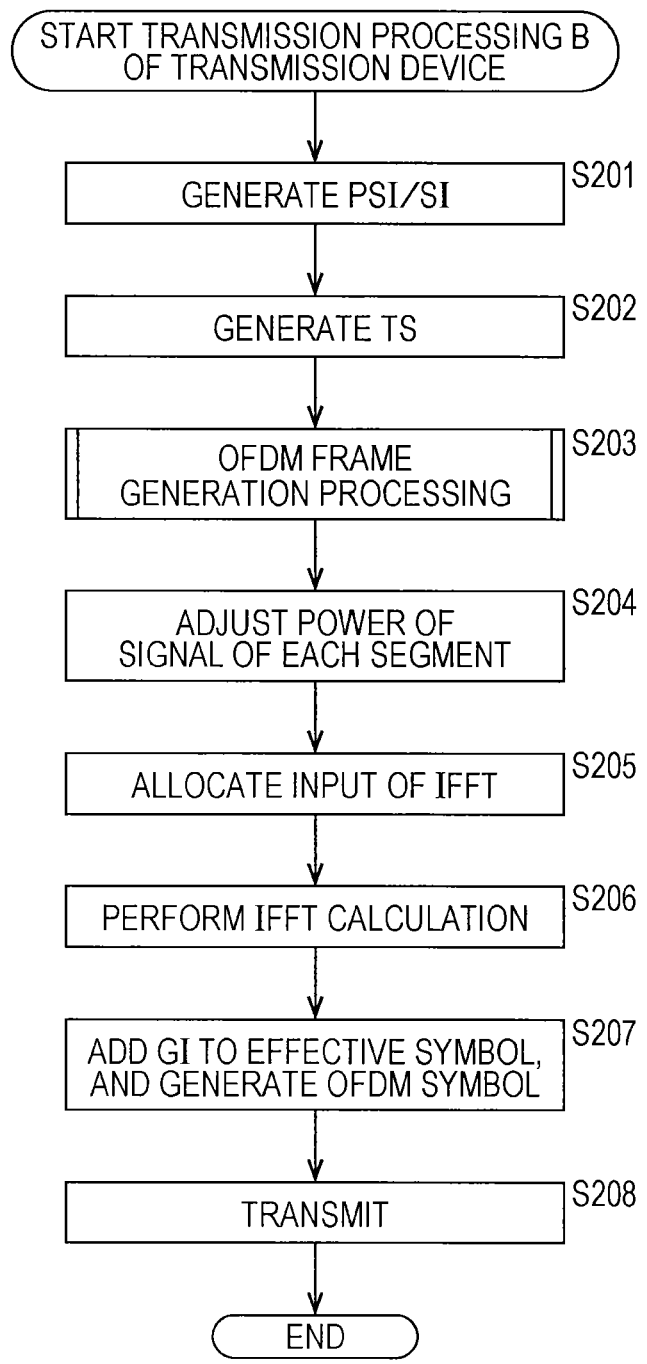
FIG. 30 is a flowchart for explaining transmission processing B of the transmission device of FIG. 25.

First, the transmission processing B of the transmission device 1 of FIG. 25 will be explained with reference to a flowchart in FIG. 30.

In step S201, the PSI/SI generating unit 19 generates PSI/SI which is multiplexed into the TS transmitted in each segment of the segments No. 0 to No. 12.

In step S202, the TS generating units 11-0 to 11-12 multiplex AV data which are input from the outside and PSI/SI which is provided by the PSI/SI generating unit 19, thus generating a TS.

In step S203, the OFDM frame generating units 12-0 to 12-12 respectively perform the OFDM frame generation processing. The OFDM frame generation processing will be explained later with reference to a flowchart in FIG. 31. The signal of the OFDM frame of each segment generated by the OFDM frame generation processing is provided to the power adjusting unit 13.

In step S204, the power adjusting units 13-0 to 13-12 adjust the powers of the signals generated by the OFDM frame generating units 12-0 to 12-12, respectively, so that the power of a signal of a segment close to an end of the channel is smaller than the power of a signal of a segment close to the center.

In step S205, the IFFT input allocation unit 14 allocates, to a carrier, the signal of the OFDM frame of each segment of which power is adjusted by the power adjusting units 13-0 to 13-12.

In step S206, the IFFT calculation unit 15 collectively applies the IFFT calculation to the signals of the OFDM frames of 13 segments, and generates the OFDM signal in time domain.

In step S207, the GI adding unit 16 adds GI to each effective symbol constituting the OFDM signal in time domain, and generates the OFDM signal constituted by the OFDM symbols.

In step S208, the transmission unit 17 transmits the OFDM signal constituted by the OFDM symbols from an antenna, not shown.

According to the above processing, the OFDM signal of 13 segments of which power has been adjusted as shown in FIG. 3A is transmitted by connected-transmission. The powers of the signals of segments close to both ends of the channel are adjusted to become smaller, whereby this can suppress the interference to the adjacent channels.

OFDM Frame Generation Processing

Figure 31:
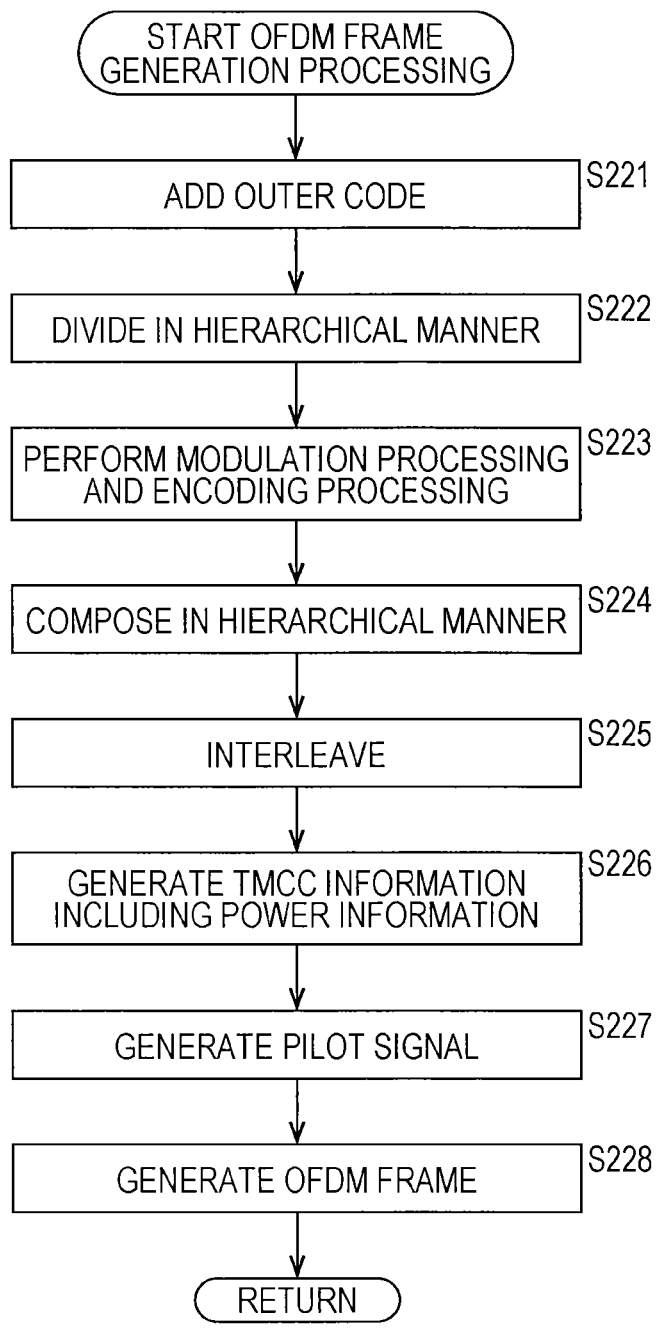
FIG. 31 is a flowchart for explaining OFDM frame generation processing that is performed in step S203 of FIG. 30.

Subsequently, the OFDM frame generation processing performed in step S203 of FIG. 30 will be explained with reference to a flowchart in FIG. 31. Each of the OFDM frame generating units 12-0 to 12-12 performs the same processing.

In step S221, the outer code adding unit 31 adds an outer code to data of TS in units of 188 bytes.

In step S222, the hierarchical dividing unit 32 divides the data, to which the outer code has been added, in a hierarchical manner.

In step S223, the modulation/encoding unit 33 applies baseband processing such as error correction encoding and interleaving on each hierarchical data, and modulates the data with a carrier.

In step S224, the hierarchical composing unit 34 composes, in a hierarchical manner, each piece of hierarchical data which have been subjected to the modulation processing and the encoding processing.

In step S225, the interleave processing unit 35 applies time interleaving and frequency interleaving to the data composed in the hierarchical manner.

In step S226, the TMCC information generating unit 38 generates the TMCC information in which the bit of FIG. 27 to FIG. 29 which is the power information are allocated to a predetermined bit.

In step S227, the pilot signal generating unit 37 generates a pilot signal.

In step S228, the frame configuration unit 36 generates an OFDM frame on the basis of the data provided by the interleave processing unit 35, the pilot signal provided by the pilot signal generating unit 37, and the TMCC information provided by the TMCC information generating unit 38. Thereafter, step S203 of FIG. 30 is performed again, and subsequent processing is performed.

Reception Processing B1 of Reception Device 2

Figure 32:
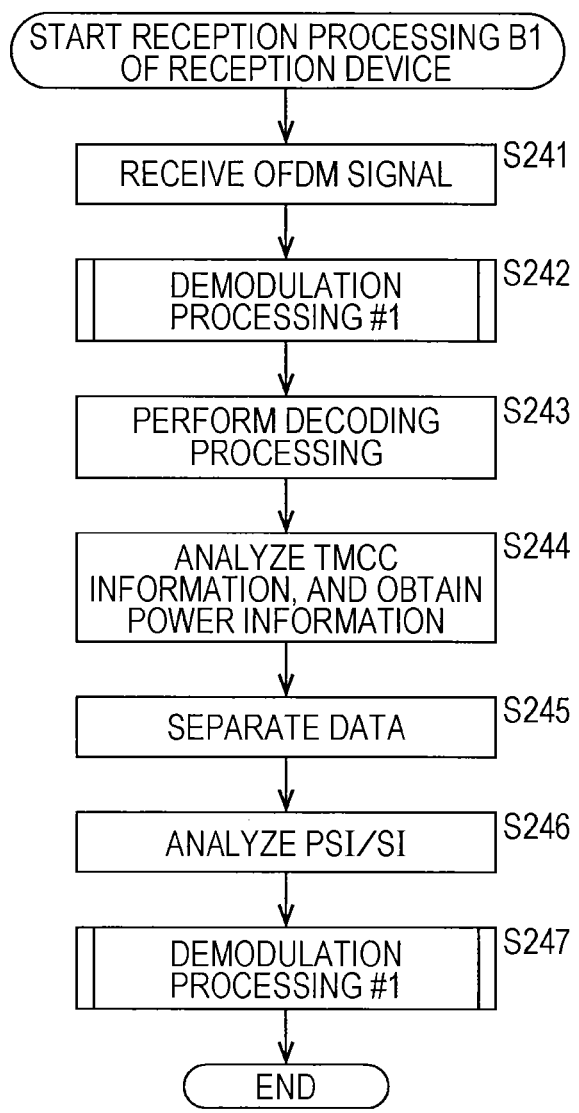
FIG. 32 is a flowchart for explaining of reception processing B1 of the reception device.

Subsequently, the reception processing B1 of the reception device 2 will be explained with reference to a flowchart in FIG. 32. The processing of FIG. 32 is processing for performing the equalization without using the signal of the lower end carrier of the upper adjacent segment at all times.

In step S241, the tuner 51 receives an OFDM signal (RF signal), and converts the OFDM signal (RF signal) into an IF signal, and outputs the IF signal to the demodulation unit 52.

In step S242, the demodulation unit 52 performs the demodulation processing #1 of FIG. 20. In the demodulation processing #1, the equalization is performed using only the pilot signal of the segment in question. The equalized OFDM signal obtained by the demodulation processing #1 is provided to the decoding unit 53.

In step S243, the decoding unit 53 applies decoding processing such as error correction, de-interleaving, and the like to the equalized OFDM signal, and outputs the TS, which is transmitted in the segment in question, to the demultiplexer 55. The decoding unit 53 outputs the TMCC information obtained by the decoding processing to the TMCC information analyzing unit 54.

In step S244, the TMCC information analyzing unit 54 analyzes the TMCC information, and obtains the power information. In the processing of FIG. 32, the signal of the lower end carrier of the upper adjacent segment is not used for the equalization of the OFDM signal. The power information obtained from the TMCC information is, for example, discarded.

In step S245, the demultiplexer 55 separates the AV data and the PSI/SI from the TS.

In step S246, the PSI/SI analyzing unit 57 analyzes the PSI/SI separated from the TS by the demultiplexer 55.

In step S247, the demodulation unit 52 performs the demodulation processing #1. After the demodulation processing #1 is performed in step S247, the above processing such as the decoding processing is repeatedly performed. The AV decoder 56 decodes the AV data separated from the TS by the demultiplexer 55, and the video data and the audio data are output to the outside.

As described above, only the pilot signal of the segment in question may be used to estimate the transmission path characteristic, and the OFDM signal may be equalized.

Reception Processing B2 of Reception Device 2

Subsequently, the reception processing B2 of the reception device 2 will be explained with reference to a flowchart in FIG. 33. The processing of FIG. 33 is processing such that when the power of the signal of the segment in question and the power of the signal of the upper adjacent segment are the same, the equalization is performed using the signal of the lower end carrier of the upper adjacent segment, and when the power of the signal of the segment in question and the power of the signal of the upper adjacent segment are different, the equalization is performed without using the signal of the lower end carrier of the upper adjacent segment.

Figure 33:
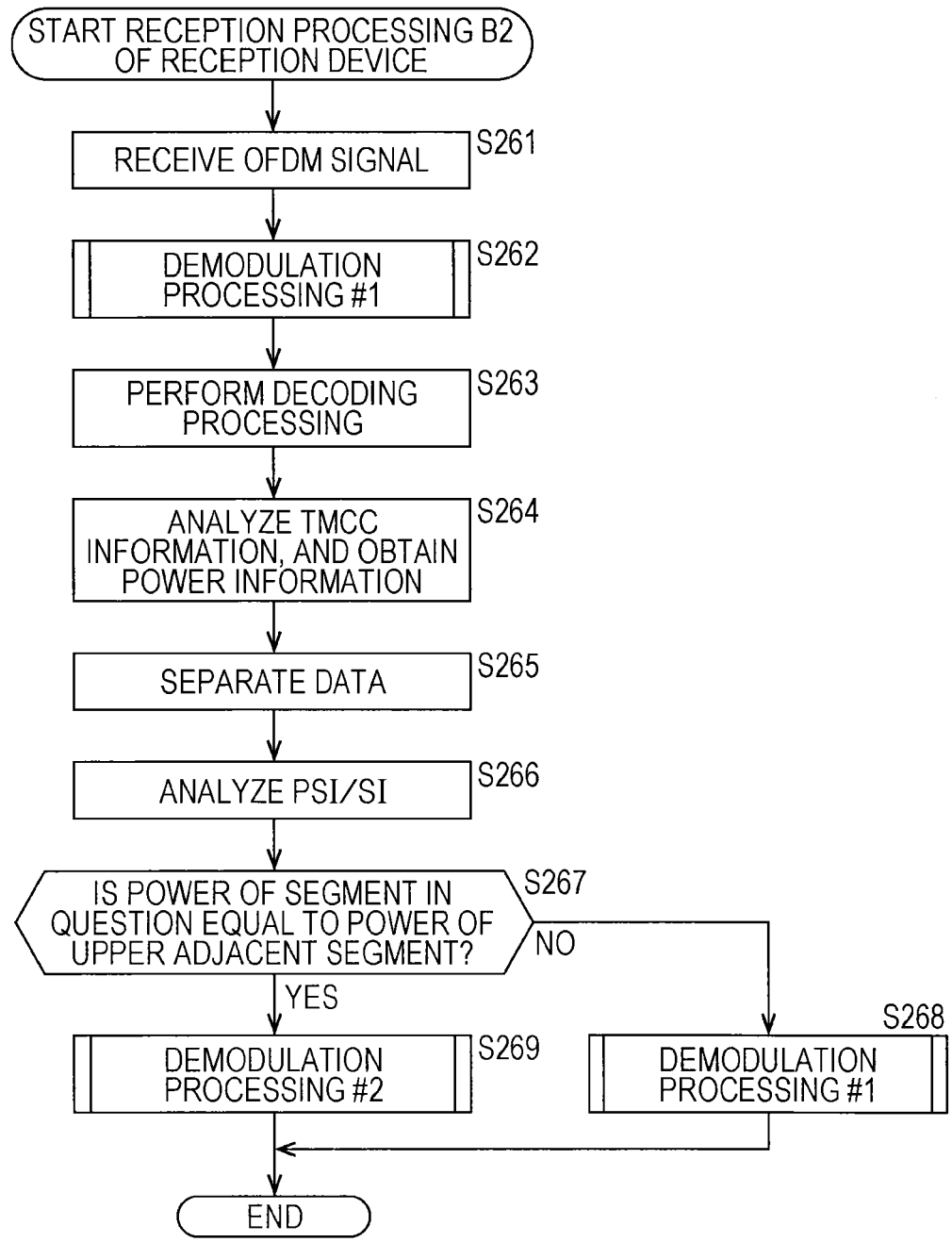
FIG. 33 is a flowchart for explaining of reception processing B2 of the reception device.

The processing in steps S261 to S266 of FIG. 33 is the same as the processing in steps S241 to S246 of FIG. 32. More specifically, in step S261, the tuner 51 receives an OFDM signal, converts the OFDM signal into an IF signal, and outputs the IF signal to the demodulation unit 52.

In step S262, the demodulation unit 52 performs the demodulation processing #1 of FIG. 20.

In step S263, the decoding unit 53 applies decoding processing to the equalized OFDM signal, and outputs the TS to the demultiplexer 55, and outputs the TMCC information to the TMCC information analyzing unit 54.

In step S264, the TMCC information analyzing unit 54 analyzes the TMCC information, and obtains the power information.

In step S265, the demultiplexer 55 separates the AV data and the PSI/SI from the TS.

In step S266, the PSI/SI analyzing unit 57 analyzes the PSI/SI separated from the TS by the demultiplexer 55.

In step S267, the TMCC information analyzing unit 54 determines whether the power of the signal of the segment in question and the power of the signal of the upper adjacent segment are the same or not on the basis of the power information obtained from the TMCC information.

For example, when 1 bit in B110 of FIG. 27 or FIG. 28 is used for the notification of the power, and when B110 is 1, the TMCC information analyzing unit 54 determines that the powers are the same, and when B110 is 0, the TMCC information analyzing unit 54 determines that the powers are different.

When 4 bits in B110 to B113 of FIG. 29 is used for the notification of the power, and when B110 to B113 is 1111, the TMCC information analyzing unit 54 determines that the power is the same, and when B110 to B113 is of a value different from 1111, the TMCC information analyzing unit 54 determines that the powers of them both are different.

When the power of the signal of the segment in question and the power of the signal of the upper adjacent segment are determined to be different in step S267, the demodulation unit 52 performs the demodulation processing #1 in step S268. In this case, only the pilot signal of the segment in question is used for the equalization.

Figure 22:
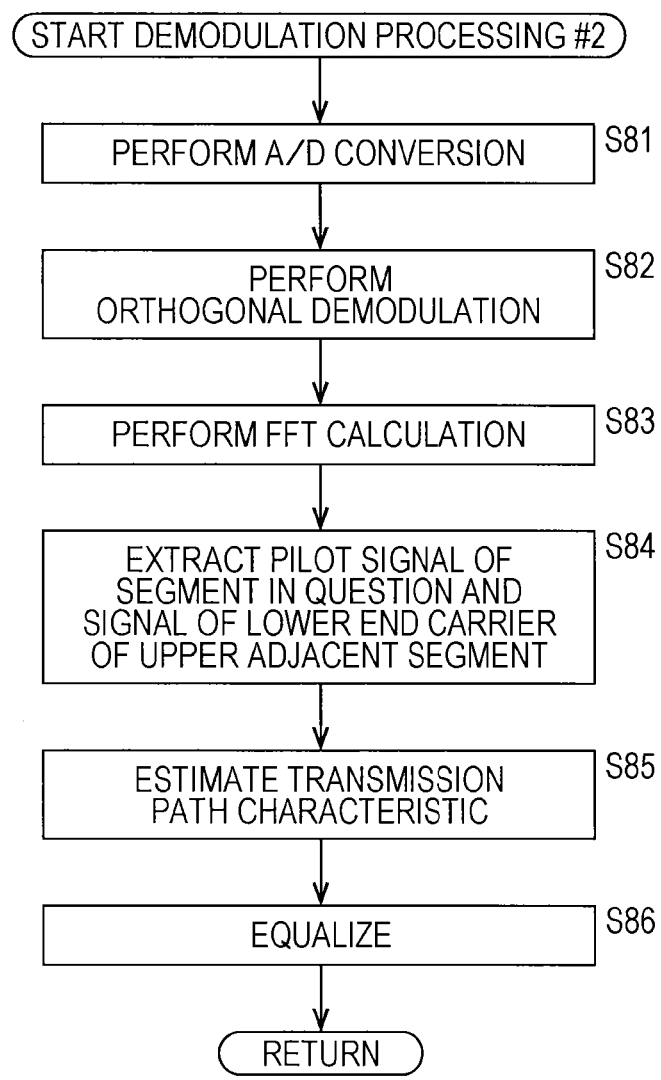
FIG. 22 is a flowchart for explaining demodulation processing #2 that is performed in step S69 of FIG. 21.

On the other hand, when the power of the signal of the segment in question and the power of the signal of the upper adjacent segment are determined to be the same in step S267, the demodulation unit 52 performs the demodulation processing #2 of FIG. 22 in step S269. In the demodulation processing #2, the equalization is performed using the pilot signal of the segment in question and the signal of the lower end carrier of the upper adjacent segment.

In step S268, after the demodulation processing #1 is performed or the demodulation processing #2 is performed in step S269, the above processing such as the decoding processing is repeatedly performed.

As described above, only when the power of the signal of the segment in question is the same as the power of the signal of the upper adjacent segment, the equalization is performed also using the signal of the lower end carrier of the upper adjacent segment, so that the equalization is prevented from using a signal of different power.

Reception Processing B3 of Reception Device 2

Subsequently, the reception processing B3 of the reception device 2 will be explained with reference to a flowchart in FIG. 34. The processing in FIG. 34 is such processing that when there is difference between the power of the signal of the segment in question and the power of the signal of the upper adjacent segment, the power of the signal of the lower end carrier of the upper adjacent segment is corrected and used for the equalization.

Figure 34:
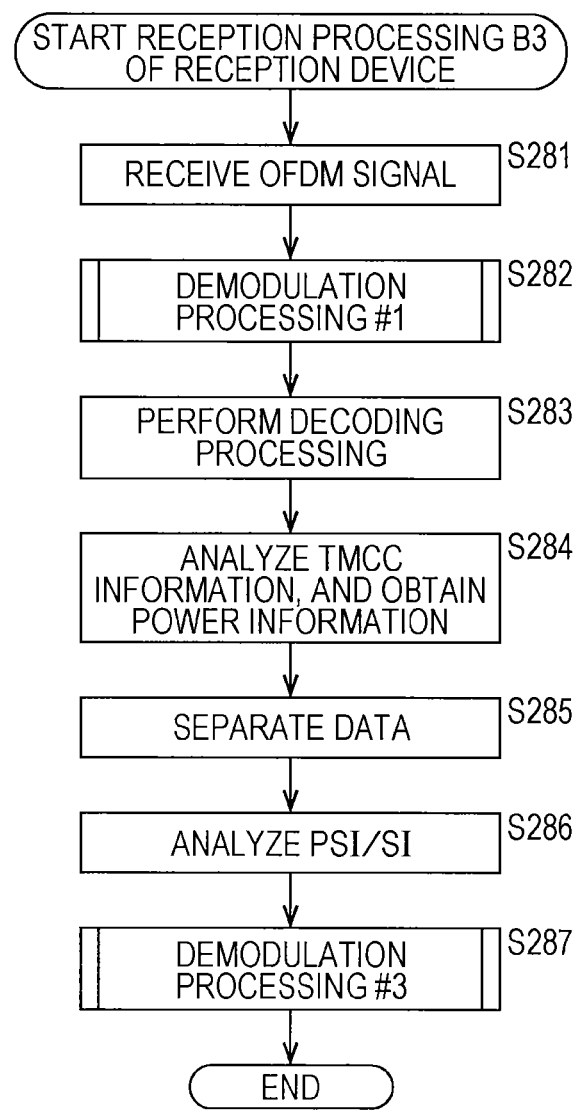
FIG. 34 is a flowchart for explaining of reception processing B3 of the reception device.

The processing in steps S281 to S286 of FIG. 34 is the same processing as the processing in steps S241 to S246 of FIG. 32. More specifically, in step S281, the tuner 51 receives an OFDM signal, and converts the OFDM signal into an IF signal, and outputs the IF signal to the demodulation unit 52.

In step S282, the demodulation unit 52 performs the demodulation processing #1.

In step S283, the decoding unit 53 applies the decoding processing to the equalized OFDM signal, and outputs the TS to the demultiplexer 55, and outputs the TMCC information to the TMCC information analyzing unit 54.

In step S284, the TMCC information analyzing unit 54 analyzes the TMCC information, and obtains the power information.

In step S285, the demultiplexer 55 separates the AV data and the PSI/SI from the TS.

In step S286, the PSI/SI analyzing unit 57 analyzes the PSI/SI separated from the TS by the demultiplexer 55.

Figure 24:
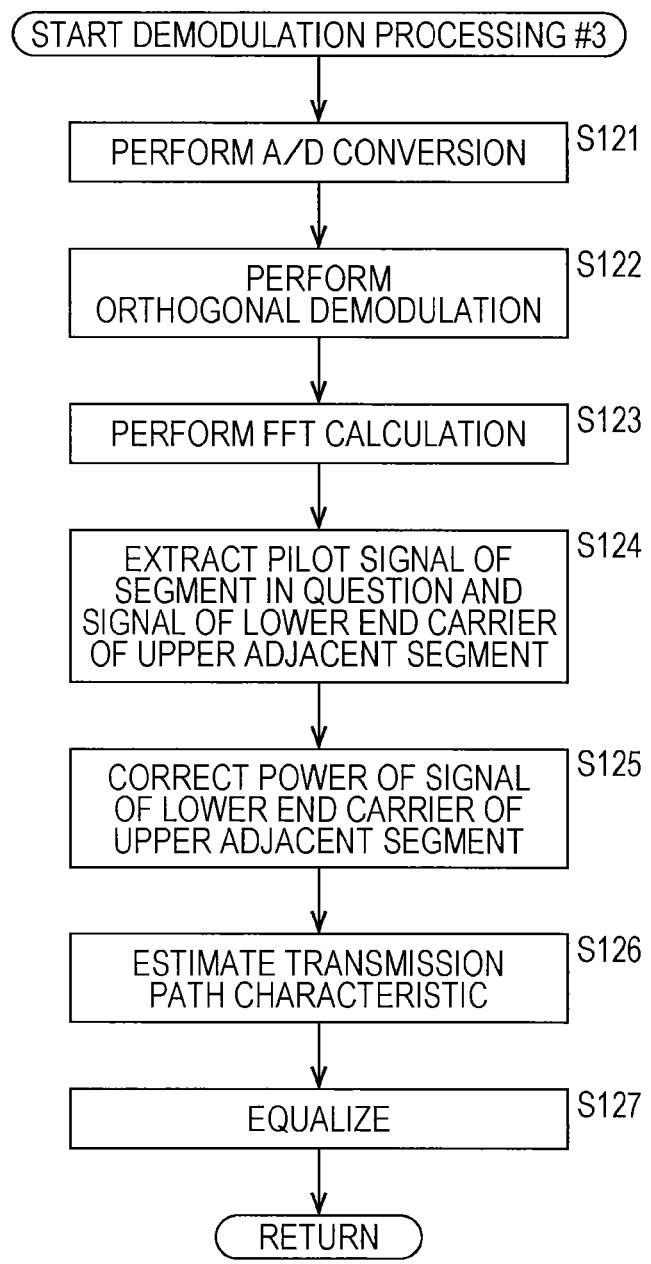
FIG. 24 is a flowchart for explaining demodulation processing #3 that is performed in step S107 of FIG. 23.

In step S287, the demodulation unit 52 performs the demodulation processing #3 of FIG. 24. In the demodulation processing #3, the power of the signal of the lower end carrier of the upper adjacent segment is corrected by the power correction unit 76 so that it becomes the same as the power of the signal of the segment in question on the basis of the power information obtained from the TMCC information. Using the pilot signal of the segment in question and the signal of the lower end carrier of the upper adjacent segment of which power has been corrected, the transmission path characteristic estimating unit 75 estimates the transmission path characteristic, and the equalizer unit 77 performs the equalization. After the demodulation processing #3 is performed in step S287, the above processing such as the decoding processing is repeatedly performed.

As described above, the power of the signal of the upper adjacent segment is corrected so that it becomes the same as the power of the signal of the segment in question, whereby the equalization is prevented from using a signal of which power is different.

2. SECOND EMBODIMENT

Example of Adjusting the Power of a Signal by Waveform Shaping

[Transmission Signal]

The power of the signal of each segment may also be adjusted by waveform shaping using a waveform shaping filter.

Figure 35:
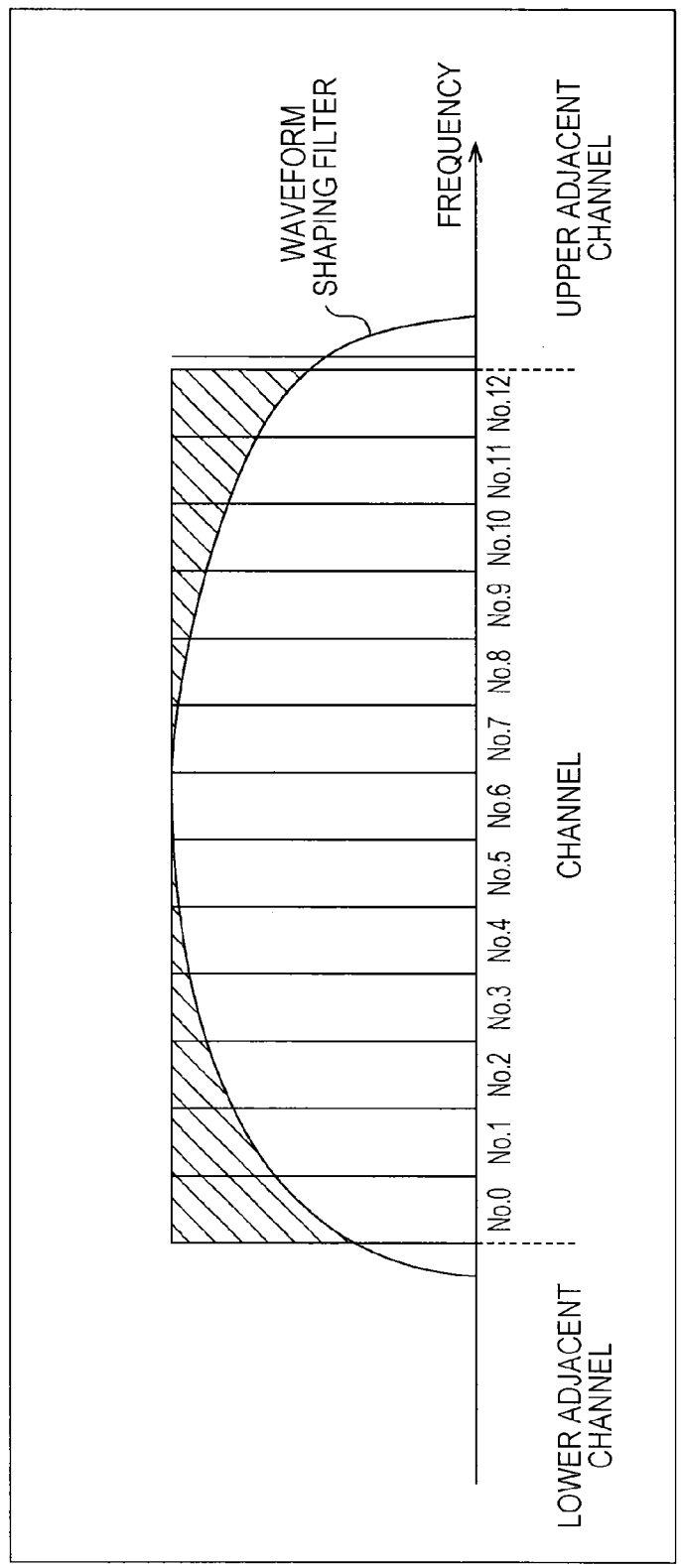
FIG. 35 is a figure showing an example of an OFDM signal that is transmitted by the transmission device.

FIG. 35 is a figure showing an example of an OFDM signal transmitted by the transmission device 1.

In the signal of each segment as shown in FIG. 35, shaded portions are portions where the signal is attenuated by a waveform shaping filter. The waveform shaping filter is an LPF (Low Pass Filter) that passes a signal of a frequency lower than the reference which is the central frequency of the channel (frequency of which difference from the reference is small in the frequency axis) and attenuates a signal of a frequency higher than the reference which is the central frequency of the channel (frequency of which difference from the reference is large in the frequency axis).

As described above, in the transmission device 1, the power of the OFDM signal is adjusted using the waveform shaping filter so that the power of the signals of segments closer to an end of the channel gradually become lower than the power of the signal of a segment closer to the center of the channel. Therefore this can reduce the interference to a signal of an adjacent channel.

The waveform shaping information which is information about the waveform shaping is notified from the transmission device 1 to the reception device 2. The waveform shaping information includes, for example, information indicating the type of the waveform shaping filter, information indicating whether the transmission side has performed the waveform shaping using the waveform shaping filter.

Like the case where the power information is notified as described above, methods for notifying the waveform shaping information include a method using PSI/SI and a method using TMCC information. First, a method using PSI/SI will be explained.

2-1. Example of Notifying Information about Waveform Shaping with PSI/SI

[Configuration of Transmission Device 1]

Figure 36:
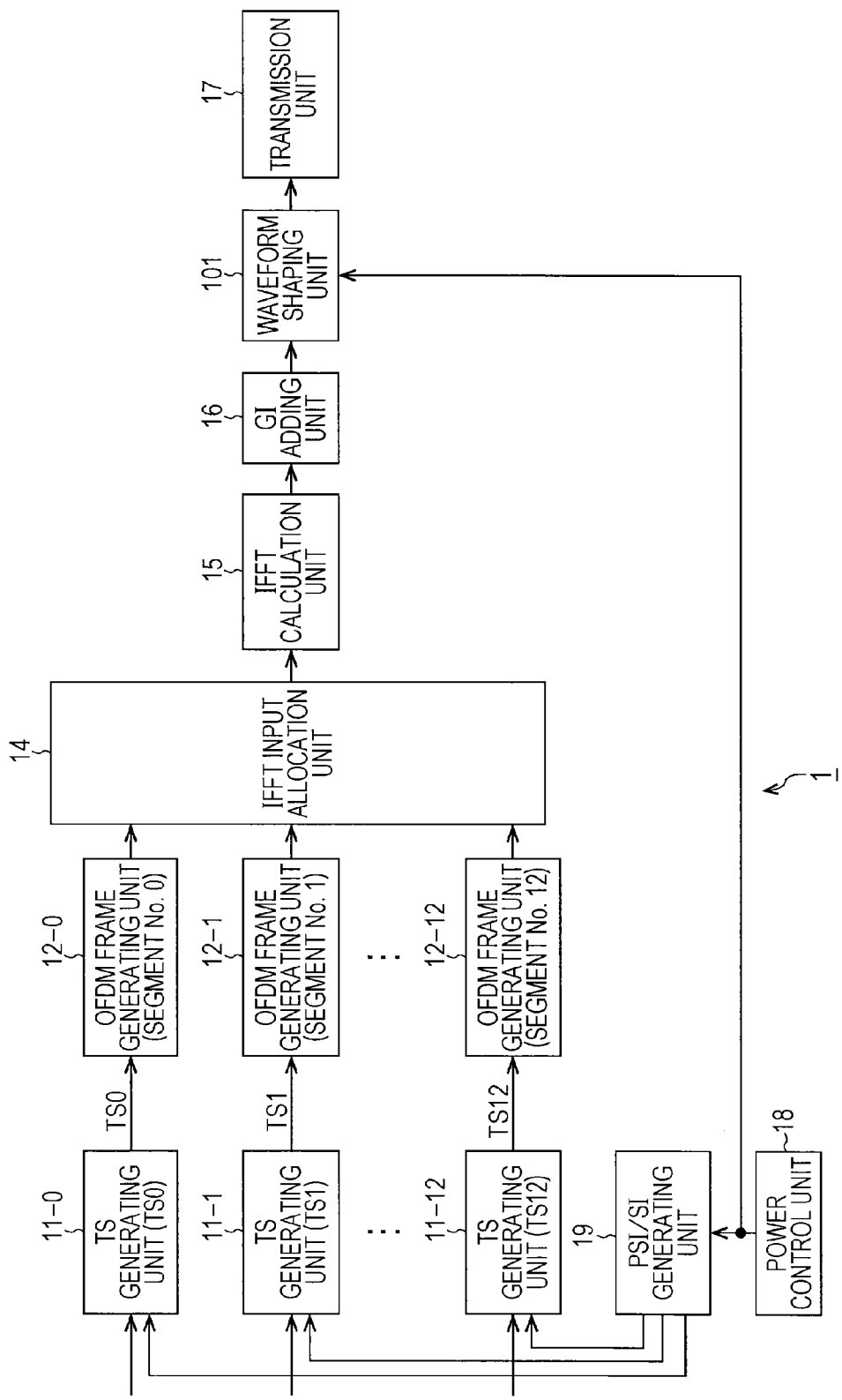
FIG. 36 is a block diagram showing an example structure of a transmission device.

FIG. 36 is a block diagram showing an example structure of transmission device 1 in a case where information about the waveform shaping is notified with PSI/SI.

In the structure illustrated in FIG. 36, the same components as those in FIG. 5 are denoted by the same reference numerals as those in FIG. 5. The configuration of the transmission device 1 of FIG. 36 is basically different from the configuration of FIG. 5 in that a waveform shaping unit 101 is provided between the GI adding unit 16 and the transmission unit 17 instead of the power adjusting unit 13. The explanations that have already been made will not be repeated.

TS generating units 11-0 to 11-12 multiplex AV data which are input from the outside and PSI/SI which is provided by the PSI/SI generating unit 19, thus generating a TS. For example, the NIT of the PSI/SI provided by the PSI/SI generating unit 19 includes the waveform shaping information.

The OFDM frame generating units 12-0 to 12-12 generate OFDM frames for transmitting data of TS0 to TS12 with the segments No. 0 to No. 12, respectively, and output the OFDM frames to the IFFT input allocation unit 14.

The IFFT input allocation unit 14 allocates, to a carrier, the signal of the OFDM frame of each segment provided by the OFDM frame generating units 12-0 to 12-12, and outputs the signals to the IFFT calculation unit 15.

The IFFT calculation unit 15 collectively applies IFFT calculation on the signal provided by the IFFT input allocation unit 14, and generates the OFDM signal in time domain. The IFFT calculation unit 15 outputs the generated OFDM signal to the GI adding unit 16.

The GI adding unit 16 copies a portion of the latter half of each effective symbol to the head of each effective symbol of the OFDM signal provided from the IFFT calculation unit 15, thereby adding GI, and generates an OFDM signal constituted by OFDM symbols. The GI adding unit 16 outputs the generated OFDM signal to the waveform shaping unit 101.

The waveform shaping unit 101 applies the waveform shaping using the waveform shaping filter to the OFDM signal provided by the GI adding unit 16. The type of the waveform shaping filter is designated by the power control unit 18. The waveform shaping unit 101 outputs, to the transmission unit 17, an OFDM signal having a waveform as shown in FIG. 35 obtained from the waveform shaping.

The transmission unit 17 performs, e.g., upconvert of the OFDM signal provided from the waveform shaping unit 101, and transmits the OFDM signal from an antenna.

The power control unit 18 outputs information about the type of the waveform shaping filter to the PSI/SI generating unit 19 and the waveform shaping unit 101.

The PSI/SI generating unit 19 generates PSI/SI for the TS of each segment, and outputs the PSI/SI to the TS generating units 11-0 to 11-12. For example, the PSI/SI multiplexed in the TS0 is provided to the TS generating unit 11-0, and the PSI/SI multiplexed in the TS1 is provided to the TS generating unit 11-1. Each PSI/SI of TS0 to TS12 includes the same information which serves as the waveform shaping information.

[Example Using Area Delivery System Descriptor of NIT]

Hereinafter explained is a case where the waveform shaping information is notified using the area delivery system descriptor.

FIG. 37 is a figure showing an example of a data structure of an area delivery system descriptor. In the information as shown in FIG. 37, information other than transmission_filter is the same as what has been explained with reference to FIG. 6.

The transmission_filter is an 8 bit field, and indicates the type of the waveform shaping filter.

FIG. 38 is a figure showing meaning of a value of transmission_filter.

When the transmission_filter is 00000000, this indicates that the type of the waveform shaping filter (characteristic) is expressed by the following expression (1) with the amount of delay d=1.0. In the following expression (1), pi= 3.141592 . . . , i=carrier index, N=the number of samples of IFFT.

$$2\times(1+\cos(2\times pi\times d\times i/N)) \quad (1)$$

When the transmission_filter is 00000001, this indicates that the type of the waveform shaping filter is expressed by the expression (1) with the amount of delay d=1.1. When the transmission_filter is 00010000, this means that the type of the waveform shaping filter is expressed by substituting a predetermined parameter n into a predetermined expression n. Other values of the transmission_filter are respectively associated with a predetermined expression indicating the type of the waveform shaping filter and a parameter substituted into the expression.

[Example of Use of Connected-Transmission Descriptor of NIT]

The additional_connected_transmission_info of the connected-transmission descriptor may be used to notify the waveform shaping information.

FIG. 39 is a figure showing an example of a data structure of connected-transmission descriptor.

The additional_connected_transmission_info which is an 8 bit field is used as the waveform shaping information. The values of the additional_connected_transmission_info are associated with the same meaning as the meaning of the values of the transmission_filter as shown in FIG. 38.

As described above, the PSI/SI generating unit 19 of FIG. 36 generates the PSI/SI such as NIT including the connected-transmission descriptor or the area delivery system descriptor describing the waveform shaping information, and multiplexes the PSI/SI into the TS of each segment, thus notifying the information about the waveform shaping to the reception side.

Figure 40:
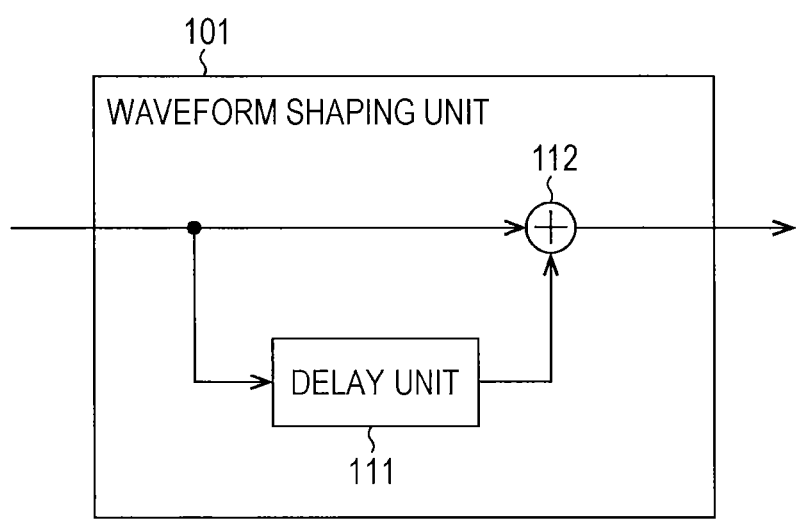
FIG. 40 is a block diagram showing an example structure of a waveform shaping unit of FIG. 36.

FIG. 40 is a block diagram showing an example structure of the waveform shaping unit 101 of FIG. 36.

The waveform shaping unit 101 includes a delay unit 111 and an adding unit 112. The OFDM signal which is output from the GI adding unit 16 is input into the delay unit 111 and the adding unit 112.

The delay unit 111 delays the input OFDM signal in accordance with the amount of delay d designated by the power control unit 18, and outputs the OFDM signal to the adding unit 112. The amount of delay d is expressed by the number of samples of IFFT.

The adding unit 112 calculates the above expression (1) by adding the OFDM signal delayed by the amount of delay d by the delay unit 111 and the input OFDM signal, and outputs the OFDM signal derived as a result of the calculation.

Figure 41:
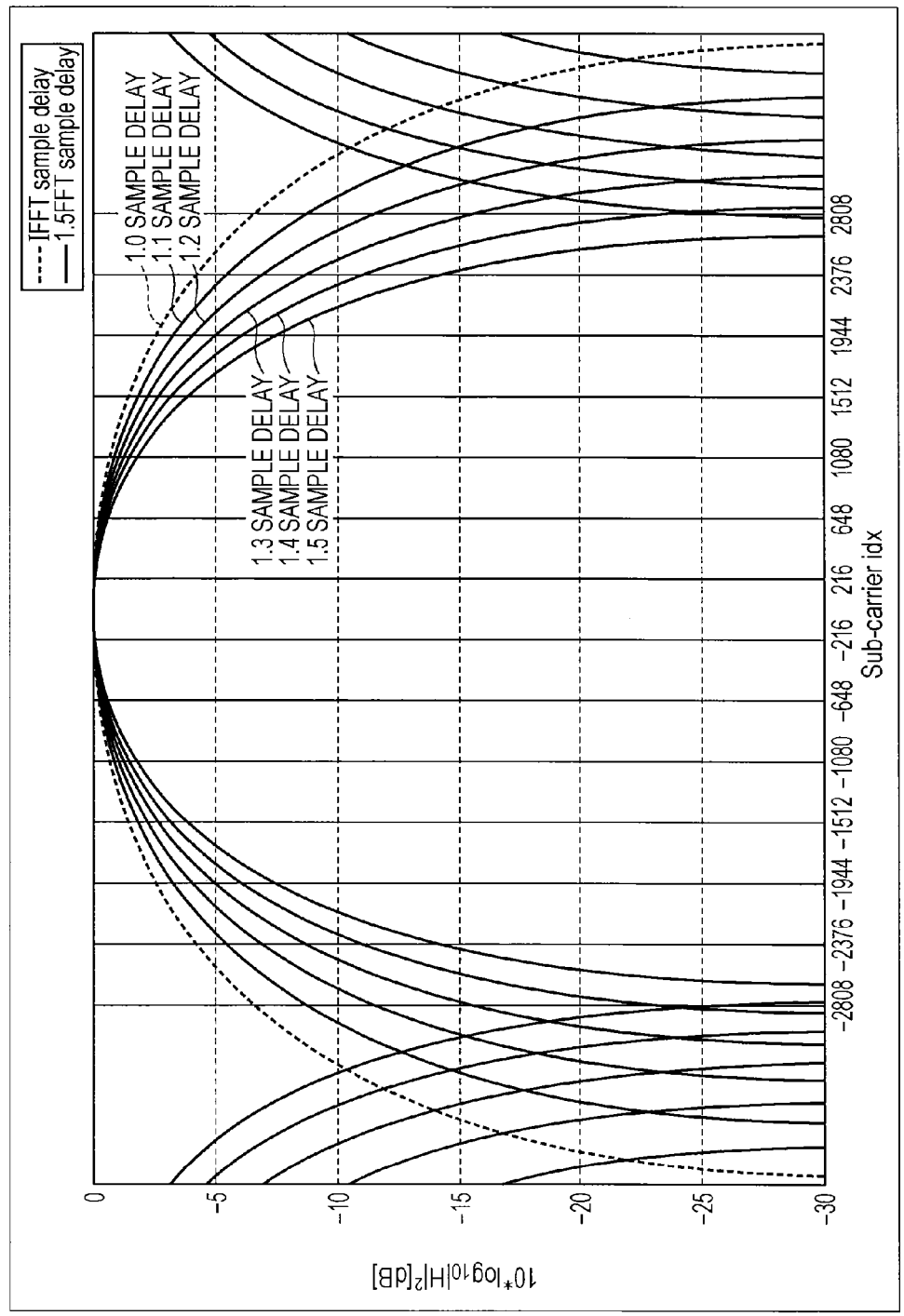
FIG. 41 is a figure showing an example of characteristic of a waveform shaping filter.

FIG. 41 is a figure showing an example of characteristic of the waveform shaping filter.

FIG. 41 illustrates the characteristic of the waveform shaping filter in each of the cases where the amount of delay d of the above expression (1) is changed by step of 0.1 from d=1.0 to d=1.5. The larger the amount of delay d is, the larger the amount of attenuation of the power of the OFDM signal becomes. The expression capable of identifying the characteristic of the waveform shaping filter and the information about the parameter are incorporated into the PSI/SI as the waveform shaping information, and the PSI/SI is transmitted to the reception device 2.

[Configuration of Reception Device 2]

Figure 42:
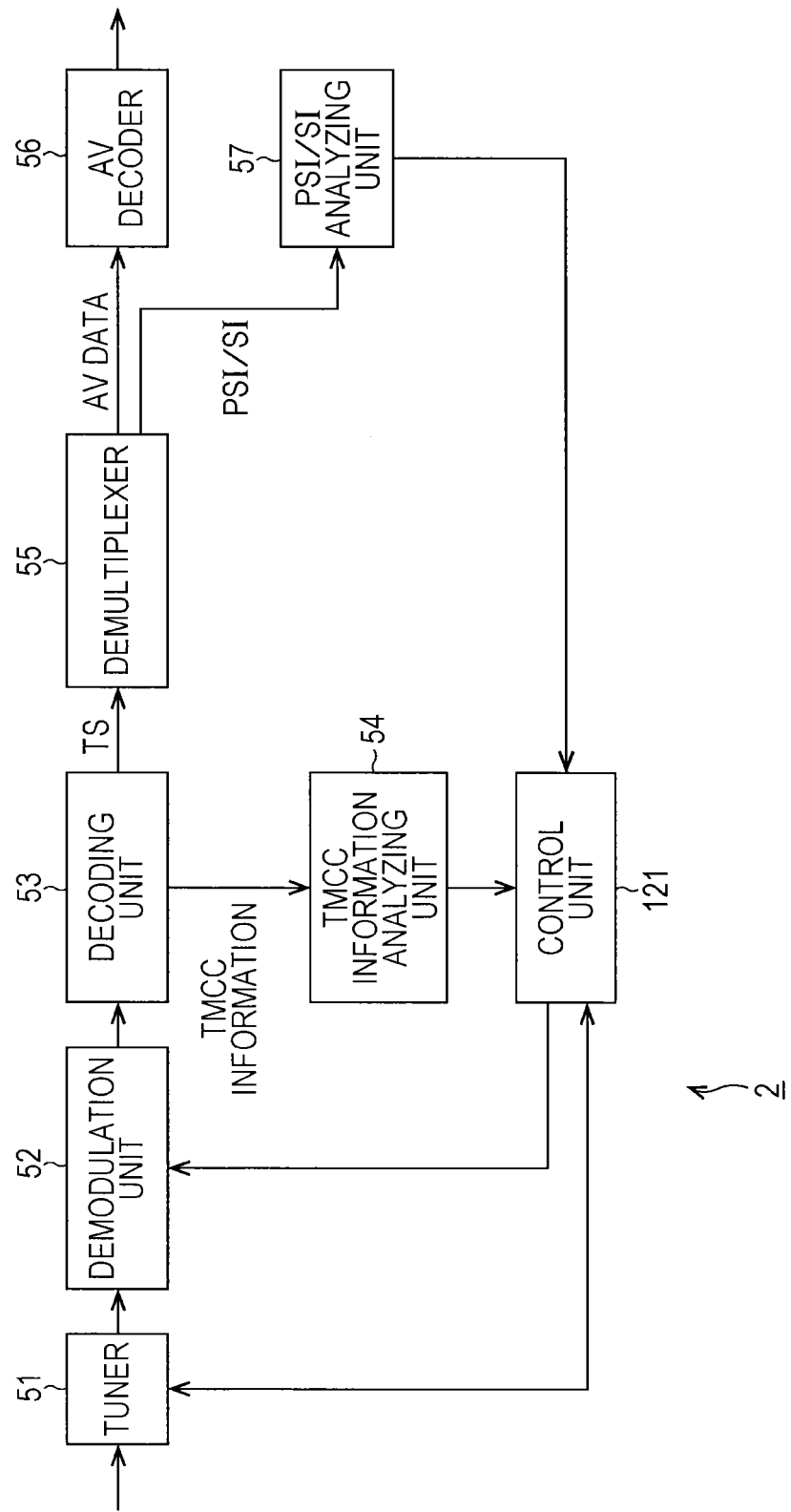
FIG. 42 is a block diagram showing an example structure of the reception device.

FIG. 42 is a block diagram showing an example structure of reception device 2.

In the structure illustrated in FIG. 42, the same components as those in FIG. 16 are denoted by the same reference numerals as those in FIG. 16. The configuration of reception device 2 of FIG. 42 is basically different from the configuration of FIG. 16 in that a control unit 121 is provided. The explanations that have already been made will not be repeated.

The demodulation unit 52 applies A/D conversion and orthogonal demodulation to the IF signal provided by the tuner 51, and applies the FFT calculation on the OFDM signal in time domain thus obtained. The demodulation unit 52 performs, for example, the orthogonal demodulation, and thereafter, superimposes the inverse characteristic of the characteristic of the waveform shaping filter used for the waveform shaping at the transmission side onto the OFDM signal in the segment in question, and corrects the power of the signal that has been attenuated. The OFDM signal of which power is to be corrected also includes the signal of the lower end carrier of the upper adjacent segment.

The demodulation unit 52 extracts a pilot signal from the OFDM signal in frequency domain which is obtained by applying the FFT calculation, and estimates the transmission path characteristic, and thereafter, performs equalization, and outputs the equalized OFDM signal to the decoding unit 53.

The TMCC information analyzing unit 54 analyzes the TMCC information provided from the decoding unit 53, and outputs the TMCC information to the control unit 121.

The PSI/SI analyzing unit 57 analyzes the PSI/SI separated from the TS by the demultiplexer 55, and outputs the waveform shaping information included in the NIT to the control unit 121.

The control unit 121 identifies the characteristic of the waveform shaping filter used for the waveform shaping at the transmission side, on the basis of the waveform shaping information provided by the PSI/SI analyzing unit 57. The control unit 121 obtains the sub-channel information about the segment in question being received from the tuner 51, and identifies the inverse characteristic of the characteristic of the waveform shaping filter for the signal in the segment in question.

The characteristic of the waveform shaping filter for the signal of each segment is different in accordance with the frequency band of the segment and the characteristic of the entire waveform shaping filter. Therefore, the inverse characteristic of the characteristic of the waveform shaping filter for the signal in the segment in question is identified by the characteristic of the entire waveform shaping filter identified by the waveform shaping information and the frequency band of the segment in question identified by the sub-channel number.

The control unit 121 outputs, to the demodulation unit 52, information indicating the inverse characteristic of the characteristic of the waveform shaping filter for the signal of the segment in question thus identified, and causes the power of the OFDM signal to be corrected.

Figure 43:
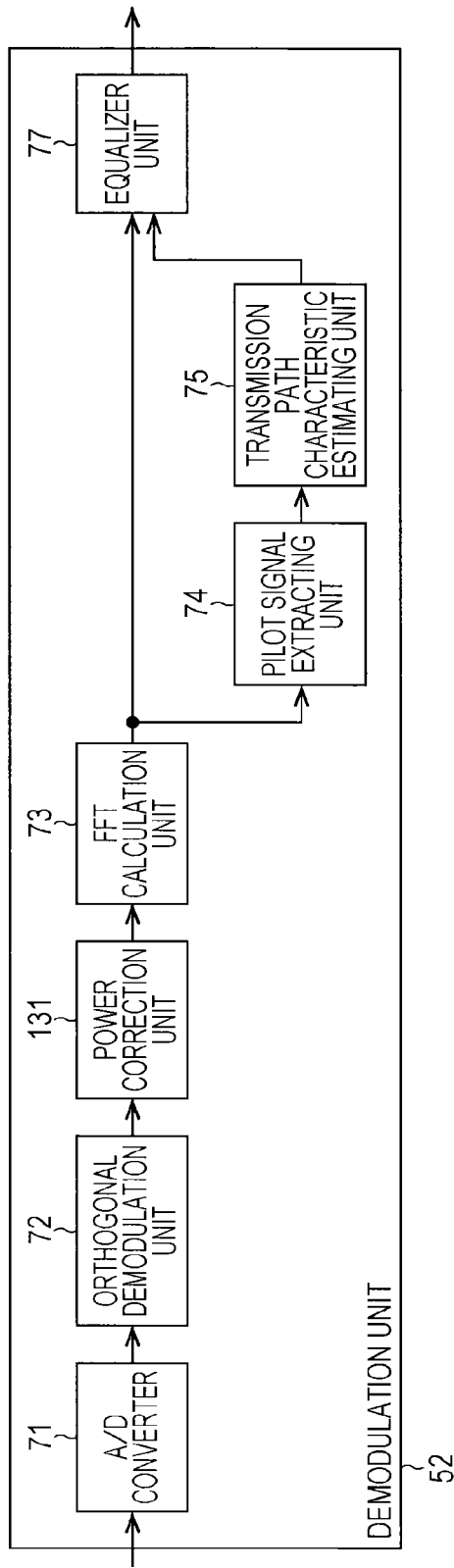
FIG. 43 is a block diagram showing an example structure of a demodulation unit of FIG. 42.

FIG. 43 is a block diagram showing an example structure of the demodulation unit 52 of FIG. 42.

In the structure illustrated in FIG. 43, the same components as those in FIG. 17 are denoted by the same reference numerals as those in FIG. 17. The configuration of the demodulation unit 52 of FIG. 43 is basically different from the configuration of FIG. 17 in that a power correction unit 131 is provided between the orthogonal demodulation unit 72 and the FFT calculation unit 73 instead of the power correction unit 76. Alternatively, the power correction unit 131 may be provided after the FFT calculation unit 73. The power correction processing is calculated in frequency domain, and therefore, when the power correction processing is performed in a stage after the FFT calculation unit 73, it is easy to perform processing for making correction for each frequency, and this reduces the amount of calculation, and the circuit can be realized with a small scale circuit configuration.

The A/D conversion unit 71 applies the A/D conversion to the IF signal provided by the tuner 51, and outputs the digital IF signal to the orthogonal demodulation unit 72.

The orthogonal demodulation unit 72 performs orthogonal demodulation to obtain the OFDM signal in time domain from the IF signal provided by the A/D conversion unit 71, and outputs the OFDM signal to the power correction unit 131.

The power correction unit 131 superimposes the inverse characteristic of the characteristic of the waveform shaping filter onto the OFDM signal of the segment in question provided by the orthogonal demodulation unit 72, and corrects the power of the OFDM signal of the segment in question. The power correction unit 131 outputs the OFDM signal of which power has been corrected to the FFT calculation unit 73.

In accordance with the FFT interval which is set by a control unit, not shown, the FFT calculation unit 73 extracts a signal in a range of effective symbols by removing a signal in a range of GI from the signal of a single OFDM symbol. The FFT calculation unit 73 performs FFT calculation onto a signal in a range of the effective symbols extracted, thereby extracting data modulated in each sub-carrier in an orthogonal manner, and outputs the OFDM signal in frequency domain representing the extracted data. The OFDM signal in frequency domain which is output from the FFT calculation unit 73 is provided to the pilot signal extracting unit 74 and the equalizer unit 77.

The pilot signal extracting unit 74 extracts the pilot signal from the OFDM signal in frequency domain provided by the FFT calculation unit 73, and outputs the pilot signal to the transmission path characteristic estimating unit 75.

The transmission path characteristic estimating unit 75 estimates a transmission path characteristic of a carrier at an arrangement position of a pilot signal, on the basis of the pilot signal provided by the pilot signal extracting unit 74, and estimates a transmission path characteristic of each carrier at the position of each OFDM symbol by interpolation.

The equalizer unit 77 removes the component of transmission path distortion included in the OFDM signal in frequency domain provided by the FFT calculation unit 73, on the basis of the transmission path characteristic estimated by the transmission path characteristic estimating unit 75, and outputs the equalized OFDM signal.

[Operation of Transmission Device 1 and Reception Device 2]

In this case, operation of the transmission device 1 and the reception device 2 having the above configuration will be explained.

Transmission Processing C of Transmission Device 1

Figure 44:
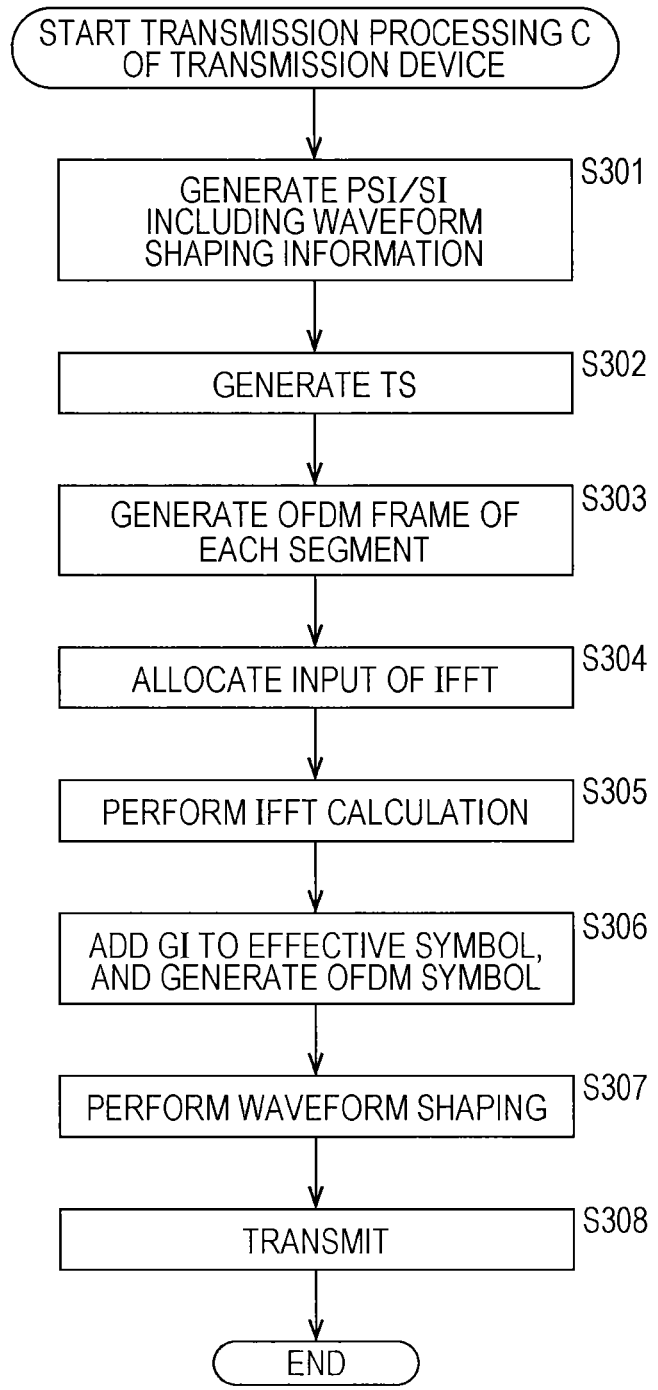
FIG. 44 is a flowchart for explaining transmission processing C of the transmission device.

First, the transmission processing C of the transmission device 1 will be explained with reference to a flowchart in FIG. 44. The processing of FIG. 44 is started when, for example, AV data are input from the outside.

In step S301, the PSI/SI generating unit 19 generates the PSI/SI including the waveform shaping information multiplexed into the TS transmitted in each segment of the segments No. 0 to No. 12. The NIT of PSI/SI generated by the PSI/SI generating unit 19 includes the connected-transmission descriptor and the area delivery system descriptor including the waveform shaping information.

In step S302, the TS generating units 11-0 to 11-12 respectively multiplex the AV data which are input from the outside and the PSI/SI generated by the PSI/SI generating unit 19, thus generating TS.

In step S303, the OFDM frame generating units 12-0 to 12-12 generate the signals of OFDM frames.

In step S304, the IFFT input allocation unit 14 allocates, to a carrier, the signal of the OFDM frame of each segment generated by the OFDM frame generating units 12-0 to 12-12.

In step S305, the IFFT calculation unit 15 collectively applies the IFFT calculation to the signals of the OFDM frames of 13 segments, and generates the OFDM signal in time domain.

In step S306, the GI adding unit 16 adds GI to each effective symbol constituting the OFDM signal in time domain, and generates the OFDM signal constituted by the OFDM symbols.

In step S307, the waveform shaping unit 101 applies the waveform shaping using the waveform shaping filter to the OFDM signal provided by the GI adding unit 16.

In step S308, the transmission unit 17 transmits the OFDM signal having been subjected to the waveform shaping from an antenna, not shown.

According to the above processing, the OFDM signal of 13 segments of which power has been adjusted as shown in FIG. 35 is transmitted by connected-transmission, and the type of the waveform shaping filter is notified to the reception device 2 by the PSI/SI. The powers of the signals of segments close to both ends of the channel are adjusted to become smaller, whereby this can suppress the interference to the adjacent channels.

Reception Processing C1 of Reception Device 2

Figure 45:
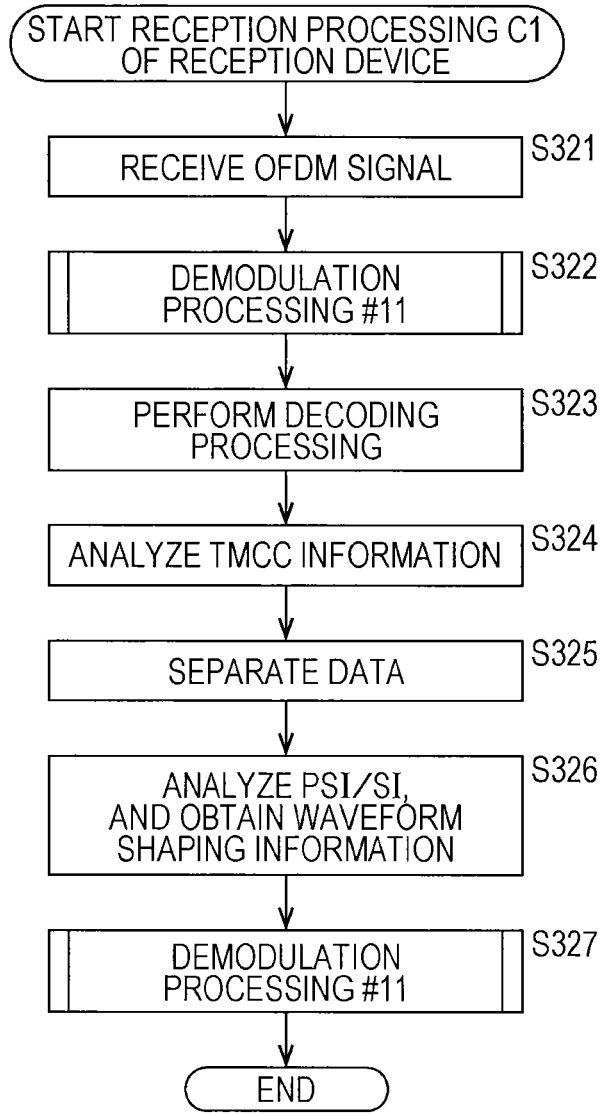
FIG. 45 is a flowchart for explaining reception processing C1 of the transmission device of FIG. 42.

Subsequently, the reception processing C1 of the reception device 2 of FIG. 42 will be explained with reference to a flowchart in FIG. 45. The processing of FIG. 45 is to perform processing such as demodulation without correcting the power of the OFDM signal of the segment in question.

In step S321, the tuner 51 receives the OFDM signal (RF signal), and converts the OFDM signal into an IF signal, and outputs the IF signal to the demodulation unit 52.

In step S322, the demodulation unit 52 performs the demodulation processing #11. The demodulation processing #11 will be explained later with reference to a flowchart in FIG. 46. The equalized OFDM signal obtained from the demodulation processing #11 is provided to the decoding unit 53.

In step S323, the decoding unit 53 applies decoding processing such as error correction, de-interleaving, and the like to the equalized OFDM signal, and outputs the TS, which is transmitted in the segment in question, to the demultiplexer 55. The decoding unit 53 outputs the TMCC information obtained by the decoding processing to the TMCC information analyzing unit 54.

In step S324, the TMCC information analyzing unit 54 analyzes the TMCC information, and provides information included in the TMCC information to the control unit 121 as necessary.

In step S325, the demultiplexer 55 separates the AV data and the PSI/SI from the TS.

In step S326, the PSI/SI analyzing unit 57 analyzes the PSI/SI separated from the TS by the demultiplexer 55, and obtains the waveform shaping information included from the area delivery system descriptor or the connected-transmission descriptor included in the NIT. In the processing of FIG. 45, the power of the OFDM signal of the segment in question is not corrected. The waveform shaping information obtained from the PSI/SI is, for example, discarded.

In step S327, the demodulation unit 52 performs the demodulation processing #11. The processing performed in step S327 is the same processing as the processing performed in step S322. After the demodulation processing #1 is performed in step S327, the above processing such as the decoding processing is repeatedly performed. The AV decoder 56 decodes the AV data separated from the TS by the demultiplexer 55, and the video data and the audio data are output to the outside.

Demodulation Processing #11

The demodulation processing #11 performed in steps S322, S327 in FIG. 45 will be explained with reference to a flowchart in FIG. 46.

In step S341, the A/D conversion unit 71 of FIG. 43 performs A/D conversion on the IF signal provided from the tuner 51.

In step S342, the orthogonal demodulation unit 72 performs the orthogonal demodulation to generate the OFDM signal in time domain.

In step S343, the power correction unit 131 does not correct the power and outputs the OFDM signal in time domain of the segment in question provided by the orthogonal demodulation unit 72 to the FFT calculation unit 73 as it is.

In step S344, the FFT calculation unit 73 performs FFT calculation on the OFDM signal in time domain, and generates the OFDM signal in frequency domain.

In step S345, the pilot signal extracting unit 74 extracts only the pilot signal of the segment in question from the OFDM signal in frequency domain provided from the FFT calculation unit 73. The signal of the lower end carrier of the upper adjacent segment may be extracted to be used as CP.

In step S346, the transmission path characteristic estimating unit 75 estimates a transmission path characteristic on the basis of the pilot signal of the segment in question extracted by the pilot signal extracting unit 74.

In step S347, the equalizer unit 77 removes the component of transmission path distortion included in the OFDM signal in frequency domain provided by the FFT calculation unit 73, on the basis of the transmission path characteristic estimated by the transmission path characteristic estimating unit 75, and outputs the equalized OFDM signal in frequency domain. After the equalized OFDM signal in frequency domain is output, steps S322, S327 of FIG. 45 are performed again, and subsequent processing is performed.

The signal transmitted by the transmission device 1 is the OFDM signal. The OFDM modulation method has a property of having a high degree of resistance against multipath. The above expression (1) defining the waveform shaping filter is equivalent to intentionally generating multipath of d sample interval, and therefore, the reception side can receive the OFDM signal without performing any special processing for the waveform shaping at the transmission side.

Reception Processing C2 of the Reception Device 2

Figure 47:
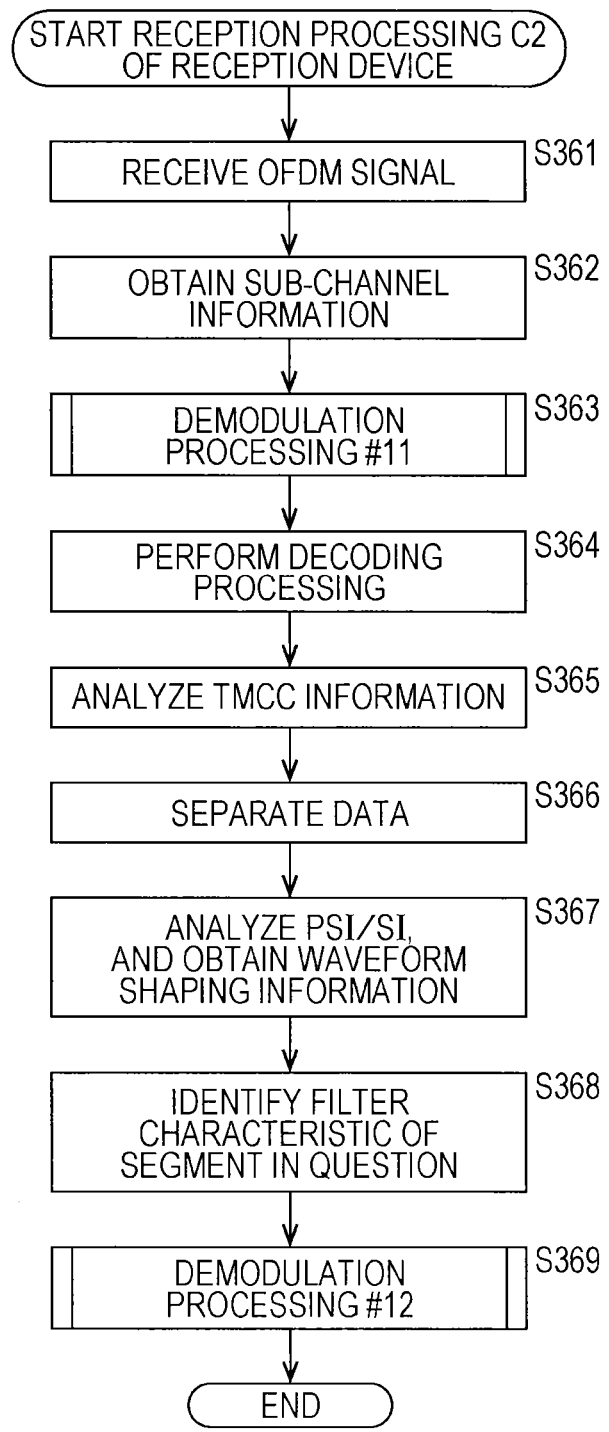
FIG. 47 is a flowchart for explaining reception processing C2 of the reception device.

Subsequently, the reception processing C2 of the reception device 2 will be explained with reference to a flowchart in FIG. 47. The processing of FIG. 47 is to perform processing such as equalization by correcting the power of the OFDM signal of the segment in question by superimposing the inverse characteristic of the characteristic of the waveform shaping filter.

In step S361, the tuner 51 receives an OFDM signal (RF signal), and converts the OFDM signal (RF signal) into an IF signal, and outputs the IF signal to the demodulation unit 52.

In step S362, the control unit 121 obtains the sub-channel information about the segment in question being received. The sub-channel information is uniquely identified by the tuned-in frequency of the tuner 51.

Figure 46:
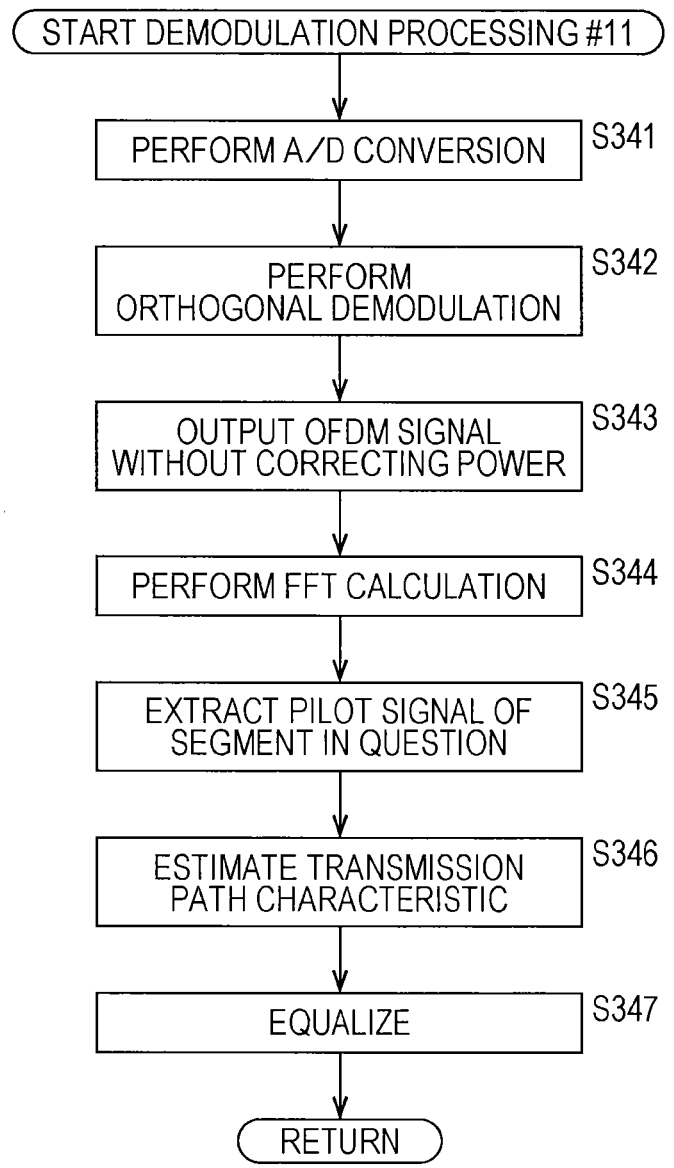
FIG. 46 is a flowchart for explaining demodulation processing #11 that is performed in steps S322, S327 of FIG. 45.

In step S363, the demodulation unit 52 performs the demodulation processing #11 of FIG. 46.

In step S364, the decoding unit 53 applies the decoding processing to the equalized OFDM signal, and outputs the TS to the demultiplexer 55, and outputs the TMCC information to the TMCC information analyzing unit 54.

In step S365, the TMCC information analyzing unit 54 analyzes the TMCC information, and provides information included in the TMCC information to the control unit 121 as necessary.

In step S366, the demultiplexer 55 separates the AV data and the PSI/SI from the TS.

In step S367, the PSI/SI analyzing unit 57 analyzes the PSI/SI separated from the TS by the demultiplexer 55, and obtains the waveform shaping information included from the area delivery system descriptor or the connected-transmission descriptor included in the NIT. The waveform shaping information obtained from the PSI/SI analyzing unit 57 is provided to the control unit 121.

In step S368, the control unit 121 identifies the characteristic of the waveform shaping filter used at the transmission side, on the basis of the waveform shaping information provided from the PSI/SI analyzing unit 57. The control unit 121 identifies the inverse characteristic of the characteristic of the waveform shaping filter for the signal of the segment in question, on the basis of the characteristic of the waveform shaping filter and the sub-channel information obtained in step S362, and outputs the information indicating the inverse characteristic to the power correction unit 131 of the demodulation unit 52.

In step S369, the demodulation unit 52 performs the demodulation processing #12. The demodulation processing #12 will be explained later with reference to a flowchart in FIG. 48. After the demodulation processing #12 is performed in step S369, the above processing such as the decoding processing is repeatedly performed.

Demodulation Processing #12

The demodulation processing #12 performed in step S369 of FIG. 47 will be explained with reference to a flowchart in FIG. 48.

In step S381, the A/D conversion unit 71 performs A/D conversion on the IF signal provided from the tuner 51.

In step S382, the orthogonal demodulation unit 72 performs orthogonal demodulation to generate the OFDM signal in time domain.

In step S383, the power correction unit 131 superimposes the inverse characteristic of the characteristic of the waveform shaping filter onto the OFDM signal of the segment in question provided by the orthogonal demodulation unit 72. By superimposing the inverse characteristic of the characteristic of the waveform shaping filter, the power of the OFDM signal of the segment in question is returned back to the power before the waveform shaping is performed by the transmission device 1. The power correction unit 131 outputs the OFDM signal of which power has been corrected to the FFT calculation unit 73.

In step S384, the FFT calculation unit 73 performs the FFT calculation on the OFDM signal in time domain of which power has been corrected, and generates the OFDM signal in frequency domain. When the power correction unit 131 is arranged after the FFT calculation unit 73, the order of the processing in step S383 and the processing in step S384 would be opposite.

In step S385, the pilot signal extracting unit 74 extracts the pilot signal of the segment in question and the signal of the lower end carrier of the upper adjacent segment from the OFDM signal in frequency domain provided by the FFT calculation unit 73.

In step S386, the transmission path characteristic estimating unit 75 estimates a transmission path characteristic on the basis of the signal of the lower end carrier of the upper adjacent segment and the pilot signal of the segment in question extracted by the pilot signal extracting unit 74.

In step S387, the equalizer unit 77 removes the component of transmission path distortion included in the OFDM signal in frequency domain provided by the FFT calculation unit 73, on the basis of the transmission path characteristic estimated by the transmission path characteristic estimating unit 75, and outputs the equalized OFDM signal in frequency domain. After the equalized OFDM signal in frequency domain is output, step S369 of FIG. 47 is performed again, and subsequent processing is performed.

As described above, the power of the signal of the segment in question and the power of the signal of the upper adjacent segment are corrected to perform processing such as equalization, whereby demodulation processing of the OFDM signal of the segment in question can be performed correctly. In a case where the power correction unit 131 is provided after the FFT calculation unit 73, it may be arranged after the branching of the equalizer unit 77 and the pilot signal extracting unit 74, or may be arranged before the branching of the equalizer unit 77 and the pilot signal extracting unit 74. In the case of the arrangement after the branching, the power correction units 131 may be arranged in both paths, or the power correction unit 131 may be arranged only before the pilot signal extracting unit 74, and the equalizer unit 77 may perform equalization using the pilot signal of which power has been corrected, the decoded signal of which power has not yet been corrected, and the inverse characteristic of the characteristic of the waveform shaping filter.

2-2. Example of Notifying Information about Waveform Shaping with TMCC Information Hereinafter explained is a case where the waveform shaping information is notified with the TMCC information.

When the TMCC information is used for notification of the waveform shaping information, the reception device 2 can obtain the waveform shaping information in the stage of the demodulation processing which is before the decoding processing, and this can ensure immediately responsiveness.

[Configuration of Transmission Device 1]

Figure 49:
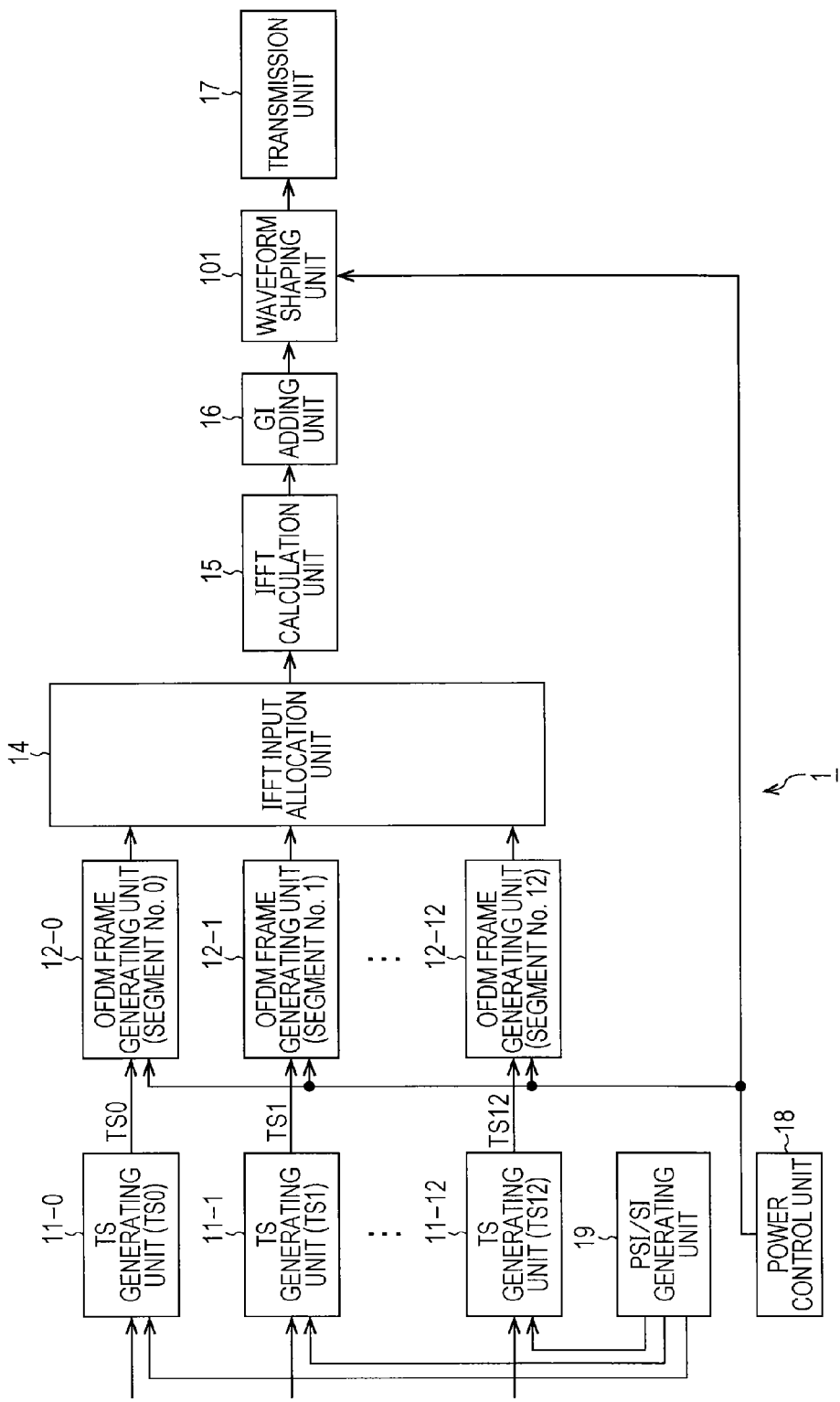
FIG. 49 is a block diagram showing an example structure of a transmission device.

FIG. 49 is a block diagram showing an example structure of transmission device 1 in a case where the waveform shaping information is notified with the TMCC information. In the structure illustrated in FIG. 49, the same components as those in FIG. 36 are denoted by the same reference numerals as those in FIG. 36.

The configuration of the transmission device 1 of FIG. 49 is different from the configuration of FIG. 36 in that information about the type of the waveform shaping filter, which is output from the power control unit 18 is provided to the OFDM frame generating units 12-0 to 12-12 and the waveform shaping unit 101. The explanations that have already been made will not be repeated.

The OFDM frame generating units 12-0 to 12-12 respectively generate the TMCC information including the waveform shaping information on the basis of the information provided from the power control unit 18. The OFDM frame generating units 12-0 to 12-12 generate OFDM frames for transmitting data of TS0 to TS12 provided by the TS generating unit 11-1 to 11-12 with the segments No. 0 to No. 12, respectively. The OFDM frame of each segment includes the TMCC information including the waveform shaping information.

The OFDM frame generating units 12-0 to 12-12 have the same configuration as the configuration of FIG. 14. The TMCC information including the waveform shaping information is generated by the TMCC information generating unit 38, and is incorporated into the OFDM frame by the frame configuration unit 36.

It should be noted that the reception device 2 has the same configuration as the configuration as shown in FIG. 42, FIG. 43.

[TMCC Information]

For example, the waveform shaping information is allocated to a predetermined bit of reserved 12 bits included in the TMCC information explained with reference to FIG. 26.

FIG. 50 is a figure showing an example of meaning of 1 bit in B110 in the TMCC information. In this example, 1 bit in B110 of the TMCC information is used as the waveform shaping information.

When B110 is 0, this indicates that the waveform shaping using the waveform shaping filter is performed by the transmission device 1. Information about the characteristic of the waveform shaping filter is given to the control unit 121 of the reception device 2 as already known information, for example.

When B110 is 1, this indicates that the waveform shaping using the waveform shaping filter is not performed by the transmission device 1.

FIG. 51 is a figure showing an example of meaning of 2 bits in B110 and B111 in the TMCC information.

When B110 and B111 are 00, this indicates that the waveform shaping using the waveform shaping filter 1 is performed by the transmission device 1, and when B110 and B111 are 01, this indicates that the waveform shaping using the waveform shaping filter 2 is performed by the transmission device 1. When B110 and B111 are 10, this indicates that the waveform shaping using the waveform shaping filter 3 is performed by the transmission device 1. Information about the characteristics of the waveform shaping filters 1 to 3 is given to the control unit 121 of the reception device 2 as already known information, for example.

When B110 and B111 are 11, this indicates that the waveform shaping using the waveform shaping filter is not performed by the transmission device 1.

[Operation of Transmission Device 1 and Reception Device 2]

Hereinafter explained is operation of the transmission device 1 and the reception device 2 in a case where the waveform shaping information is included in the TMCC information.

Transmission Processing D of the Transmission Device 1

Figure 52:
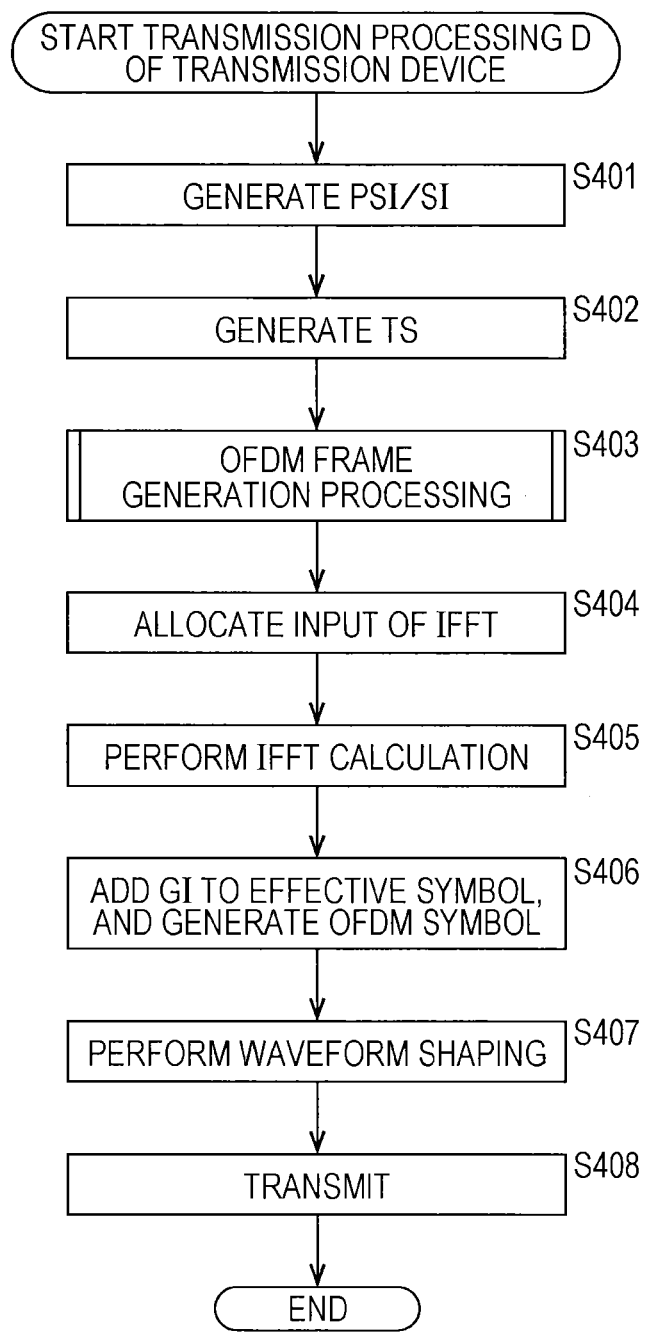
FIG. 52 is a flowchart for explaining transmission processing D of the transmission device 1 of FIG. 49.

First, the transmission processing D of the transmission device 1 of FIG. 49 will be explained with reference to a flowchart in FIG. 52.

In step S401, the PSI/SI generating unit 19 generates PSI/SI which is multiplexed into the TS transmitted in each segment of the segments No. 0 to No. 12.

In step S402, the TS generating units 11-0 to 11-12 multiplex AV data which are input from the outside and PSI/SI which is provided by the PSI/SI generating unit 19, thus generating a TS.

In step S403, the OFDM frame generating units 12-0 to 12-12 respectively perform the OFDM frame generation processing. The OFDM frame generation processing will be explained later with reference to a flowchart in FIG. 53. The signal of the OFDM frame of each segment generated by the OFDM frame generation processing is provided to the IFFT input allocation unit 14.

In step S404, the IFFT input allocation unit 14 allocates, to a carrier, the signal of the OFDM frame of each segment generated by the OFDM frame generating units 12-0 to 12-12.

In step S405, the IFFT calculation unit 15 collectively applies the IFFT calculation to the signals of the OFDM frames of 13 segments, and generates the OFDM signal in time domain.

In step S406, the GI adding unit 16 adds GI to each effective symbol constituting the OFDM signal in time domain, and generates the OFDM signal constituted by the OFDM symbols.

In step S407, the waveform shaping unit 101 applies the waveform shaping using the waveform shaping filter to the OFDM signal provided by the GI adding unit 16. The characteristic of the waveform shaping filter is already known by the reception device 2.

In step S408, the transmission unit 17 transmits the OFDM signal, which has been subjected to the waveform shaping, from an antenna, not shown.

According to the above processing, the OFDM signal of 13 segments of which power has been adjusted as shown in FIG. 35 is transmitted by connected-transmission. The powers of the signals of segments close to both ends of the channel are adjusted to become smaller, whereby this can suppress the interference to the adjacent channels.

OFDM Frame Generation Processing

Figure 53:
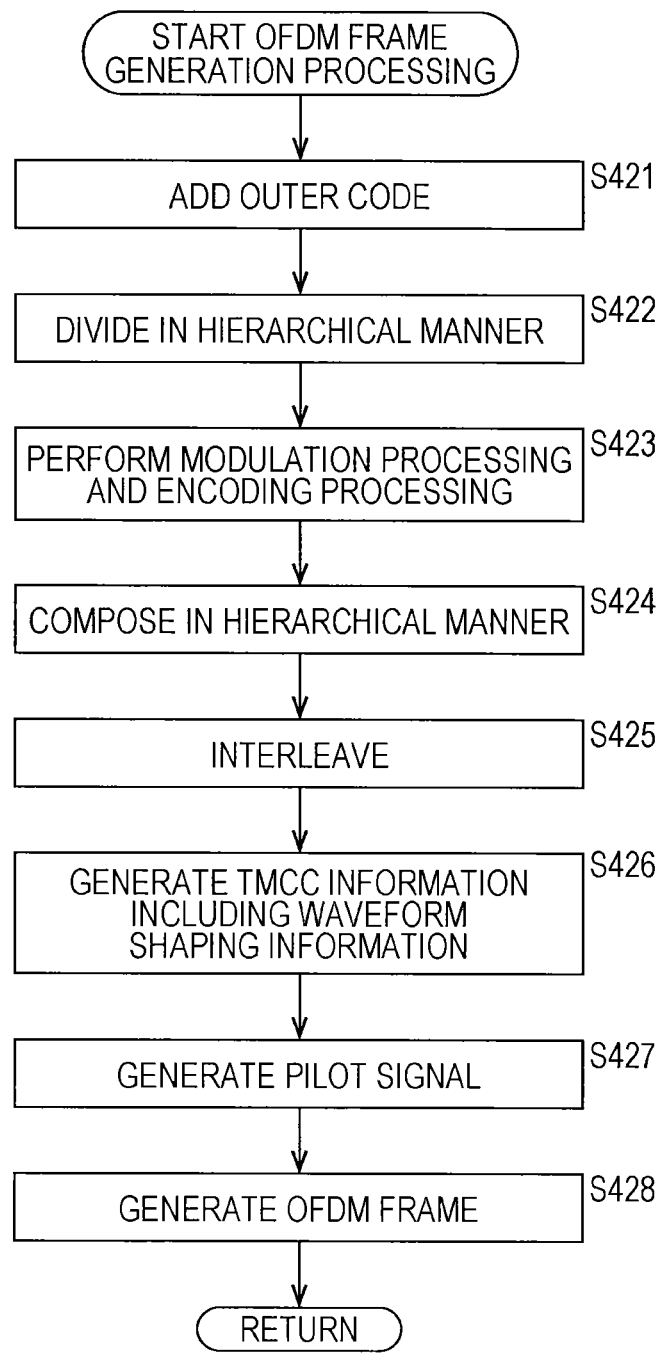
FIG. 53 is a flowchart for explaining OFDM frame generation processing that is performed in step S403 of FIG. 52.

Subsequently, the OFDM frame generation processing performed in step S403 of FIG. 52 will be explained with reference to a flowchart in FIG. 53. Each of the OFDM frame generating units 12-0 to 12-12 performs the same processing.

In step S421, the outer code adding unit 31 adds an outer code to data of TS in units of 188 bytes.

In step S422, the hierarchical dividing unit 32 divides the data having the outer code added thereto in a hierarchical manner.

In step S423, the modulation/encoding unit 33 performs baseband processing such as error correction encoding, interleaving, and the like to each of the hierarchical data, and performs carrier modulation.

In step S424, the hierarchical composing unit 34 composes, in a hierarchical manner, each piece of hierarchical data which have been subjected to the modulation processing and the encoding processing.

In step S425, the interleave processing unit 35 applies time interleaving and frequency interleaving to the data composed in the hierarchical manner.

In step S426, the TMCC information generating unit 38 generates the TMCC information in which the bit of FIG. 50 or FIG. 51 which is the waveform shaping information are allocated to a predetermined bit.

In step S427, the pilot signal generating unit 37 generates a pilot signal.

In step S428, the frame configuration unit 36 generates an OFDM frame on the basis of the data provided by the interleave processing unit 35, the pilot signal provided by the pilot signal generating unit 37, and the TMCC information provided by the TMCC information generating unit 38. Thereafter, step S403 of FIG. 52 is performed again, and subsequent processing is performed.

Reception Processing D1 of Reception Device 2

Figure 54:
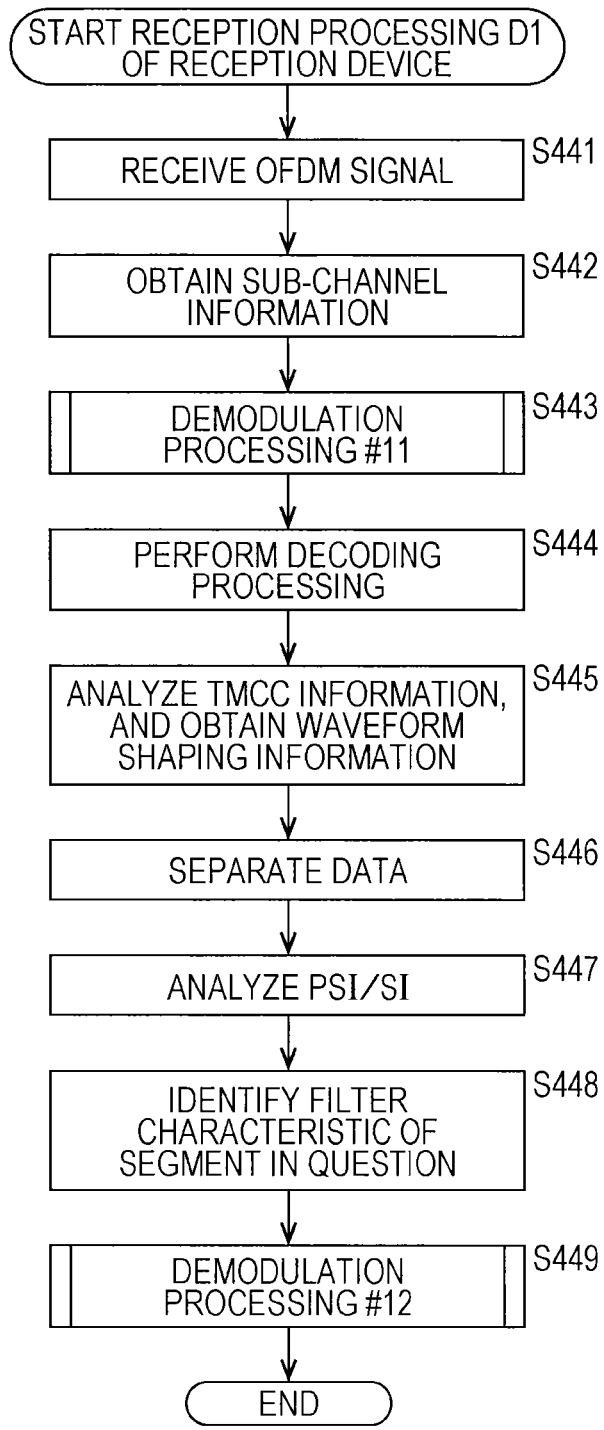
FIG. 54 is a flowchart for explaining reception processing D1 of the reception device.

Subsequently, the reception processing D1 of the reception device 2 of FIG. 42 will be explained with reference to a flowchart in FIG. 54. The processing of FIG. 54 is to superimpose the inverse characteristic of the characteristic of the waveform shaping filter to correct the power of the OFDM signal of the segment in question and perform processing such as equalization.

In step S441, the tuner 51 receives an OFDM signal (RF signal), and converts the OFDM signal (RF signal) into an IF signal, and outputs the IF signal to the demodulation unit 52.

In step S442, the control unit 121 obtains the sub-channel information about the segment in question being received. The sub-channel information is uniquely identified by the tuned-in frequency of the tuner 51.

In step S443, the demodulation unit 52 performs the demodulation processing #11 of FIG. 46.

In step S444, the decoding unit 53 applies decoding processing to the equalized OFDM signal, and outputs the TS to the demultiplexer 55, and outputs the TMCC information to the TMCC information analyzing unit 54.

In step S445, the TMCC information analyzing unit 54 analyzes the TMCC information, and obtains the waveform shaping information. The waveform shaping information obtained by the TMCC information analyzing unit 54 is provided to the control unit 121.

In step S446, the demultiplexer 55 separates the AV data and the PSI/SI from the TS.

In step S447, the PSI/SI analyzing unit 57 analyzes the PSI/SI separated from the TS by the demultiplexer 55.

In step S448, the control unit 121 identifies the characteristic of the waveform shaping filter used by the transmission side, on the basis of the waveform shaping information provided by the TMCC information analyzing unit 54. The control unit 121 identifies the inverse characteristic of the characteristic of the waveform shaping filter for the signal of the segment in question, on the basis of the characteristic of the waveform shaping filter and the sub-channel information obtained in step S442, and outputs the information indicating the inverse characteristic to the power correction unit 131 of the demodulation unit 52.

For example, when B110 of FIG. 50 is used as the waveform shaping information, and when B110 is 0, then the control unit 121 outputs information indicating already known characteristic to the power correction unit 131. When B110 and B111 of FIG. 51 are used as the waveform shaping information, and when B110 and B111 is, for example, 00, then the control unit 121 outputs information indicating the inverse characteristic of the characteristic of the waveform shaping filter 1 to the power correction unit 131.

Figure 48:
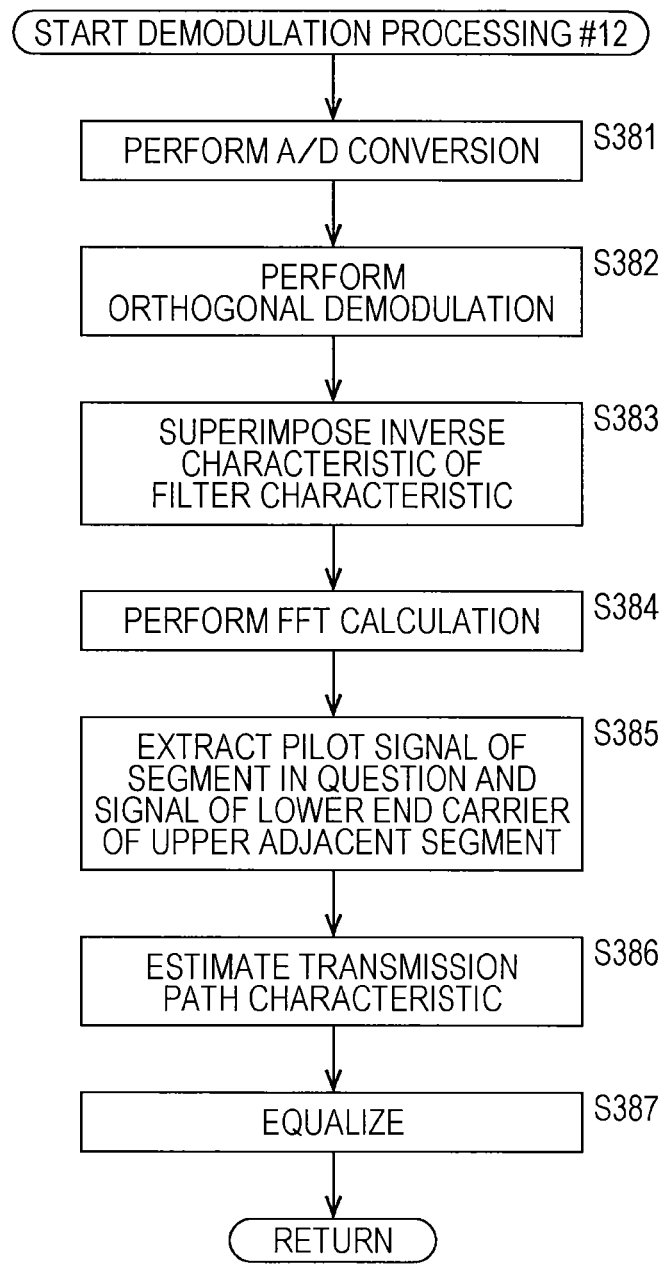
FIG. 48 is a flowchart for explaining demodulation processing #12 that is performed in step S369 of FIG. 47.

In step S449, the demodulation unit 52 performs the demodulation processing #12 of FIG. 48. In the demodulation processing #12 in step S449, the inverse characteristic of the characteristic of the waveform shaping filter identified based on the waveform shaping information included in the TMCC information is used to perform the correction of the power.

As described above, the power of the signal of the segment in question and the power of the signal of the upper adjacent segment are corrected to perform processing such as equalization, whereby demodulation processing of the OFDM signal of the segment in question can be performed correctly.

[Modification]

As described above, in a case where the power is adjusted by waveform shaping, or in a case where the power is adjusted for each segment, or in both of the cases, the channel state information (CSI) may be corrected on the basis of the characteristic of the waveform shaping filter. The channel state information is information indicating the reliability of the data obtained from the demodulation processing.

When the power is adjusted by the waveform shaping, for example, the control unit 121 corrects the channel state information so as to decrease the reliability for a carrier of which amount of attenuation is high and to increase the reliability for a carrier of which amount of attenuation is low, in accordance with the characteristic of the waveform shaping filter for the signal of the segment in question thus identified. The control unit 121 outputs the corrected channel state information to the decoding unit 53 and uses the channel state information to perform the error correction processing. Accordingly, the error correction performance of the decoding unit 53 can be improved.

On the other hand, when the power is adjusted for each segment, the control unit 121 corrects the channel state information so as to decrease the reliability for a carrier of which amount of attenuation is high and to increase the reliability for a carrier of which amount of attenuation is low, in accordance with the power of the segment in question thus identified.

Example of Configuration of Computer

A series of processing explained above may be executed by hardware or may be executed by software. When the series of processing is executed by software, programs constituting the software are installed from a program recording medium to a computer incorporated into, e.g., a general-purpose computer or a computer incorporated into dedicated hardware.

Figure 55:
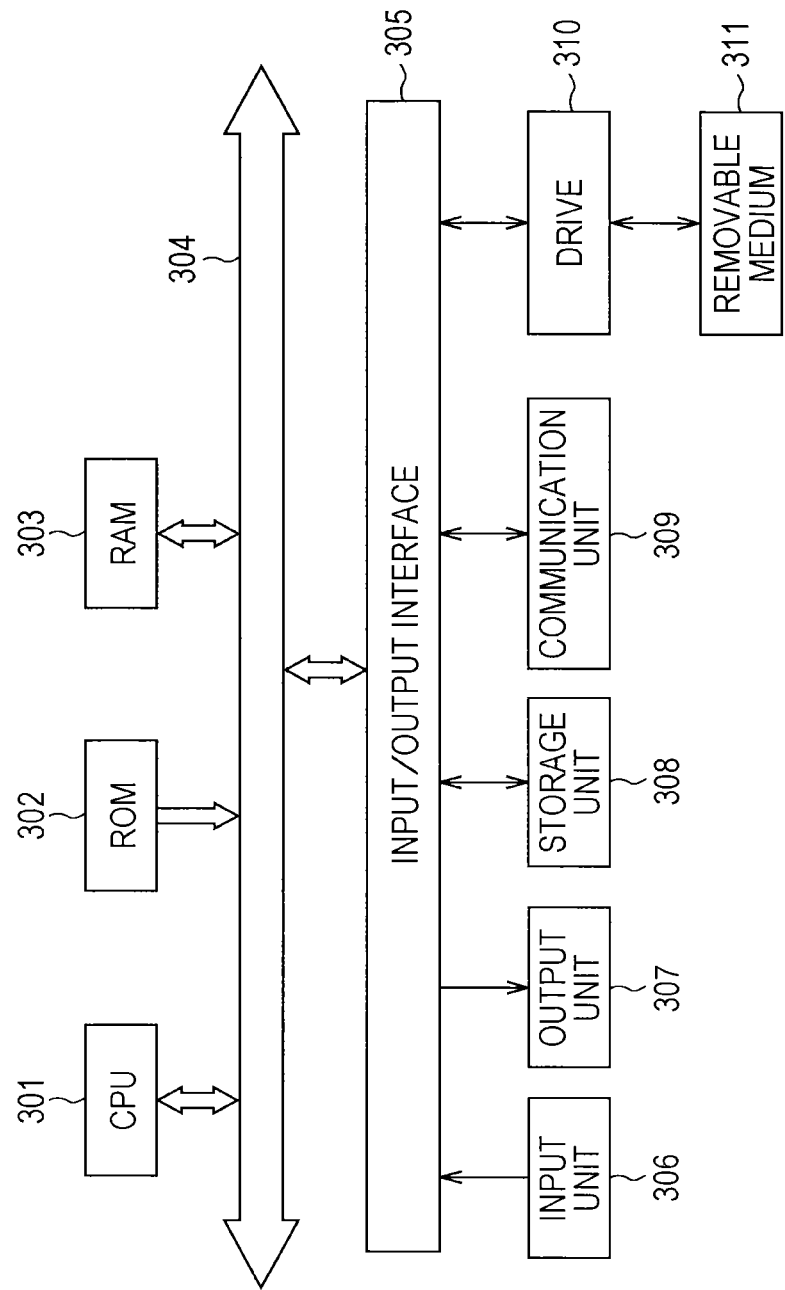
FIG. 55 is a block diagram showing an example structure of a computer.

FIG. 55 is a block diagram showing an example structure of the hardware of a computer that performs the above described series of processes in accordance with programs.

A CPU (Central Processing Unit) 301, ROM (Read Only Memory) 302, and RAM (Random Access Memory) 303 are connected with each other via a bus 304.

An input/output interface 305 is further connected to the bus 304. The input/output interface 305 is connected to an input unit 306 made of a keyboard, a mouse, and the like, and an output unit 307 made of a display, a speaker, and the like. The input/output interface 305 is also connected to a storage unit 308 made of a hard disk, non-volatile memory, and the like, a communication unit 309 made of a network interface and the like, and a drive 310 for driving a removable medium 311.

In the computer configured as described above, for example, the CPU 301 loads the program stored in the storage unit 308 via the input/output interface 305 and the bus 304 to the RAM 303, and executes the program, whereby the above series of processing is performed.

For example, the program executed by the CPU 301 is provided upon being recorded to a removable medium 311, or provided via a wired or wireless transmission medium such as a local area network, the Internet, and digital satellite broadcast, and installed to the storage unit 308.

The programs to be executed by the computer may be programs for performing processes in chronological order in accordance with the sequence described in this specification, or may be programs for performing processes in parallel or performing a process when necessary, such as when there is a call.

It should be noted that embodiments of the present technique are not limited to the above described embodiment, and various modifications may be made to it without departing from the scope of the present technique.

In this specification, the system means a set of multiple constituent elements (such as devices, modules (components), and the like), and it does not matter whether all of the constituent elements are in the same housing or not. In view of this, apparatuses that are housed in different housings and are connected to each other via a network form a system, and one apparatus having modules housed in one housing is also a system.

Example of Combination of Configurations

The present technique may be configured as follows.

(1)

A transmission device including:

a signal generating unit configured to generate a plurality of signals having a predetermined frequency bandwidth;

a power adjusting unit configured to adjust power of signals so that the power of a signal transmitted using a frequency band close to an end of a channel is less than the power of the signal transmitted using a frequency band close to a center of the channel; and a transmission unit configured to use the channel to transmit, in a connected manner, the signals of which power has been adjusted.

(2)
The transmission device according to (1), wherein the power adjusting unit adjusts the power of the signals in units of signals.

(3)
The transmission device according to (2) further including a power information generating unit for generating power information which is information about the power of the signal,
wherein the transmission unit transmits the signal and the power information.

(4)
The transmission device according to (3), wherein the power information generating unit generates the power information including information about the power of the signal and information about the power of an upper adjacent signal transmitted using a frequency band adjacent to an upper side of the signal in a frequency axis.

(5)
The transmission device according to (3), wherein the power information generating unit generates the power information including information about the power of the signal and information indicating a difference between the power of the signal and the power of the upper adjacent signal transmitted using the frequency band adjacent to the upper side of the signal in the frequency axis.

(6)
The transmission device according to (3), wherein the power information generating unit generates the power information including information indicating a difference between the power of the signal and the power of the upper adjacent signal transmitted using the frequency band adjacent to the upper side of the signal in the frequency axis.

(7)
The transmission device according to (3), wherein the power information generating unit generates the power information including information indicating whether there is a difference between the power of the signal and the power of the upper adjacent signal transmitted using the frequency band adjacent to the upper side of the signal in the frequency axis.

(8)
The transmission device according to (1) further including a connection unit configured to connect the plurality of signals without any guard interval,
wherein the power adjusting unit adjusts each of the power of the signals by performing waveform shaping on the signals connected.

(9)
The transmission device according to (8) further including a waveform shaping information generating unit configured to generate waveform shaping information which is information about the waveform shaping,
wherein the transmission unit transmits the signal and the waveform shaping information.

(10)
The transmission device according to (9), wherein the waveform shaping information generating unit generates the waveform shaping information including information about a type of a filter used for the waveform shaping.

(11)
The transmission device according to (9), wherein the waveform shaping information generating unit generates the waveform shaping information including information indicating whether the waveform shaping is performed or not.

(12)
The transmission device according to (1) to (11), wherein the predetermined frequency bandwidth is one segment defined in ARIB, and
the signal generating unit generates, as the multiple signals, signals of multiple OFDM segments each transmitting a different transport stream.

(13)
A transmission method including the steps of: generating a plurality of signals having a predetermined frequency bandwidth;
adjusting power of signals so that the power of a signal transmitted using a frequency band close to an end of a channel is less than the power of the signal transmitted using a frequency band close to a center of the channel; and
using the channel to transmit, in a connected manner, the signals of which power has been adjusted.

(14)
A program for causing a computer to execute processing including the steps of:
generating a plurality of signals having a predetermined frequency bandwidth;
adjusting power of signals so that the power of a signal transmitted using a frequency band close to an end of a channel is less than the power of the signal transmitted using a frequency band close to a center of the channel; and
using the channel to transmit, in a connected manner, the signals of which power has been adjusted.

(15)
A reception device including:
a reception unit configured to receive a predetermined signal of a plurality of signals of which power has been adjusted so that the power of a signal transmitted using a frequency band close to an end of a channel is less than the power of the signal transmitted using a frequency band close to a center of the channel, wherein the signals are transmitted in a connected manner using the channel;
a power correction unit configured to correct the power of at least one of the received signal and an upper adjacent signal transmitted using a frequency band adjacent to an upper side of the signal in a frequency axis, so that the power becomes power before the adjustment; and
a processing unit configured to process a signal of which power has been corrected.

(16)
The reception device according to (15) further including a power information obtaining unit configured to obtain, from the signal received by the reception unit, power information which is information about the power of the signal, which is transmitted together with the signal in a case where the power of the signal is adjusted by the signal unit.

(17)
The reception device according to (15) further including a power information obtaining unit configured to obtain, from the signal received by the reception unit, waveform shaping information which is information about the waveform shaping, which is transmitted together with the signal in a case where the power of the signal is adjusted by waveform shaping of the signals connected without any guard interval.

(18)
The reception device according to (15) to (17) further including a control unit configured to correct information representing a channel state of data obtained through demodulation by the processing unit, in accordance with an amount of attenuation of the power of the signal due to power adjustment performed at a transmission side.

(19)

A reception method including the steps of:

receiving a predetermined signal of a plurality of signals of which power has been adjusted so that the power of a signal transmitted using a frequency band close to an end of a channel is less than the power of the signal transmitted using a frequency band close to a center of the channel, wherein the signals are transmitted in a connected manner using the channel;

correcting the power of at least one of the received signal and an upper adjacent signal transmitted using a frequency band adjacent to an upper side of the signal in a frequency axis, so that the power becomes power before the adjustment; and processing a signal of which power has been corrected.

(20)

A program for causing a computer to execute processing including the steps of:

receiving a predetermined signal of a plurality of signals of which power has been adjusted so that the power of a signal transmitted using a frequency band close to an end of a channel is less than the power of the signal transmitted using a frequency band close to a center of the channel, wherein the signals are transmitted in a connected manner using the channel;

correcting the power of at least one of the received signal and an upper adjacent signal transmitted using a frequency band adjacent to an upper side of the signal in a frequency axis, so that the power becomes power before the adjustment; and processing a signal of which power has been corrected.

REFERENCE SIGNS LIST

1 Transmission device, 2 Reception device, 11-0 to 11-12 TS generating unit, 12-0 to 12-12 OFDM frame generating unit, 13 Power adjusting unit, 14 IFFT input allocation unit, 15 IFFT calculation unit, 16 GI adding unit, 17 Transmission unit, 18 Power control unit, 19 PSI/SI generating unit, 31 Outer code adding unit, 32 Hierarchical dividing unit, 33 Modulation/encoding unit, 34 Hierarchical composing unit, 35 Interleave processing unit, 36 Frame configuration unit, 37 Pilot signal generating unit, 38 TMCC information generating unit, 51 Tuner, 52 Demodulation unit, 53 Decoding unit, 54 TMCC information analyzing unit, 55 Demultiplexer, 56 AV decoder, 57 PSI/SI analyzing unit, 71 A/D conversion unit, 72 Orthogonal demodulation unit, 73 FFT calculation unit, 74 Pilot signal extracting unit, 75 Transmission path characteristic estimating unit, 76 Power correction unit, 77 Equalizer unit

The invention claimed is:

1. A transmission device comprising:
a signal generating unit configured to generate a plurality of signals having a predetermined frequency bandwidth;
a power adjusting unit configured to adjust power of signals so that the power of a signal transmitted using a frequency band close to an end of a channel is less than the power of the signal transmitted using a frequency band close to a center of the channel; and
a transmission unit configured to use the channel to transmit, in a connected manner, the signals of which power has been adjusted.

2. The transmission device according to claim 1, wherein the power adjusting unit adjusts the power of the signals in units of signals.

3. The transmission device according to claim 2 further comprising a power information generating unit for generating power information which is information about the power of the signal,
wherein the transmission unit transmits the signal and the power information.

4. The transmission device according to claim 3, wherein the power information generating unit generates the power information including information about the power of the signal and information about the power of an upper adjacent signal transmitted using a frequency band adjacent to an upper side of the signal in a frequency axis.

5. The transmission device according to claim 3, wherein the power information generating unit generates the power information including information about the power of the signal and information indicating a difference between the power of the signal and the power of the upper adjacent signal transmitted using the frequency band adjacent to the upper side of the signal in the frequency axis.

6. The transmission device according to claim 3, wherein the power information generating unit generates the power information including information indicating a difference between the power of the signal and the power of the upper adjacent signal transmitted using the frequency band adjacent to the upper side of the signal in the frequency axis.

7. The transmission device according to claim 3, wherein the power information generating unit generates the power information including information indicating whether there is a difference between the power of the signal and the power of the upper adjacent signal transmitted using the frequency band adjacent to the upper side of the signal in the frequency axis.

8. The transmission device according to claim 1 further comprising a connection unit configured to connect the plurality of signals without any guard interval,
wherein the power adjusting unit adjusts each of the power of the signals by performing waveform shaping on the signals connected.

9. The transmission device according to claim 8 further comprising a waveform shaping information generating unit configured to generate waveform shaping information which is information about the waveform shaping,
wherein the transmission unit transmits the signal and the waveform shaping information.

10. The transmission device according to claim 9, wherein the waveform shaping information generating unit generates the waveform shaping information including information about a type of a filter used for the waveform shaping.

11. The transmission device according to claim 9, wherein the waveform shaping information generating unit generates the waveform shaping information including information indicating whether the waveform shaping is performed or not.

12. The transmission device according to claim 1, wherein the predetermined frequency bandwidth is one segment defined in ARIB, and
the signal generating unit generates, as the signals, signals of multiple OFDM segments each transmitting a different transport stream.

13. A transmission method comprising the steps of:
generating a plurality of signals having a predetermined frequency bandwidth;
adjusting power of signals so that the power of a signal transmitted using a frequency band close to an end of a channel is less than the power of the signal transmitted using a frequency band close to a center of the channel; and using the channel to transmit, in a connected manner, the signals of which power has been adjusted.

14. A non-transitory computer readable medium having stored thereon, a set of computer-executable instructions for causing a computer to perform steps comprising:
   generating a plurality of signals having a predetermined frequency bandwidth;
   adjusting power of signals so that the power of a signal transmitted using a frequency band close to an end of a channel is less than the power of the signal transmitted using a frequency band close to a center of the channel; and
   using the channel to transmit, in a connected manner, the signals of which power has been adjusted.

15. A reception device comprising:
   a reception unit configured to receive a predetermined signal of a plurality of signals of which power has been adjusted so that the power of a signal transmitted using a frequency band close to an end of a channel is less than the power of the signal transmitted using a frequency band close to a center of the channel, wherein the signals are transmitted in a connected manner using the channel;
   a power correction unit configured to correct the power of at least one of the received signal and an upper adjacent signal transmitted using a frequency band adjacent to an upper side of the signal in a frequency axis, so that the power becomes power before the adjustment; and
   a processing unit configured to process a signal of which power has been corrected.

16. The reception device according to claim 15 further comprising a power information obtaining unit configured to obtain, from the signal received by the reception unit, power information which is information about the power of the signal, which is transmitted together with the signal in a case where the power of the signal is adjusted by the signal unit.

17. The reception device according to claim 15 further comprising a power information obtaining unit configured to obtain, from the signal received by the reception unit, waveform shaping information which is information about the waveform shaping, which is transmitted together with the signal in a case where the power of the signal is adjusted by waveform shaping of the signals connected without any guard interval.

18. The reception device according to claim 15 further comprising a control unit configured to correct information representing reliability of data obtained through demodulation by the processing unit, in accordance with an amount of attenuation of the power of the signal due to power adjustment performed at a transmission side.

19. A reception method comprising the steps of:
   receiving a predetermined signal of a plurality of signals of which power has been adjusted so that the power of a signal transmitted using a frequency band close to an end of a channel is less than the power of the signal transmitted using a frequency band close to a center of the channel, wherein the signals are transmitted in a connected manner using the channel;
   correcting the power of at least one of the received signal and an upper adjacent signal transmitted using a frequency band adjacent to an upper side of the signal in a frequency axis, so that the power becomes power before the adjustment; and
   processing a signal of which power has been corrected.

20. A non-transitory computer readable medium having stored thereon, a set of computer-executable instructions for causing the computer to perform steps comprising:
   receiving a predetermined signal of a plurality of signals of which power has been adjusted so that the power of a signal transmitted using a frequency band close to an end of a channel is less than the power of the signal transmitted using a frequency band close to a center of the channel, wherein the signals are transmitted in a connected manner using the channel;
   correcting the power of at least one of the received signal and an upper adjacent signal transmitted using a frequency band adjacent to an upper side of the signal in a frequency axis, so that the power becomes power before the adjustment; and
   processing a signal of which power has been corrected.

\* \* \* \* \*